INVENTOR
GEORGE T. BAKER,
CHARLES L. KETTLER &
GEORGE P. SARRAFIAN

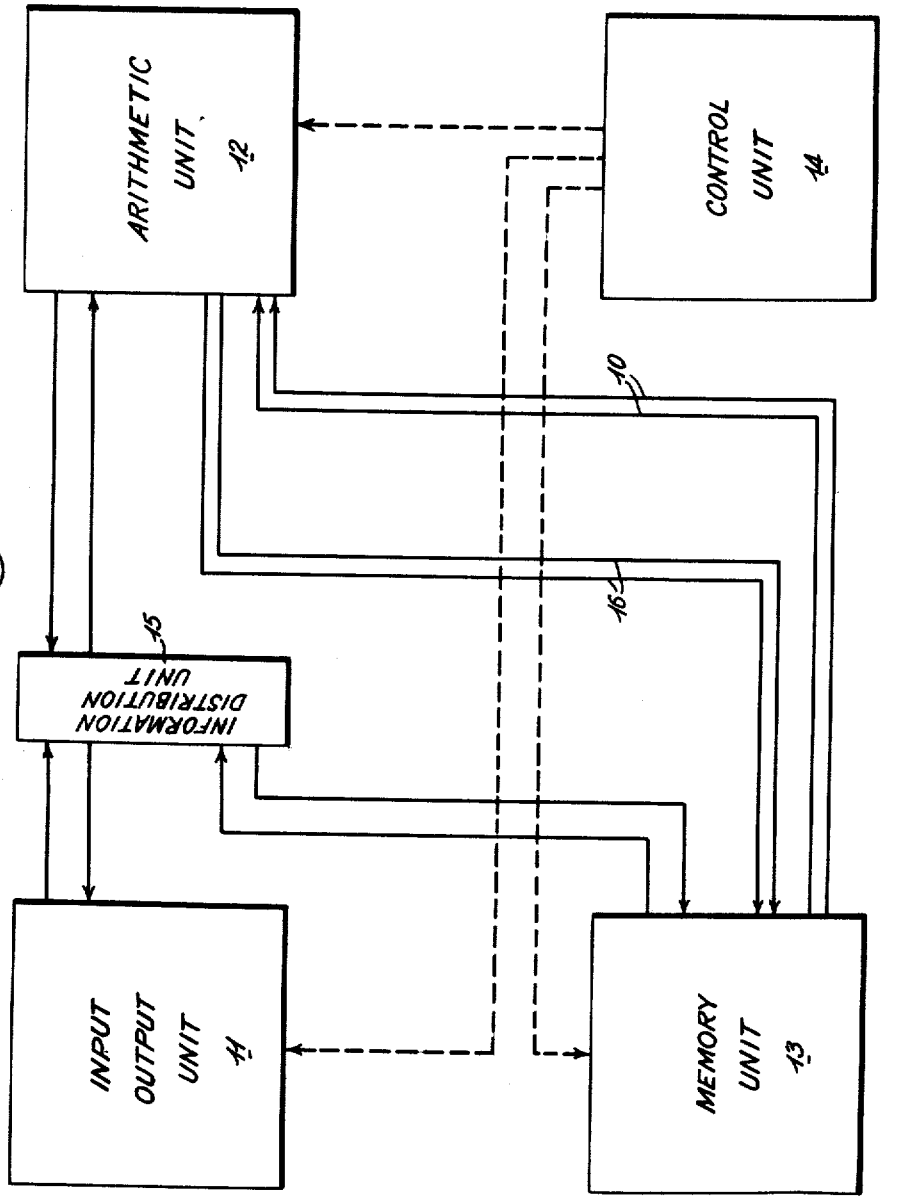

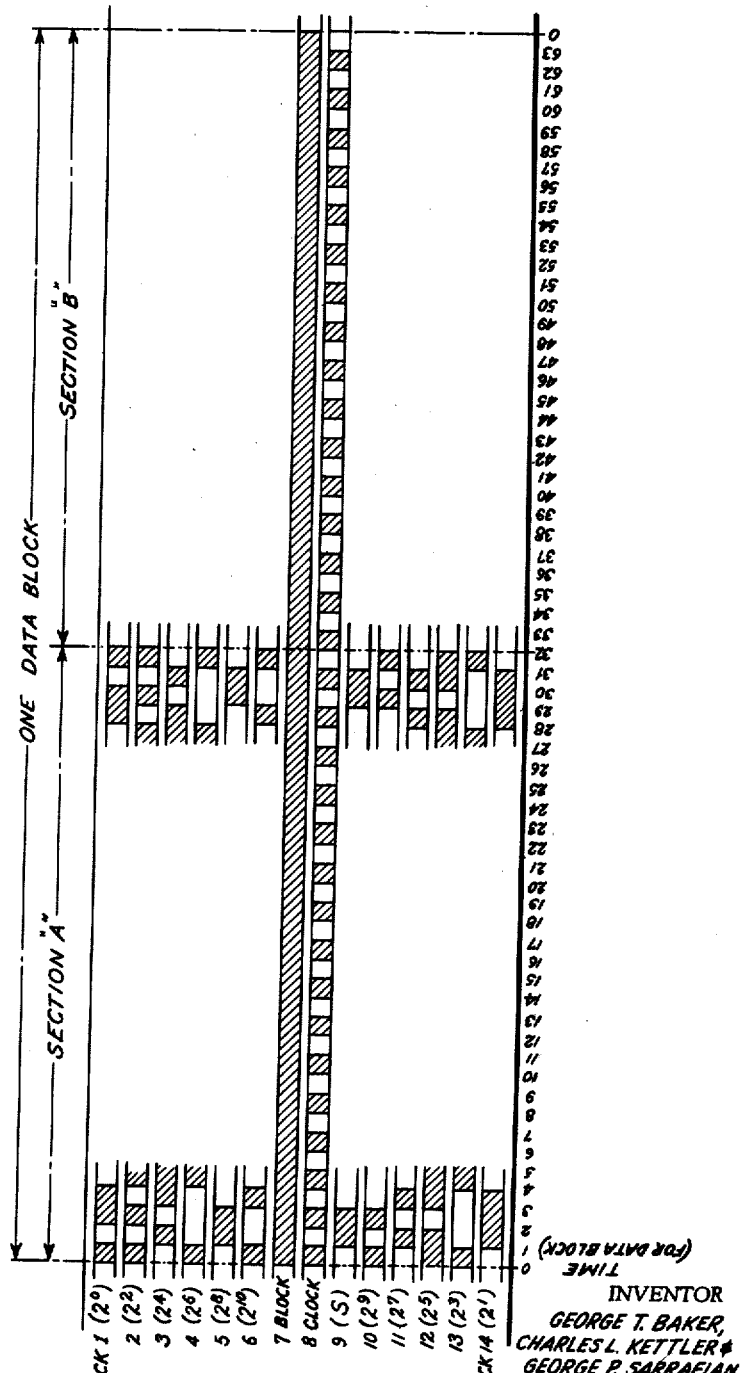

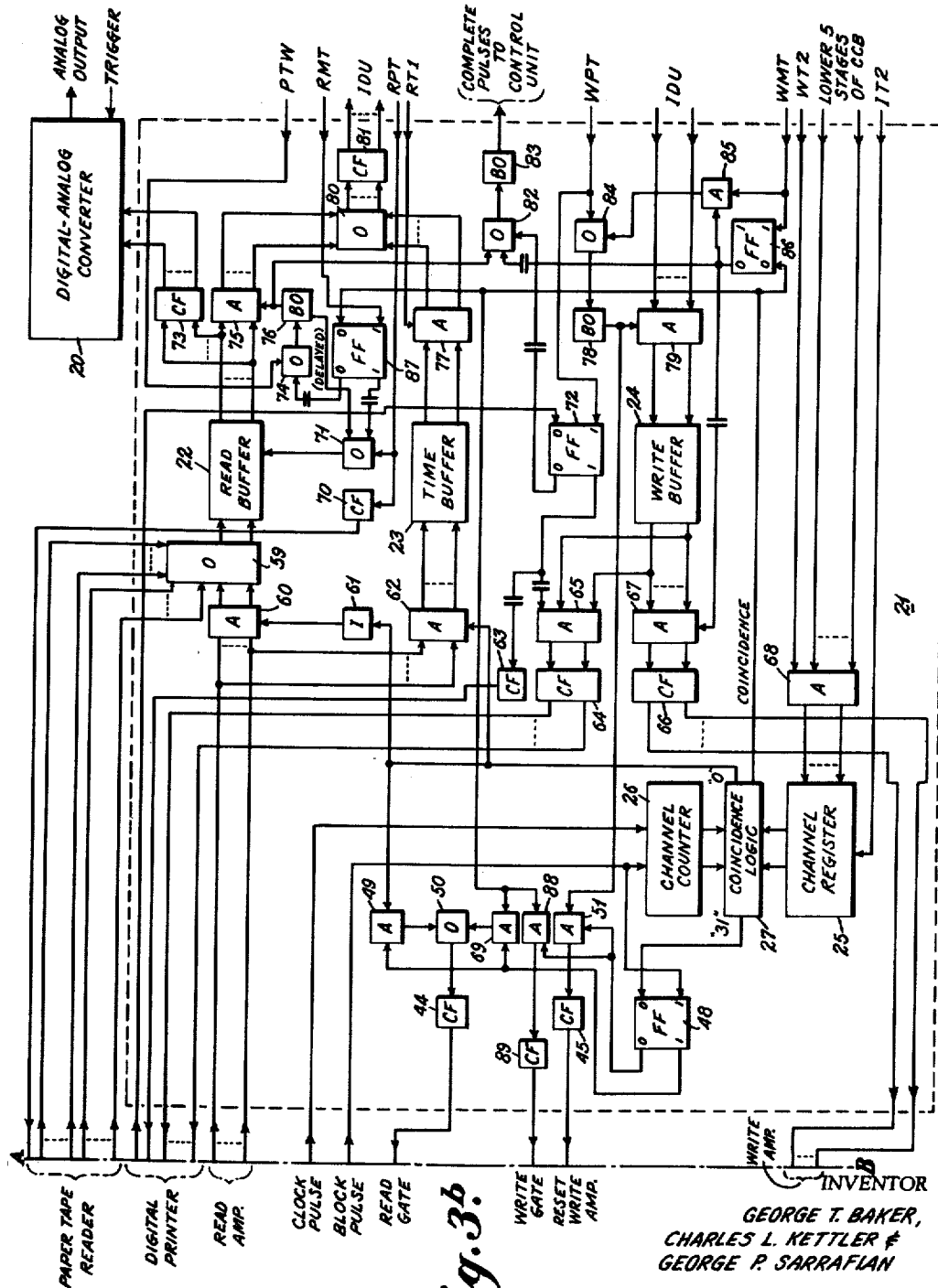

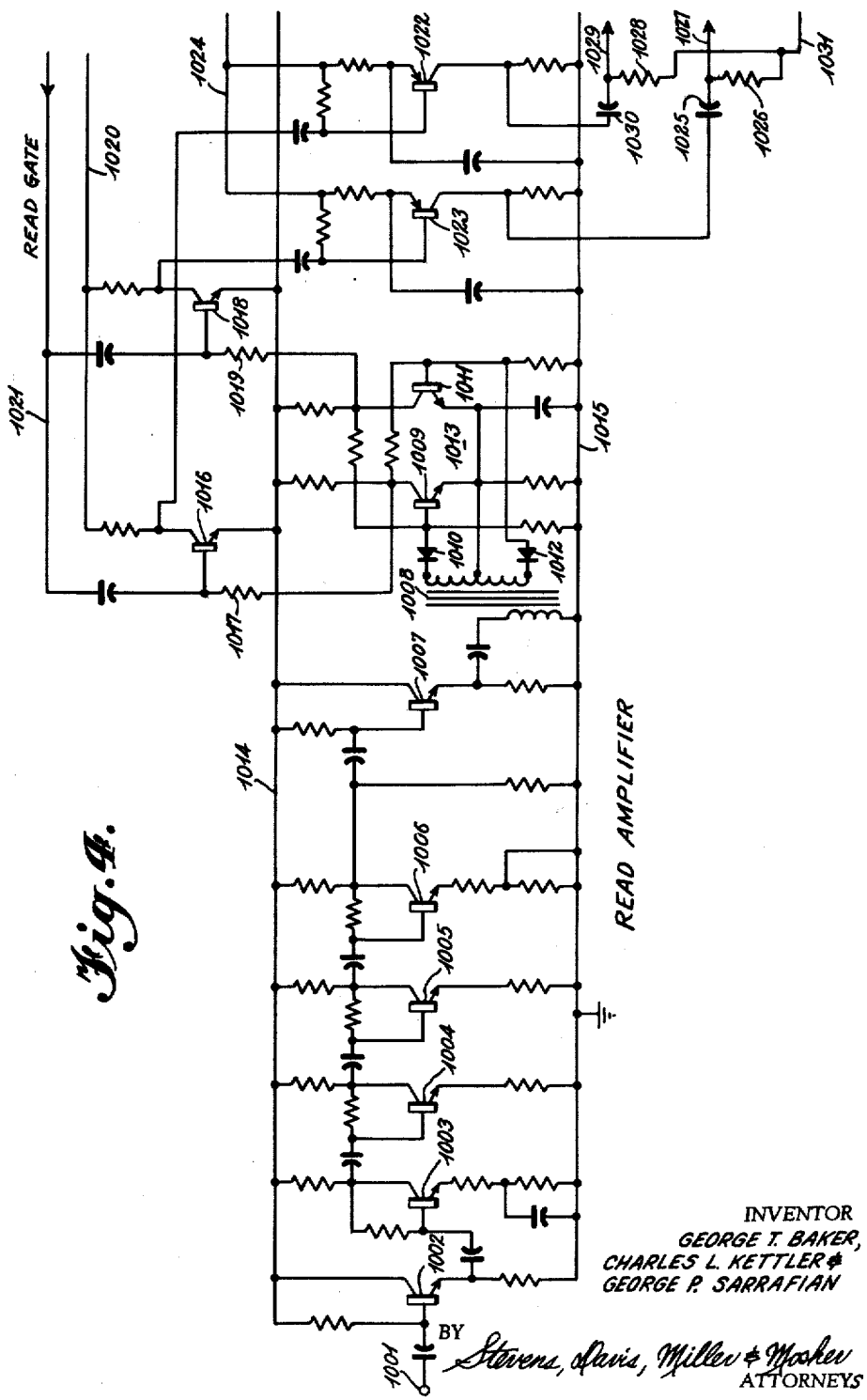

BY Stevens, Davis, Miller & Mosher
ATTORNEYS

Jan. 22, 1963   G. T. BAKER ETAL   3,074,636
DIGITAL COMPUTER WITH SIMULTANEOUS INTERNAL DATA TRANSFER
Filed Dec. 31, 1958   30 Sheets—Sheet 17

| CA | |
|---|---|
| CB | B |
| CC | |
| CD | |

INVENTOR
GEORGE T. BAKER,
CHARLES L. KETTLER &
GEORGE P. SARRAFIAN

BY *Stevens, Davis, Miller & Mosher*
ATTORNEYS

Jan. 22, 1963   G. T. BAKER ETAL   3,074,636
DIGITAL COMPUTER WITH SIMULTANEOUS INTERNAL DATA TRANSFER
Filed Dec. 31, 1958

MEMORY WAVE FORMS

INVENTOR
GEORGE T. BAKER,
CHARLES L. KETTLER &
GEORGE P. SARRAFIAN
BY *Stevens, Davis, Miller & Mosher*
ATTORNEYS

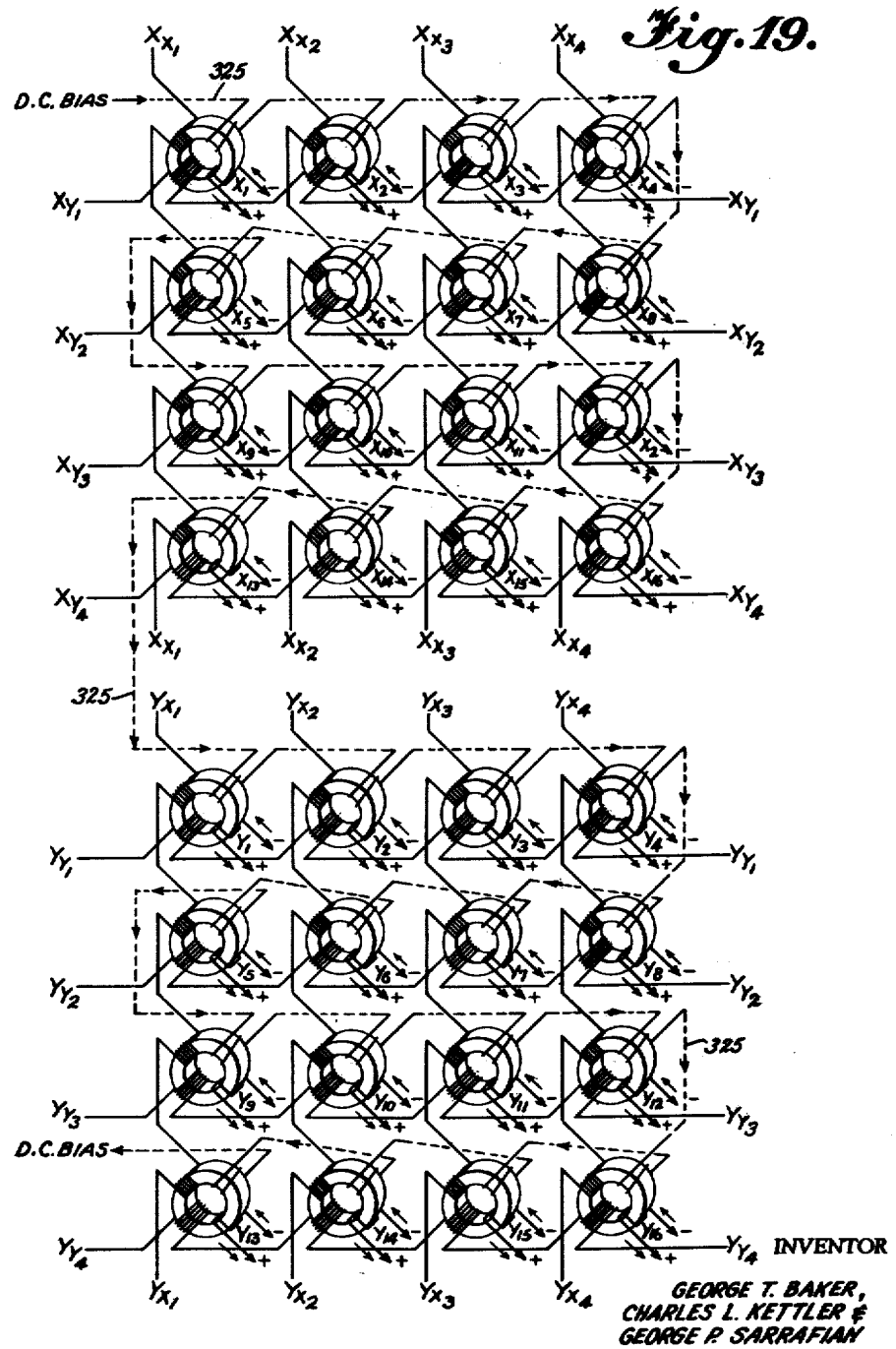

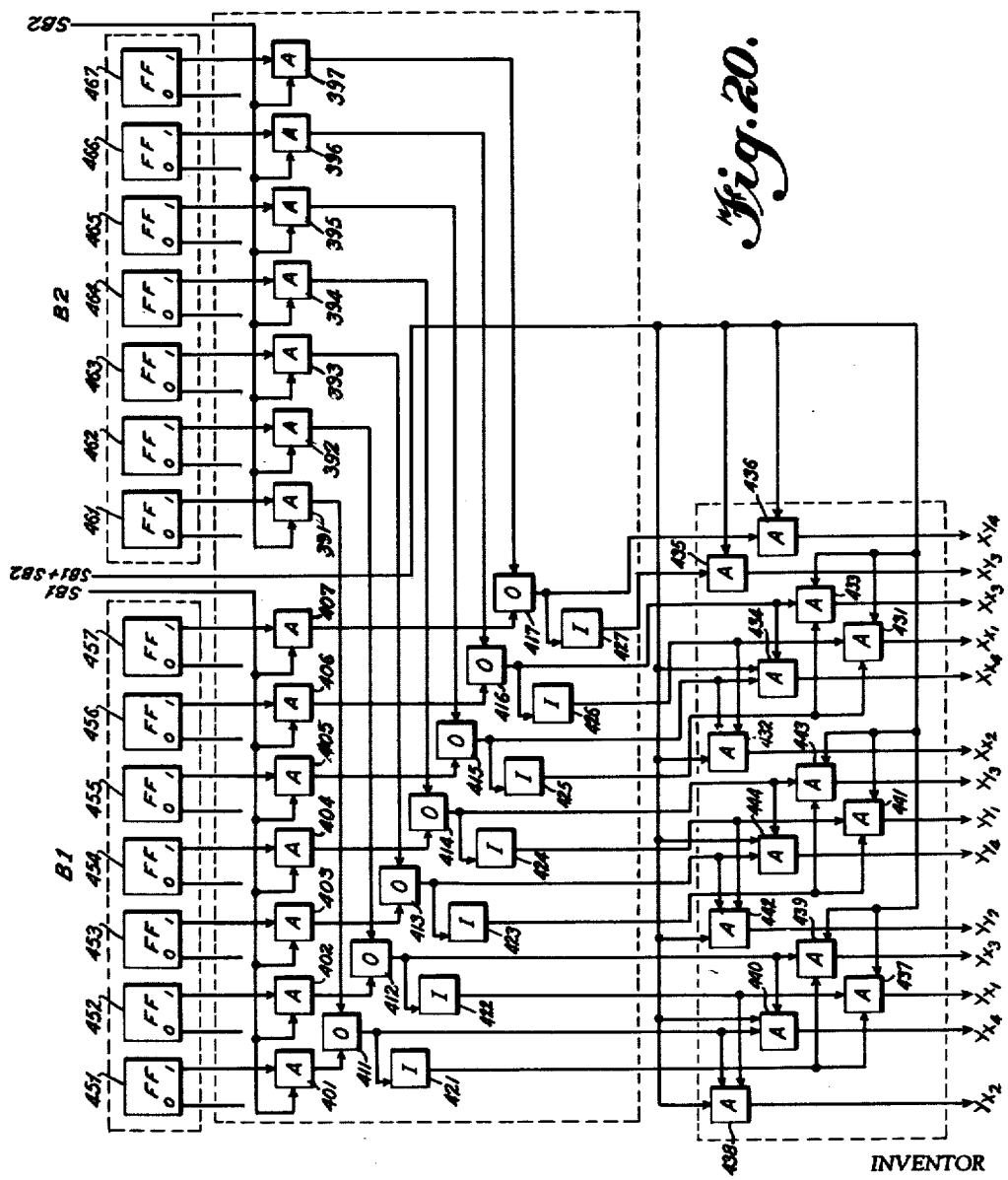

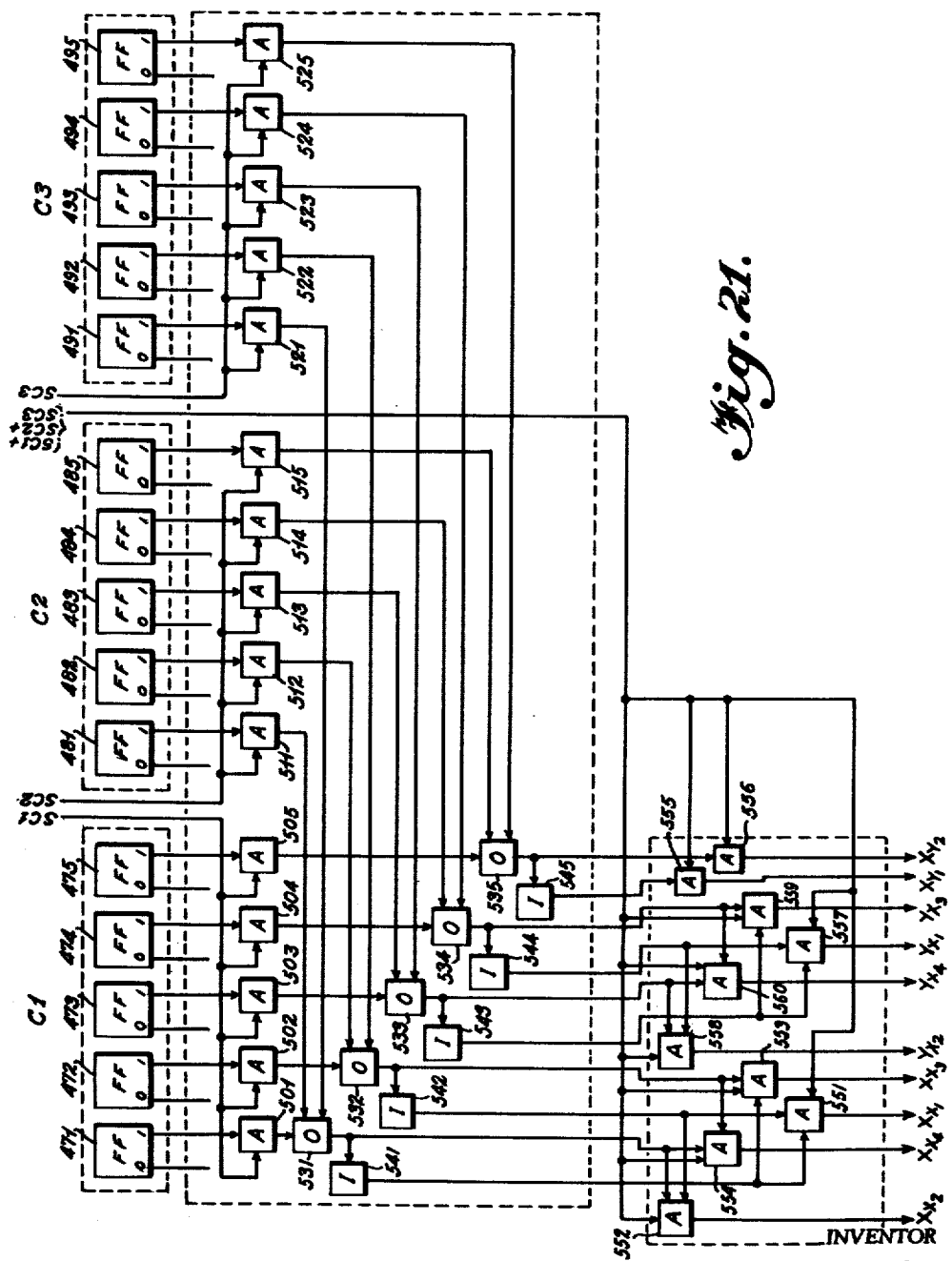

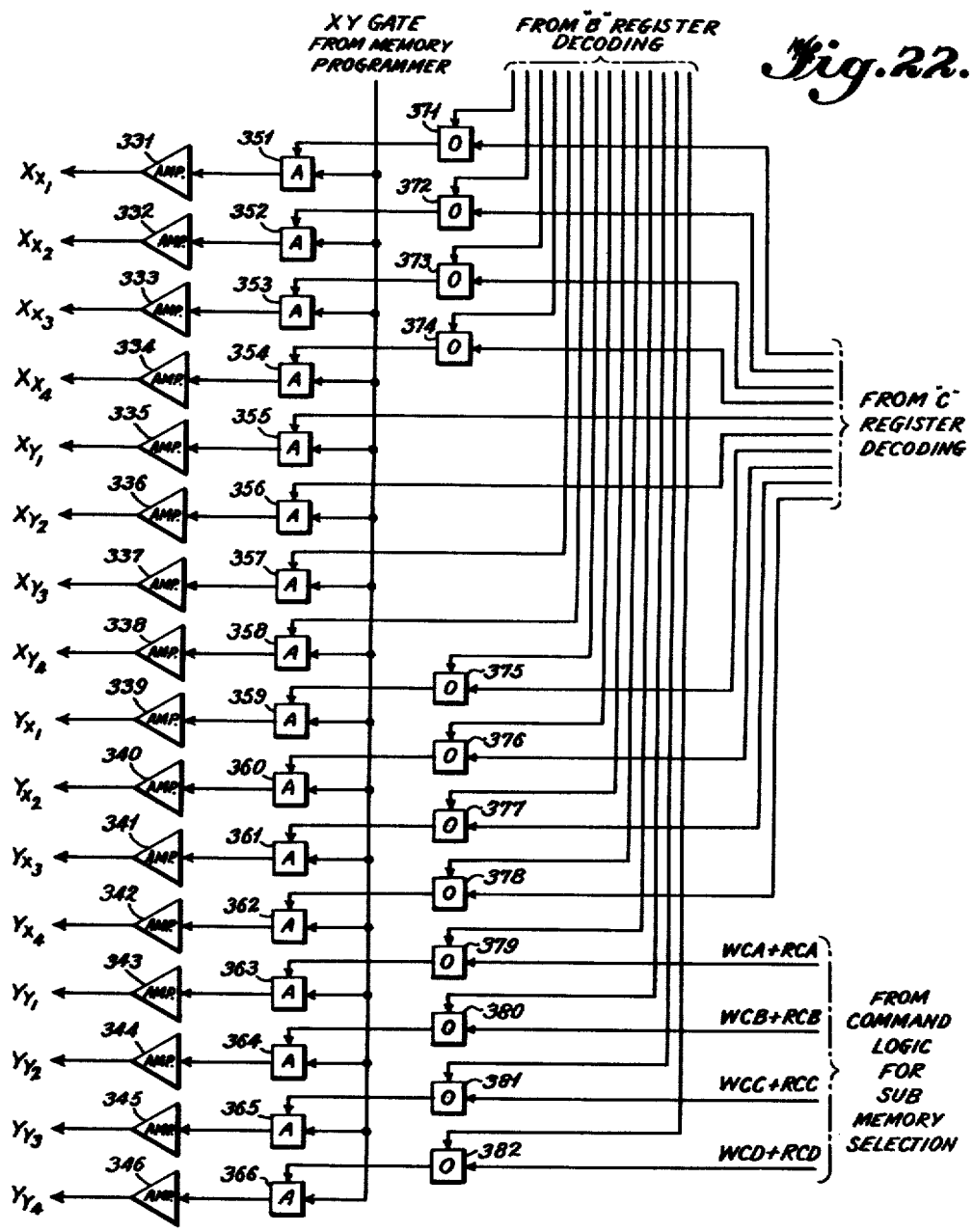

Jan. 22, 1963    G. T. BAKER ETAL    3,074,636
DIGITAL COMPUTER WITH SIMULTANEOUS INTERNAL DATA TRANSFER
Filed Dec. 31, 1958    30 Sheets-Sheet 23

INVENTOR
GEORGE T. BAKER,
CHARLES L. KETTLER &
GEORGE P. SARRAFIAN

BY *Stevens, Davis, Miller & Mosher*
ATTORNEYS

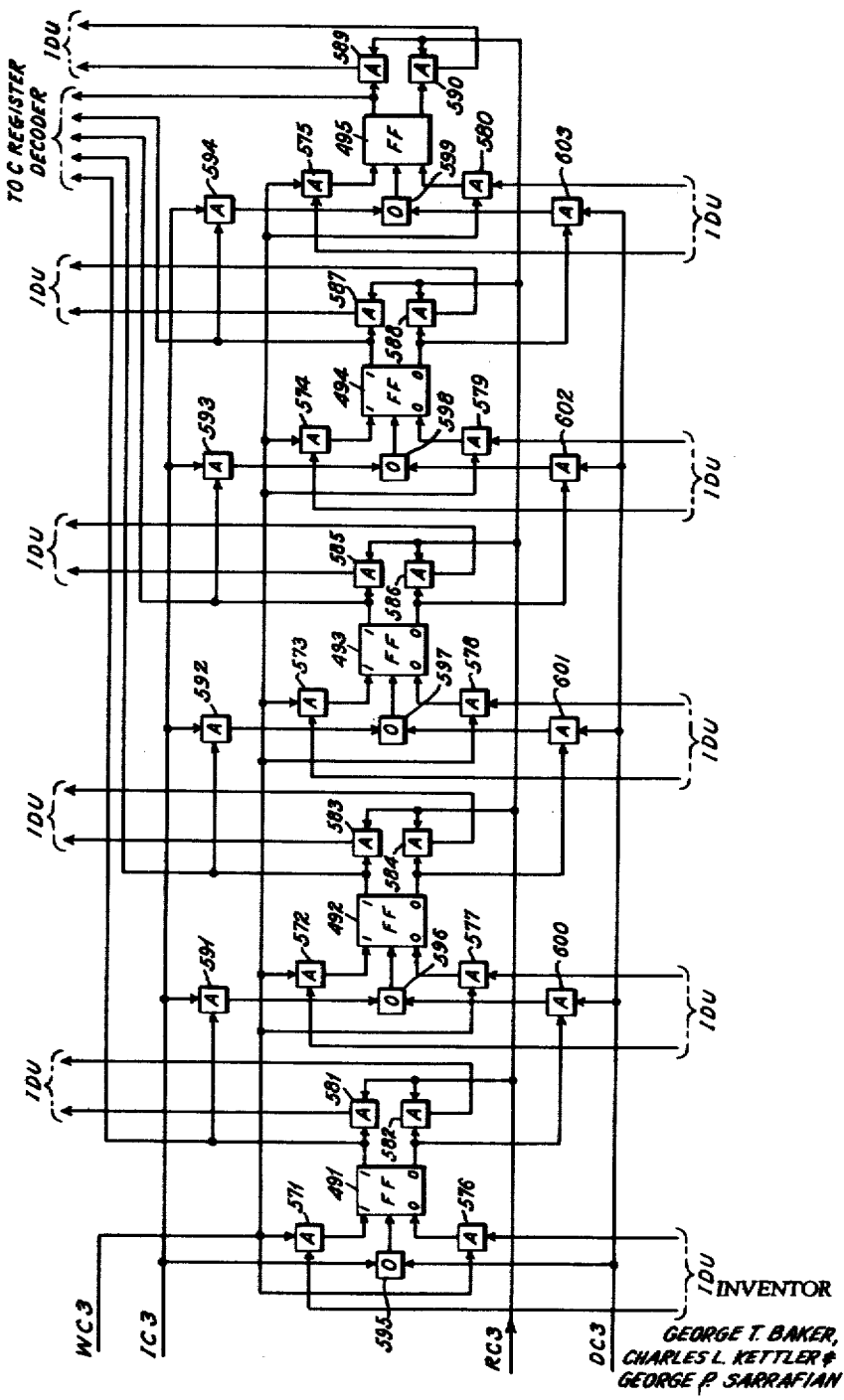

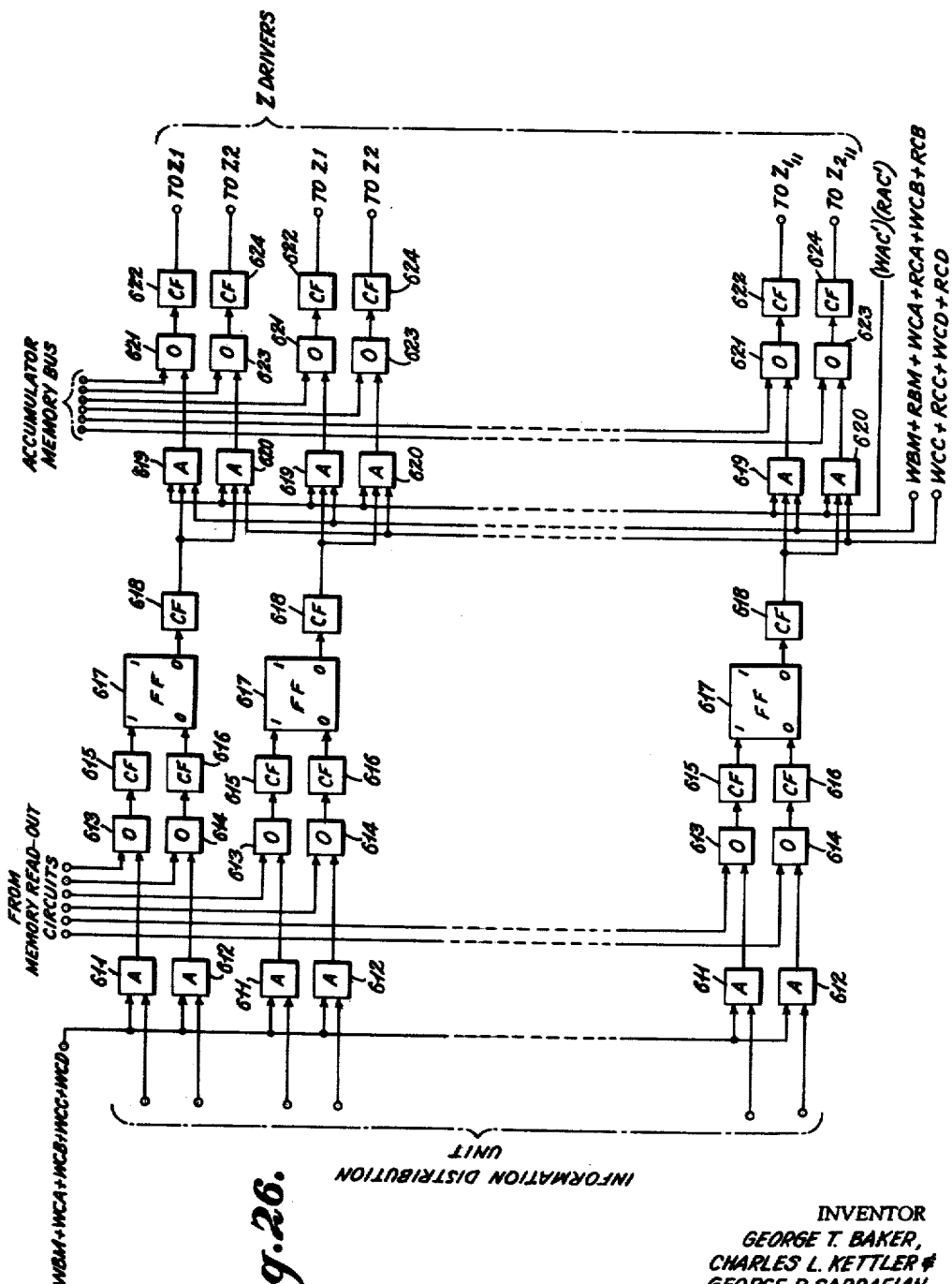

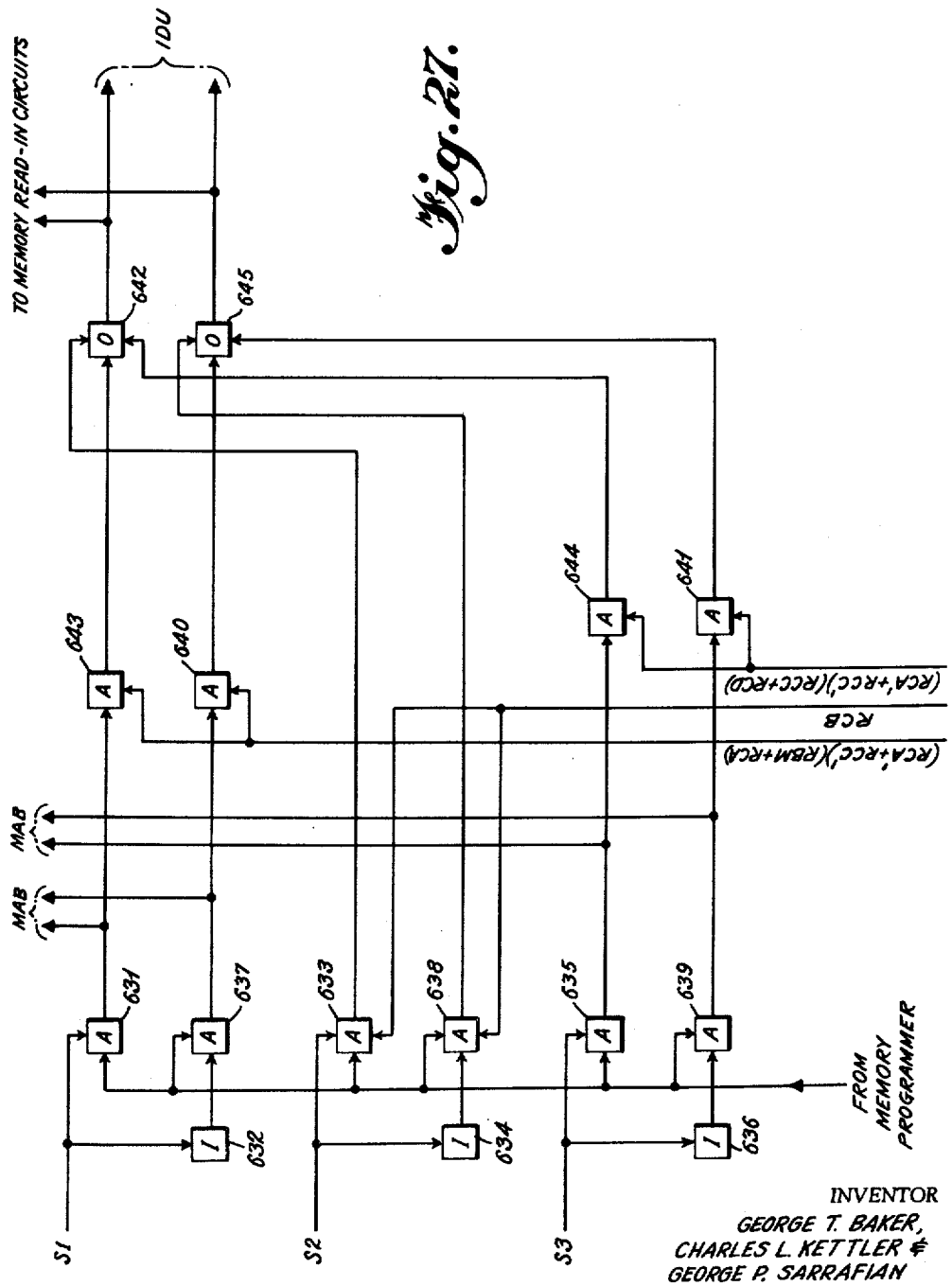

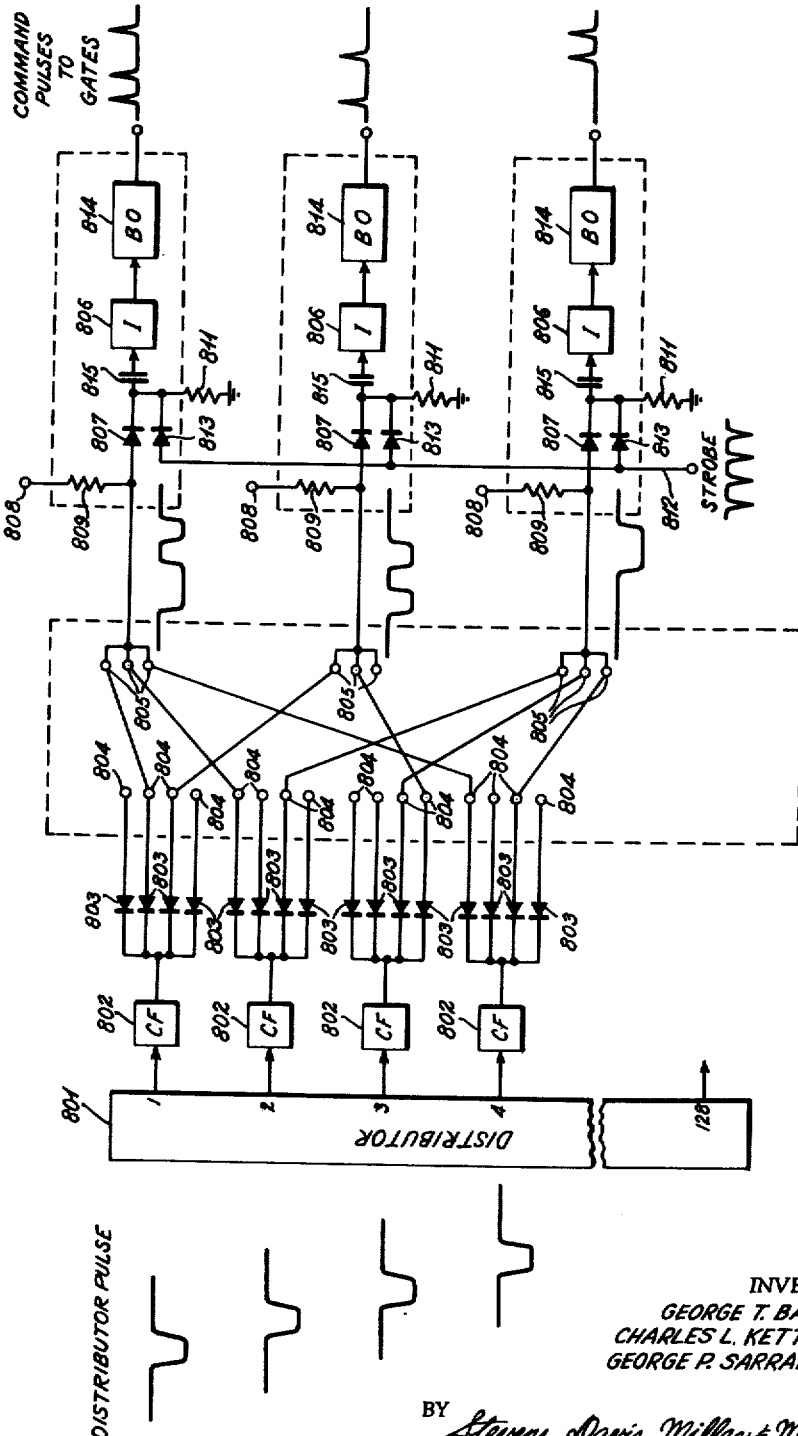

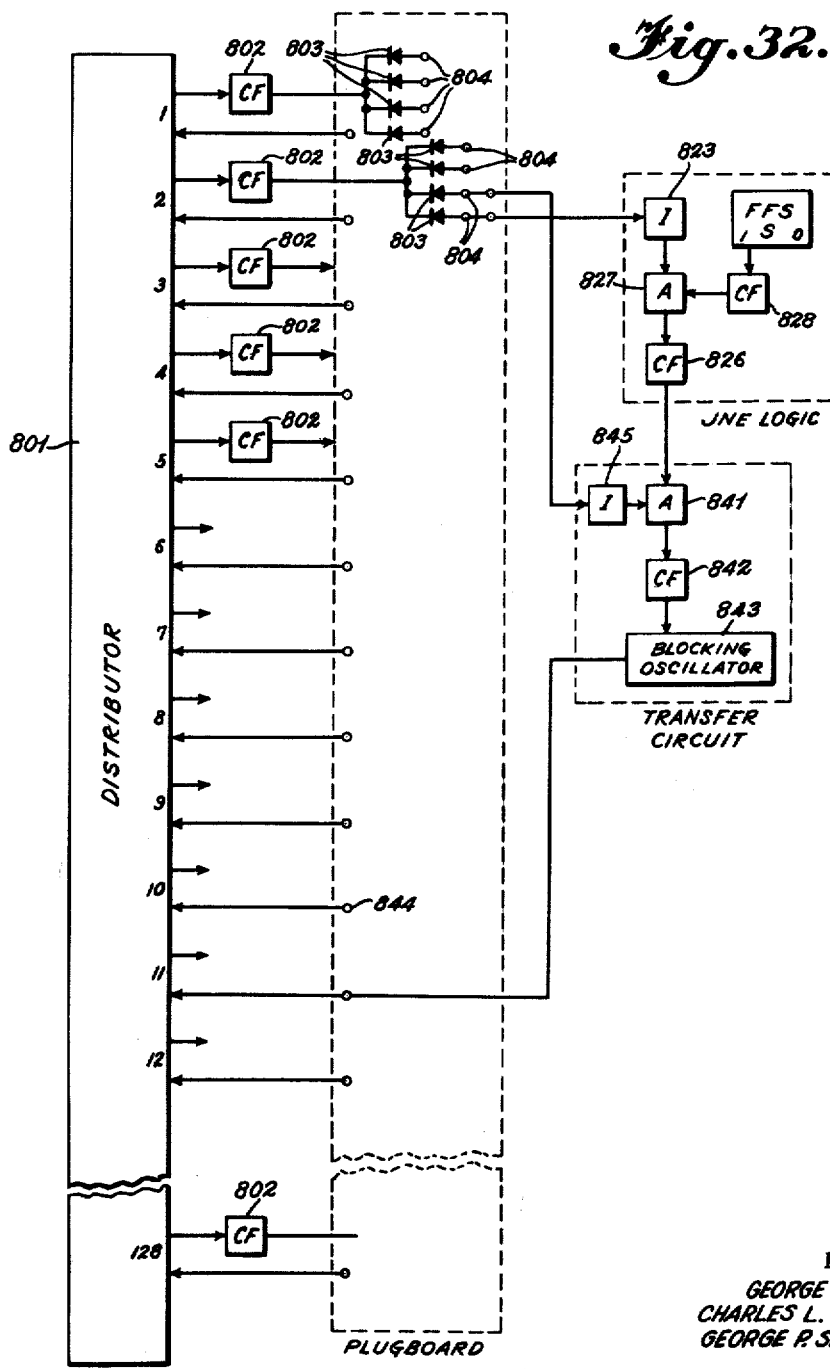

United States Patent Office 3,074,636
Patented Jan. 22, 1963

3,074,636
DIGITAL COMPUTER WITH SIMULTANEOUS INTERNAL DATA TRANSFER
George T. Baker, Charles L. Kettler, and George Philip Sarrafian, all of Dallas, Tex., assignors to Texas Instruments Incorporated, Dallas, Tex., a corporation of Delaware
Filed Dec. 31, 1958, Ser. No. 784,358
4 Claims. (Cl. 235—157)

This invention relates to a digital computer which is adapted to analyze and reduce digital data derived from sequentially sampled multi-channel analogue data.

One of the vital commodities in computer technology is time. Research is constantly being carried on to find out how to make the computer perform its operations faster. In the particular application of analyzing digital data which is derived from sequentially sampled analogue data, a large amount of digital data must be fed to the computer. The computers of the prior art take so long to carry out this kind of analysis that for many applications the use of a computer is impractical. The computer of the present invention is capable of performing this kind of analysis much faster than the computers of the prior art and thereby brings the digital analysis of many problems into the realm of practicality. In fact, the total cost of analysis of many problems by the computer of the present invention is substantially less than by prior art methods where no computer is used. Coupled with this reduction of cost is the important advantage that the time required to complete the analysis is much shorter than the time required by the heretofore only available practical methods.

One of the uses to which the computer of the present invention can be put is the complete digital analysis of seismic data in accordance with the method disclosed in the co-pending application Serial No. 784,292 of Alexander R. Aitken, John A. F. Gerrard, George P. Sarrafian and Hal J. Jones entitled Seismic Exploration and filed on December 31, 1958. The advantage of the computer of the present invention over prior art computers is demonstrated by the fact that it takes the computer of the present invention less than 30 minutes to carry out a problem of digital analysis of seismic data whereas the most expensive computers of the prior art would require 64 hours or more. This length of time required on the computers of the prior art would make the use of these computers too expensive for the digital analysis of seismic data. Accordingly, the analysis of seismic data is done for the most part mentally by technicians, rather than electronically and takes a matter of hours. With the computer of the present invention, the time for analysis is not only reduced to a matter of minutes, but also the cost of the analysis is less and the results obtained are better than by the mental analysis of the prior art.

One of the most time consuming processes in the digital analysis of seismic data is the cross-correlation filtering in which a set of cross-correlation coefficients $\Phi_i$ must be computed for each sampled data point on each seismic trace. The formula for computing $\Phi_i$ is the summation $\Phi_i = \Sigma_{k=0}^{32}(X_{i+k})(O_k)$ in which $X_1$, $X_2$, $X_3$ ... are sequentially sampled amplitudes of a seismic trace, $X_1$ is any one of these amplitudes, and $O_1$, $O_2$, $O_3$ ... $O_{32}$ are sequential amplitudes of the filter operator at the standard sampling interval. In carrying out this digital filtering operation it is necessary to multiply the amplitude of the seismic trace at every sampled data point with each amplitude of the filter operator at the standard sampling interval. The 32 different products obtained by multiplying the 32 amplitudes of the filter operator times any one of the seismic amplitudes will each appear in different summations $\Phi_N$. The easiest way of carrying out these different summations is to multiply each sequentially sampled seismic amplitude by each amplitude of the filter operator before proceeding to the next sampled amplitude of the seismic trace. This procedure necessitates the storing of 32 partially computed summations $P_N$, to each of which a different one of the 32 products obtained from each multiplication series must be added. The features of the computer of the present invention enable it to carry out this digital filtering operation much faster than any computer of the prior art.

Although the computer is designed particularly for the digital analysis of sequentially sampled analogue data, many of the time saving and other inventive features are applicable to all kinds of digital computers.

The computer generally is divided into four parts, the input-output unit, the arithmetic unit, the memory unit and the control unit. The input-output unit includes several input-output apparatus plus a bulk storage for the computer. The arithmetic unit includes an accumulator, an addend register, and a multiplier register. The memory unit includes a fast access storage core matrix and the control unit includes a plugboard for programming the operations of the computer. A central information distribution unit connects all parts of the system. The facilities of the computer include multiplication, division, subtraction and addition operations along with the flexibility, not present in most digital computers of the prior art, of easy addition of other operations such as square root computation. These additions can be added with only a slight additional amount of equipment. The computer includes program modification both in the form of transfer operation and in the ability to change information addresses to any one of 5 sections of its storage core matrix or to its bulk storage. The magnetic tape loop, which is part of the input-output apparatus, is used for bulk storage and the storage core matrix is used to store a small amount of data including partially computed results and constants needed in the various programs.

The memory unit of the computer is capable of multi-word simultaneous read in and read out whereas in systems of the prior art only one word may be read in or read out at a time. This feature allows more rapid handling of partially completed computations and thus aids the process of digital filtering described above. Several commands can be ordered and performed at once resulting in faster operation.

The present invention provides, in addition to the normal information distributing system, additional means to transfer information directly between the memory unit and the accumulator of the arithmetic unit. As a result data may be transferred over both of these transfer means simultaneously. This capability effects a great saving of time in computation which involves repeated and numerous operations involving the transfer of two or more words from one unit to another as is the case in the digital filtering operation.

The accuracy of such operations is improved by the present invention by the provision of a double-length accumulator. The word length capacity of the transfer means directly between the accumulator and the memory unit is made to equal that of the double-length accumulator so that much higher accuracy is maintained in operations in which partially completed computations must be transferred back and forth between the arithmetic unit and the memory unit with no extra time required to maintain this high accuracy. For example, in carrying out the operation of digital filtering with a computer of the prior art, the filter operator and the partially completed summations would have to be transferred one at a time to the arithmetic unit making the operation much slower. Also the accuracy of the operation would be much less on a machine of comparable size unless the partially computed summations were transferred one half at a time.

In the control unit, the program is organized by means of a plugboard. The distributor used to step from one output hub to the next in the plugboard comprises magnetron beam switching tubes. The use of these tubes enables the distributor to be stepped at a much faster rate than prior art distributors. Some of the commands available on the plugboard of the computer such as multiply and divide are carried out by microprogramming. When these commands are given, a signal from the control units will initiate the stepping of another magnetron beam switching tube which produces a sequence of commands to carry out the original command. This microprogramming results in less total commands to carry out a digital analysis and data reduction and results in a saving of that vital computer commodity time.

By means of the input-output system digital information to be analyzed is fed to the computer from a magnetic tape loop. In conjunction with the data fed from the magnetic tape loop, additional digital data can be fed to the computer from a paper tape reader. This dual input system makes it very convenient to feed constants to the computer from the paper tape reader to be used in the analysis of the digital data fed from the magnetic tape loop. Provision is made in the input output system to record digital information from the computer at predetermined addresses on the magnetic tape loop used for feeding digital data to the computer. This feature makes it possible to use the magnetic tape loop as a bulk storage, thus eliminating this component required in the computers of the prior art. Other units in the input output system are provided including a digital printer and a digital to analogue converter which results in increased versatility of the computer.

The tape loop is divided into 32 data blocks. Each data block is divided into two sections. At the start of an analysis, the data to be analyzed will be stored in the first of the two sections of each data block. The second sections of the data blocks are then used to store the results from the operations on the data stored in the first sections. Later in the analysis operation, further operations will be performed on the results stored in the second sections of the data blocks and the results from the further operations will be stored in the first sections of the data blocks from which still further analysis may be carried out. The fact that the results are stored in data blocks from which data is read out for analysis facilitates the correlation of the stored results with the data read out.

The accumulator uses stored-carry logic to decrease the time required to compute a series of addition operations such as are necessary in a muliplication operation. When stored-carry logic is used, it is necessary at the end of a series of addition operations, such as is required in multiplication, to empty the carry register into the sum register.

A plurality of index registers are provided in the memory unit which control the address of the word to be stored or read out of the storage core matrix. In each of these index registers, the address stored may be increased by one or an entire new address read into the index register. One of the index registers may have its address decreased by one or read out and transferred to some other part of the computer. Any one of the index registers can be selected to be the one to control the address in the storage core matrix thus making the storage system very flexible in operation.

Logic is provided to perform a program jump operation if a particular one of the index registers contains all Zero's. This particular index register has a capacity of 32 addresses. This feature enables the operator to order a program jump at the end of each multiplication series in the digital filtering operation which makes the operation much easier to program and takes less time to carry out.

This special program jump feature combined with the provision for the read in and read out of plurality of words simultaneously and the data format on the tape loop enables the computer of the present invention to carry out the digital filtering operation at a speed much greater than the computers of the prior art.

Other objects and advantages of the invention will become readily apparent as the following description of the preferred embodiment unfolds and when taken in conjunction with the drawings in which:

FIGURE 1 illustrates the overall organization of the computer;

FIGURE 2 illustrates the data format on the magnetic tape loop used to feed information to the computer and also as a bulk storage for the computer;

FIGURES 3a and 3b illustrate the input output unit of the comcuiter in block form;

FIGURE 4 shows the detailed circuitry of one of the read amplifiers used to read information off from the magnetic tape loop;

FIGURE 19 illustrates the details of the switch core matrices used for selecting and driving input conductors of the storage core matrix;

FIGURES 20 and 21 illustrate in block form the B and C register decoders which, in response to a binary number stored in a selected one of the index registers in the memory unit, will select input conductors of the switch core matrices and thereby select the address in the storage core matrix for the reading of information into or out of the storage core matrix;

FIGURE 22 illustrates in block form the details of the X and Y drivers which drive the input conductors of the switch core matrices selected by the B and C register decoders and by the commands given by the control unit;

FIGURE 24 illustrates another of the index registers in block form;

FIGURE 26 illustrates in block form the read in circuits which control the storing of information in the cores of the selected addresses;

FIGURE 27 illustrates in block form one of the read out circuits which transfer the information read out from the selected addresses to the buses leading to other parts of the computer;

FIGURE 30 illustrates the operation of the control unit when giving commands affecting the input output, the arithmetic, or memory units; and FIGURES 31 and 32 illustrate the operation of the control unit when giving a command to perform a program jump.

Figure 3A:
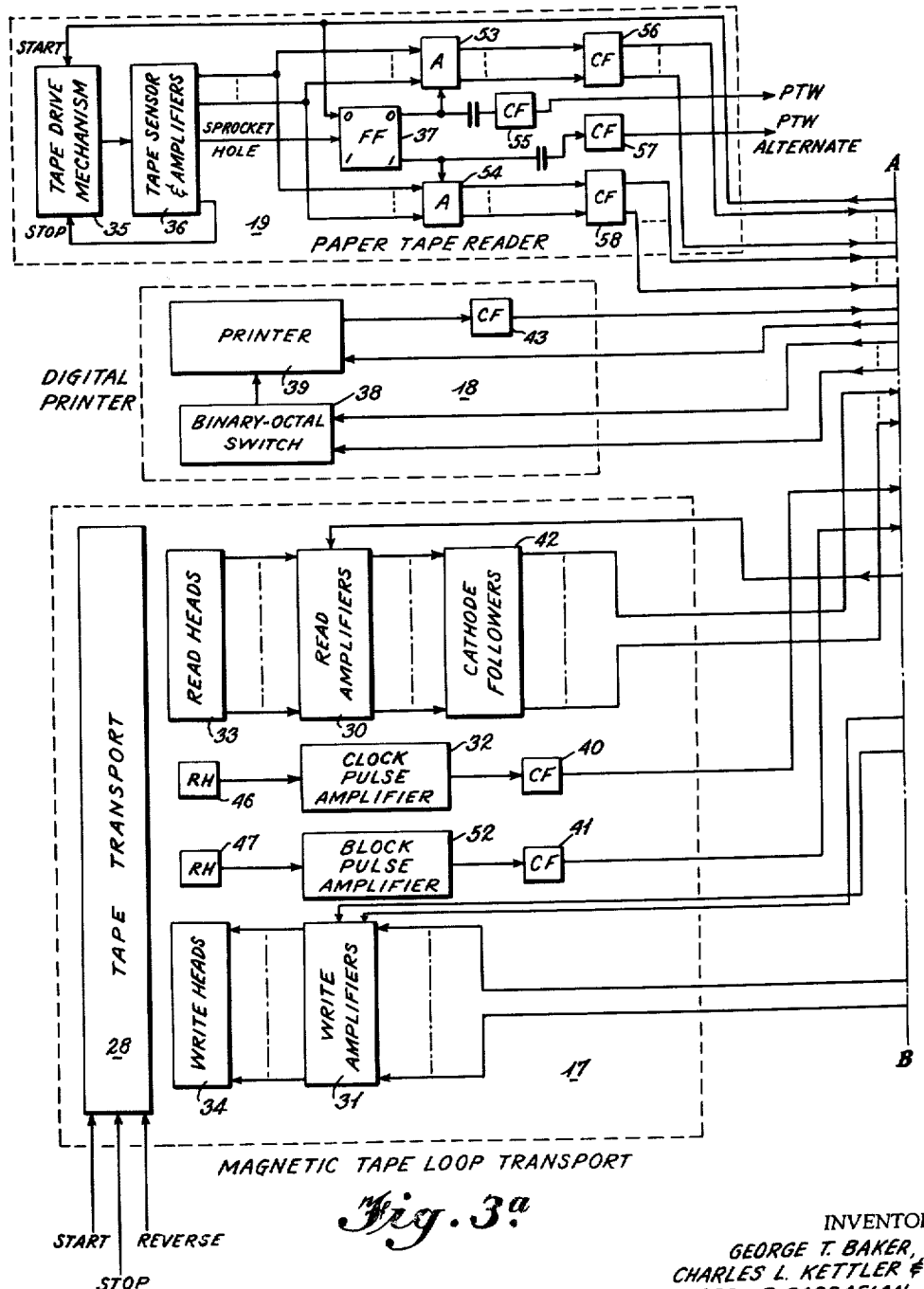

As shown in FIGURE 1, the computer is divided generally into four parts, the input output unit 11, the arithmetic unit 12, the memory unit 13, and the control unit 14. The input output unit 11 feeds binary digital data to be analyzed to the computer, makes the results of the analysis available to the operator, and also provides a large capacity bulk storage. The arithmetic unit 12 performs all of the arithmetic operations of the analysis on the digital data. The memory unit 13 comprises a fast access storage for the computer. The control unit 14 programs the operations of the computer. Digital information may be transferred from any one of the units 11, 12, or 13 to any other one of these three units by means of an information distribution unit 15 which interconnects these units. The computer is generally designed to operate on 12 bit binary words and the information distribution unit 15 is designed to transfer 12 bit words. Sometimes, for example in the digital filtering operation, it is desirable to transfer a 24 bit word from the arithmetic unit 12 to the memory unit 13 and vice-versa. For this purpose the accumulator memory bus 16 and the memory accumulator bus 10, designed to transfer 24 bit words, are provided. 24 bit words may be transferred from the arithmetic unit to the memory unit over the accumulator memory bus 16 and from the memory unit to the arithmetic unit over the memory accumulator bus 10. All transfer operations of the information distribution unit 15, the accumulator memory bus 16, and the memory accumulator bus 10 are normally under the control of the program of the control unit 14.

In 12 bit binary words, eleven of the bits are used to designate the $2^0$ through $2^{10}$ orders of a binary number. The remaining order is reserved to designate the sign of the binary number, which order is referred to as the sign order. Similarly, 23 of the 24 bits of a 24 bit word are used to designate the $2^0$ to $2^{22}$ orders of the binary words while the remaining order is used to designate the sign of the word. When the sign order contains a Zero, the number will be positive and when the sign order contains a One, the number will be negative. For a negative binary number, the complement of the absolute value of the binary number will be represented in the $2^0$ through $2^{10}$ orders or the $2^0$ through $2^{22}$ orders in the case of 24 bit words. In other words, the orders which would be Zero's and One's to represent the absolute value of the binary number will be One's and Zero's respectively, to represent a negative binary number.

The computer is a parallel machine which means that the bits of each binary word are transferred simultaneously over separate channels instead of sequentially. In general, the transfer of a single bit of a word is accomplished by a dual conductor system. When a One is to be transferred, one of the conductors is placed at plus 15 volts and the other conductor is placed at minus 30 volts. When a Zero is to be transferred, the potentials are reversed.

The information distribution unit comprises 12 stages, one stage to transfer each bit of a 12 bit word. The accumulator memory bus and the memory accumulator bus each comprise 24 stages, one stage to transfer each bit of a 24 bit word. Each stage of the information distribution unit and the memory accumulator bus comprises two conductors in accordance with the dual conductor system of the computer. Only one conductor is needed for each stage of the accumulator memory bus.

Flip-flops are frequently used to store word bits and also for general control purposes in the computer. For convenience the two stable states of each flip-flop shall be designated as the One state and the Zero state. When a flip-flop, used for the storage of a word bit, is in its One state, it will contain a One and when in its Zero state it will contain a Zero. The flip-flops of the computer generally have two outputs, and up to three inputs. The outputs shall be designated as the One and Zero outputs and produce signals in accordance with the state of the flip-flop. When either a positive or a negative pulse is applied to one of the inputs, the flip-flop will switch to the opposite state. This input shall be referred to as the complementing input. When a positive signal is applied to another of the inputs, which shall be designated the One input, the flip-flop will be put into its One state and when a positive signal is applied to the third input, which shall be designated the Zero input, the flip-flop will be put in its Zero state. When the transfer of a word bit is made to a flip-flop used for storing word bits, the conductor which is at plus 15 volts when a One is being transferred will be applied to the One input and the other conductor will be applied to the Zero input. The flip-flop will then be put in its One or Zero state in accordance with the word bit being transferred. The One output of a flip-flop used for storing word bits is designed to be at plus 15 volts and the Zero output at minus 30 volts whenever the flip-flop contains a One and vice-versa whenever the flip-flop contains a Zero so that these output potentials can be used directly in the dual conductor transfer system.

The output signals from the One and Zero outputs of the flip-flops of the computer are continuous. Sometimes, it is desirable to have a discontinuous signal which occurs only when the flip-flop switches to a particular state. Such a discontinuous signal can be obtained by differentiating the signal from the One or Zero outputs of a flip-flop. This differentiating is done by connecting a capacitor in series with the output. Such a capacitor will usually be connected at the input of the device making use of the discontinuous signal so that other devices may make use of a continuous signal from the same flip-flop output. When such a discontinuous signal is used it will be indicated symbolically in the block diagrams by a capacitor.

To simplify the terminology used to describe the computer it shall not be stated, except where it is important for an understanding of the operation of the computer, whether a signal is represented by a positive or negative voltage. In most instances, the presence of a signal shall be represented by a positive voltage and the lack of a signal by a zero or minus voltage.

The computer is designed particularly for the analysis of analogue information which has been sequentially sampled and converted to binary digital data. The digital data is stored on a tape loop which is divided lengthwise into several data blocks. All of the digital data for one sampling of the analogue data is stored in one data block and a serial number is also stored in the data block to identify the data block. This serial number usually identifies the time of the sampling. As shown in FIGURE 2, the tape loop has 14 tracks designated as tracks one through fourteen. The binary words or numbers are stored crosswise on the magnetic tape and there are places for 64 words in each data block. Each word place is referred to as a channel.

The middle two tracks, tracks seven and eight, are used to generate block pulses and clock pulses, respectively. A block pulse is generated at the dividing point between each data block and thereby distinguishes the data blocks. The block pulses are recorded on track seven of the tape loop by continuously magnetizing track seven in one direction in every other block and magnetizing track seven in the opposite direction in the alternate blocks. The change in magnetization of track seven at the dividing points between data blocks will cause a pulse to be induced in the pick-up head for track seven at each dividing point and thus the block pulses are generated. A clock pulse is generated at each channel or word place in each data block and thereby distinguishes the word places on the tape loop. The clock pulses are recorded in a manner similar to the block pulses. Alternate channels of track eight are magnetized in opposite directions. The change in magnetization on track eight between each channel will induce a pulse in the pick-up head for track eight and thus a clock pulse will be generated at each channel.

Each of the tracks one through six and nine through fourteen stores a different order of the digital words.

Track nine stores the sign of the word recorded. Tracks one through six store the orders $2^0$, $2^2$, $2^4$, $2^6$, $2^8$, and $2^{10}$ respectively and tracks 10 through 14 store the orders $2^9$, $2^7$, $2^5$, $2^3$, and $2^1$ respectively. This arrangement minimizes the error caused by skewing of the tape loop. To record a One in one of the tracks, the channel of the track is magnetized in one direction and to record a Zero, the channel of the track is magnetized in the opposite direction. Pulses will be generated in the pick-up head for a track only when there is a change from a Zero to a One or from a One to a Zero, when the pick-up head passes from channel to channel. If the change is from a Zero to a One, a positive pulse will be generated and if the change is from a One to a Zero, a negative pulse will be generated.

The very first channel or word place of each data block is used to record the serial number or time for that data block. Each data block is divided lengthwise into two sections, section A and section B. The first 32 channels of the data block comprise section A and the second 32 channels of the data block comprise section B. The digital data or information to be analyzed is initially recorded only in the sections A of each data block. The sections B of the data blocks are available to the computer as a large capacity bulk storage.

A detailed block diagram of the input output unit 11 is shown in FIGURES 3a and 3b. By putting FIGURES 3a and 3b together, the entire block diagram can be seen as a unit. The input output unit 11 comprises a magnetic tape loop transport 17, a digital printer 18, a paper tape reader 19, a digital to analogue converter 20, and storage, control and logic circuits 21 necessary for the direction of communication between the information distribution unit 15 and the input and output devices 17 through 20.

The magnetic tape loop transport machine 17 reads digital information from and records digital data on the magnetic tape loop described with reference to FIGURE 2. The magnetic tape loop transport may be of the type manufactured by Ampex, Model No. FL–100.

The paper tape reader transduces to electrical signals digital information stored in punched form on a paper tape. The paper tape reader may be of the type manufactured by Ferranti Model No. TR3.

The digital printer will print output information from the computer in digital form and may be of the type manufactured by Computer-Measurements Corporation, Model No. 400B.

The digital to analogue converter 20 at the option of the operator will convert the digital data being read out from the magnetic tape loop to analogue and the resulting analogue information is made available to the operator, for example, in graphical form. The operation of the digital to analogue converter is independent of the operation of the rest of the computer and may be put into operation at any time during the operation of the computer without disturbing the operation of the computer.

Digital data is read out from the magnetic tape loop on the tape transport 17 or by the tape reader 19 and temporarily is stored in the storage, control, and logic circuits 21. This data is then delivered to the information distribution unit 15 and to the digital to analogue converter 20 when desired. Digital data is accepted from the information distribution unit by the storage, control and logic circuits 21 and temporarily stored in the storage, control and logic circuits 21. This data is then recorded on the magnetic tape loop or printed by the digital printer 18.

The operation of the input output unit 11 is controlled by and directed from the control unit 14 by means of commands. These commands are given letter designations. These commands and their meanings are as follows:

WMT—Record the contents of the information distribution unit 15 on the magnetic tape loop in a previously selected tape channel.
RMT—Read out the contents of a previous selected tape channel and deliver the contents to the information distribution unit 15.
WPT—Print the contents of the information distribution unit 15 with the digital printer 18.
RPT—Read out the contents of the paper tape and then deliver the contents to the information distribution unit 15.
RT1—Deliver the contents of the time buffer, which is designated by the reference number 23 in FIGURE 3b, to the information distribution unit 15.

Because the times required for these various operations are not the same it is necessary that a completion pulse be generated to signify to the control unit 14 that a particular operation has been completed, and that it is proper for the computer to proceed to the next command. Two additional commands are associated with the selection of a particular magnetic tape channel for reading and writing. These commands are as follows:

WT2—Read the lower five stages of the information distribution unit 15, normally containing the orders $2^0$ through $2^4$, into the channel register, which is designated by the reference number 25 in FIGURE 3B.
IT2—Increase the contents of the channel register 25 by 1.

Because the two commands WT2 and IT2 are always accomplished in a definite known period of time, they do not require the generation of a completion pulse.

For each of the above commands, the control unit 14 will apply a signal to the input output unit 11 over a different input. Each of these inputs are designated in FIGURE 3B by the letters which designate the command which causes a signal to be applied to that input.

The operation of the input output unit will now be described. It is convenient to assume that none of the above commands have been given, that the magnetic tape is moving forward at a normal speed, and that the first channel of the first data block is passing under read heads 33. It takes approximately 31 microseconds for a channel to pass under the read heads 33. During the 31 microseconds that the first channel is being read, several operations are performed. A block pulse is induced in read head 47 for track seven of the tape loop. This block pulse is amplified by block pulse amplifier 52 and delivered through cathode follower 41 to channel counter 26. The channel counter 26 comprises a binary counting chain of five flip-flops. The block pulse sets the count registered in the channel counter 26 to 00000 and also sets flip-flop 48 to its One state. The 12 digits recorded in tracks one through six, and nine through fourteen in the first channel of the first data block are read out by the read heads 33 and transmitted to read amplifiers 30. The function of the read amplifiers 30 is to amplify the low level pulses induced in the read heads 33 and convert these pulses to the dual conductor system used by the computer for transmission of digital data. The read amplifiers 30 will produce output signals only when they also receive an enabling gate signal from cathode follower 44. The flip-flop 48 being set into its One state, produces an output signal enabling AND gate 49. Coincidence logic 27 will detect the zero count contained in the channel counter 26 and produce in response thereto, an output signal which will pass through the enabled AND gate 49, through OR gate 50 to the cathode follower 44, which applies the enabling gate signal to the read amplifiers 30. The 12 digit binary word, obtained from reading the contents of the first channel of the first data block, will then proceed from the read amplifiers 30 through a series of 24 cathode followers 42, one for each output conductor of the read amplifiers 30, to a series of 24 AND gates 62. The AND gates 62 are enabled by the output signal from the coincidence logic 27 generated in response to the channel counter 26 registering a count of 00000. The 12 digit binary word from the read amplifiers 30 passes through the AND gates 62 to time buffer 23, where the 12 digit word is registered. The time buffer 23 comprises a series of 12-flip-flops, one for storing each digit of 12 bit binary word.

Thus, the serial number of the data block 1 is entered into the time buffer 23 and may subsequently be delivered to the information distribution unit 15 at any time during the remaining period of data block 1 by the application of the command RT1. The RT1 command signal enables a series of 24 AND gates 77, allowing the word registered in the time buffer to pass through the AND gates 77, through a series of 24 OR gates 80 and a series of 24 cathode followers 81 to the information distribution unit 15. As the first channel of each data block passes by the read heads 33, the above-described sequence takes place. As a result, the time buffer 23 always contains the serial number of the data block which is currently being processed. This sequence is accomplished automatically without the direction from the control unit 14.

A function of the coincidence logic 27 is to detect a coincidence between the count registered in the channel counter 26 and the binary number stored in channel register 25. The channel register 25 comprises a series of five flip-flops for storing a 5 digit binary number. To store a binary number in the channel register, the command WT2 is given, and a signal is applied from the control unit to the WT2 input enabling a series of ten AND gates 68. The binary number existing on the lower five stages of the information distribution unit 15 will then pass through the AND gates 68 to be registered in the channel register 25. The coincidence logic 27 will produce an output signal which is applied to the Zero inputs of flip-flops 86 and 87 and to an AND gate 69 whenever the binary number in the channel register coincides with the count registered in the channel counter 26.

Part of the initialization procedure of operating the computer is to store 00000 in channel register 25. Therefore, after the block pulse has set the channel counter to 00000 there will be a coincidence between the count registered in channel counter 26 and the number registered in the channel register 25. The coincidence logic 27 detects this coincidence and in response thereto applies an output signal to flip-flop 86 and flip-flop 87 setting these flip-flops to their Zero states, thereby preparing the system for subsequent WMT and RMT commands. When the flip-flop 87 is switched to its Zero state, it causes an output signal to be applied through an OR gate 74 to a blocking oscillator 76 which applies a delayed pulse through an OR gate 71 to the read buffer 22. The read buffer comprises 12 flip-flops, one for storing each bit of a twelve bit word. The delayed pulse from the blocking oscillator 76 sets each of these flip-flops to their Zero states. An output signal from the blocking oscillator 76 is also applied through an OR gate 82 to a blocking oscillator 83, which applies a signal to the control unit 14 to indicate the completion of the sequence.

The clock pulses recorded in track eight are induced in read head 46, amplified by the clock pulse amplifier 32 and applied to the channel counter 26. With each pulse received, the count registered in the channel counter will increase by one in the conventional manner of binary counting chains. Because of the manner in which the clock and block pulses are recorded on the magnetic tape loop, the pulses induced in the read heads 46 and 47 will be alternately positive and negative. Full wave rectifiers in the clock and block pulse amplifiers 32 and 52 make all of the clock and block pulses positive.

The sequence of events pertaining to the operation of recording a word from the information distribution unit 15 will now be described. First, the number of the channel into which the word is to be recorded is placed on the lower five stages of the information distribution unit through appropriate programming. Then the command WT2 is given and a signal is applied enabling the AND gates 68. The contents of the five lower stages of the information distribution unit 15 then pass through the AND gates 68 to be registered in the channel register 25. Next, the word to be recorded is placed in the information distribution unit 15 and the command WMT is given, causing the application of a signal to the WMT input of the input output unit. This signal sets the flip-flop 86 in its One state thereby storing the WMT command. However, before the flip-flop 86 can complete its change of state the signal from the WMT input passes through AND gate 85 enabled by a signal from the Zero output of the flip-flop 86. From the AND gate 85 the signal from the WMT input passes through an OR gate 84 to actuate a blocking oscillator 78. The resulting output signal from the blocking oscillator 78 enables a series of 24 AND gates 79, allowing the 12 bit word to pass from the information distribution unit 15 to write buffer 24 where it is registered. The write buffer 24 comprises a series of 12 flip-flops for temporarily storing 12 bit binary words.

In order for information to be recorded on the magnetic tape loop, the flip-flop 48 must be in its Zero state. The signal from the Zero output of the flip-flop 48 will enable an AND gate 51. The output signal from the blocking oscillator 73 will pass through the AND gate 51 and through a cathode follower 45 to write amplifiers 31 to set the write amplifiers 31 in readiness to record. When the clock pulses applied to the channel counter 26 cause the count registered in the channel counter 26 to increase to a value which coincides with the number stored in the channel register 25, the coincidence logic 27 will produce an output signal to set the flip-flop 86 in its Zero state.

When the flip-flop 86 is set in its Zero state it applies an output signal to enable a series of 12 AND gates 67, one for each flip-flop of the write buffer 24. The One output of each flip-flop of the write buffer 24 is applied to a different one of the AND gates 67. The output signals from the write buffer 24 pass through the enabled AND gates 67 and a series of 12 cathode followers 66 to the write amplifiers 31. The function of the write amplifiers 31 is to convert the output signals from the write buffer into current pulses of the proper amplitude, polarity and timing to record on the tape loop the word registered in the write buffer when they receive an enabling signal from a cathode follower 89. The signal from the Zero output of the flip-flop 48 also enables an AND gate 88, and when the signal from the coincidence logic is produced in response to the count in the channel counter 26 coinciding with the number registered in the channel register 25, it will pass through the enabled AND gate 88, through the cathode follower 89 to enable the write amplifiers 31. In response thereto, the write amplifiers 31 will apply current pulses to the write heads 34, to record the word stored in the write buffer 24. Thus, the binary word is recorded in the selected channel of the magnetic tape loop. The flip-flop 86 upon switching to its Zero state applies an output signal through the OR gate 82 to the blocking oscillator 83. In response thereto, the blocking oscillator 83 generates a pulse which is applied to the control unit 14. This signal signifies to the control unit 14 that the WMT command has been carried out and that the program may proceed to the next step.

A similiar sequence of operation takes place in reading out a selected channel of the magnetic tape loop to the information distribution unit 15. As in the case of recording on the magnetic tape loop, the number of the selected channel is placed on the lower five stages of the information distribution unit and is then entered in the channel register 25. This operation is carried out in exactly the same manner as in recording. After the entry of the desired channel into the channel register 25, the command RMT is given and a signal is applied to the One input of the flip-flop 87. This signal switches the flip-flop 87 to its One state. The flip-flop 87, upon switching to its one state, generates an output signal passing through the OR gate 71 setting the flip-flops of the read buffer 22 to Zero. In order for the read operation to be carried out, the flip-flop 48 must be in its One state. When the flip-flop 48 is in its One state, it will apply an output signal to enable the AND gate 69. When the selected channel of the tape loop passes the read heads 33, the count of clock pulses registered in the channel counter 26 will coincide with the number registered in the channel register 25. In response to this coincidence, the coincidence logic circuit 27 will produce an output signal, which will be applied through the AND gate 69 through the OR gate 50, and through the cathode follower 44 to enable the read amplifiers 30. In response to this gating signal, the read amplifiers amplify the low level signals read out from the selected channel on the magnetic tape loop and convert these signals to the dual conductor system. The resulting output from the read amplifiers 30 passes through the cathode followers 42, to a series of 24 AND gates 60. The AND gates 60 will be enabled by a signal from an inverter 61, which produces an output signal whenever it does not receive a signal from the coincidence logic 27 in response to the channel counter 26 containing a count of 00000. Thus, the AND gates 60 will be enabled for all channels except the first channel and the 12 bit binary word from the read amplifiers 30 will pass through the AND gates 60, through a series of 24 OR gates 59 to be registered in the read buffer 22. Thus, the word from the selected channel of the magnetic tape loop is registered in the read buffer 22.

The output signal from the coincidence logic 27 in response to a coincidence existing between the count in the channel counter 26 and in the number in the channel register 25 also causes the flip-flop 87 to switch to its Zero state. Upon switching to its Zero state, the flip-flop 87 will apply an output signal through the OR gate 74 to actuate the blocking oscillator 76. The output pulse from the blocking oscillator 76 enables a series of 24 AND gates 75. The contents of the read buffer 24 passes through the enabled AND gates 75, the OR gates 80 and the cathode followers 81 to the information distribution unit 15. The blocking oscillator 76 output pulse also passes through the OR gate 82 to energize the blocking oscillator 83, which, in turn, generates a pulse which is applied back to the control unit 14 signifying that the RMT command has been carried out.

When it is desired to increase the contents of the channel register by one the command IT2 is given. When this command is given, a signal will be applied to the channel register which in response thereto will increase the number registered therein by one in the manner of an ordinary binary counter.

In the above explanation it has been pointed out that the flip-flop 48 must be in its One state for the computer to read data from the magnetic tape loop. The flip-flop 48 will be switched to its One state by the block pulses. When the channel counter contains a count of 31 or registers 11111 the coincidence logic will apply an output signal to switch the flip-flop 48 to its Zero state. Thus, when the tape is running in a forward direction, the flip-flop 48 is conditioned for a read operation in section A of each data block of the tape loop and for a write operation in section B of each data block of the tape loop. To read out the data in section B and record in section A, the direction of the tape loop is reversed by a signal from the control unit. When the direction of the tape loop is reversed, the flip-flop 48 will be conditioned by the block pulses and by the signals from the coincidence logic in response to the channel counter containing 11111 for a read operation in section B and a write operation in section A. When the direction of the tape loop is reversed, the connections to the read heads 29 and write heads 34 must be reversed to maintain the polarity of the recorded and reproduced signals. This reversal of connections is carried out automatically by a complementing switch not shown in response to the signal for causing a reversal of tape loop direction. It is also necessary to reverse some of the connections of the channel register 25 so that the number registered in the channel register decreases by one in response to the command IT2 rather than increases.

When it is desired to print an output by means of the digital printer 18, the word to be printed is first put on the information distribution unit 15. Then the command WPT is given and a signal is applied to the WPT input of the input output unit 11. This signal passes through the OR gate 84 to energize the blocking oscillator 78. The blocking oscillator 78 in response thereto, generates an output pulse which enables the AND gates 79. The word on the information distribution system then passes through the AND gates 79 and is registered in the write buffer 24. The signal applied to WPT input also switches flip-flop 72 to its One state. The resulting output signal from the flip-flop 72 enables a series of 12 AND gates 65 and the word registered in the write buffer 24 passes through the AND gates 65 and through a series of 12 cathode followers 64 to binary-octal switch 38 in the digital printer 18, and from there the word is passed to the printer 39. The function of the binary-octal switch 38 is to switch the inputs to the digital printer so that the printer selectively either prints a binary output or an octal output. Upon switching to its One state, the flip-flop 72 also applies a signal through cathode follower 63 to the printer 39 and initiates the printing operation. Accordingly, the printer 39 prints the applied word from the binary-octal switch 38. Upon completion of the printing operation the printer 39 generates a signal which passes through a cathode follower 43 and switches the flip-flop 72 back to its Zero state. Upon switching to its Zero state, the flip-flop 72 applies a signal through the OR gate 82 to energize the blocking oscillator 83. The output signal from the blocking oscillator 83 is applied to the control unit 14 to indicate to the control unit that the WPT command has been completed.

The paper tape sensed by the paper tape reader has seven tracks and a sprocket hole output. Six of these tracks are used to store digital data and the seventh track and the sprocket hole output are used for control purposes. A 12 digit word is stored by using two read positions on the paper tape. The first position is used to store the upper 6 digits and the second word position is used to store the lower 6 digits. One's are stored on the paper tape by the presence of a hole and Zero's are stored by the absence of a hole. By using photocells to sense the paper tape a signal will be generated when a One is stored for each read position for each track and no signal will be generated when a Zero is stored.

In order to carry out the operation of reading information from the paper tape by means of the paper tape reader 19, a signal from the RPT input is applied through an OR gate 71 to set the flip-flops of the read buffer to Zero and through a cathode follower 70 to start the tape drive mechanism 35. The signal from the cathode follower 70 also switches a flip-flop 37 to its Zero state. When in its Zero state, the flip-flop 37 generates a continuous output signal to enable a series of six AND gates 53 and the six digits from the first read position of the paper tape are read out and amplified by the tape sensors and amplifiers 36 and pass through the AND gates 53, through a series of six cathode followers 56, and through six of the OR gates 59 to be registered in the flip-flops of the read buffer 22 which normally store the upper six orders of a 12 digit number. As the next read position passes the tape sensor, the sprocket hole output from the tape sensor and amplifier 36 causes the flip-flop 37 to switch to its opposite state. The flip-flop 37 will then be in its One state and will generate a continuous output signal to enable a series of six AND gates 54. At the same time, the six digits from the second read position will be read out and amplified and pass through the AND gates 54, through a series of six cathode followers 58, and through another six of the OR gates 59 to be stored in the flip-flops of the read buffer 22 which normally store the lower six orders of a 12 digit number. The outputs from the cathode followers 56 and 58 are applied through those OR gates of the series 59 which go to the One inputs of the flip-flops of the read buffer. Those flip-flops of the read buffer 22 which receive signals from the tape reader will be put in their One states while those which do not receive signals will remain in their Zero states and thus the word read out from the paper tape will be registered in the read buffer 22. The next sprocket hole output from the tape amplifier 36 causes the flip-flop 37 again to switch to its Zero state.

When the flip-flop 37 is switched to its Zero state, it will generate an output signal designated PTW which is applied through a cathode follower 55 back to the control unit 14 for use in programming operations. Similarly, when the flip-flop 37 is switched to its One state, it will generate an output signal designated PTW alternate which is applied through a cathode follower 57 back to the control unit 14 for use in programming operations. The PTW output signal is also applied through the OR gate 74 to energize the blocking oscillator 76 (see FIGURE 3b). The output pulse from the blocking oscillator 76 enables the AND gates 75 and the 12 digit word from the paper tape registered in the read buffer 22 passes through the AND gates 75, through the OR gates 80, and through the cathode followers 81 to the information distribution unit 15. The output pulse from the blocking oscillator 76 is also applied through the OR gate 82 to energize the blocking oscillator 83 which produces an output pulse to indicate to the control unit 14 that the paper tape reading operation has been completed. A delayed output from the blocking oscillator 76 passes through the OR gate 71 to set the flip-flops of the read buffer to Zero. The output from the seventh track of the paper tape is used to control the stopping of the paper tape. Thus, if only one 12 digit word is to be read out from the paper tape, a signal generated from the position following the second read position of the seventh track would be applied back to the tape device mechanism to stop the travel of the paper tape. The command RPT can also be used to signal the reading out of a block of words from the paper tape. A hole will not be present in the seventh track until all of the block of words have been read out. The commands of the computer, controlling the addresses to which the words from the paper tape will be sent, will be initiated by the PTW and alternate PTW signals from the paper tape reader under these circumstances.

Although data from the magnetic tape loop and from the paper tape unit is ordinarily read into the information distribution unit, it is frequently desirable to obtain an analogue representation of a particular data word or group of words without interrupting or altering the normal operation of the computer. Accordingly, the One output of each flip-flop of the read buffer 22 is connected through a set of 12 cathode followers 73 to the digital to analogue converter 20. The digital to analogue converter 20 then converts this digital data into an analogue signal. The digital to analogue converter can be operated independently at any time during the operation of the computer.

FIGURE 4 illustrates the details of the circuitry for one of the read amplifiers 30 for one of the data tracks of the magnetic tape loop. The circuitry for all of the read amplifiers 30 is the same. The pulses induced in one of the read heads 33 are applied to the terminal 1001 and from the terminal 1001 to an emitter follower stage of the amplifier comprising an NPN transistor 1002. The output from the emitter follower stage comprising the transistor 1002 is applied to four stages of amplification comprising NPN transistors 1003 through 1006. The output from the amplifier stage comprising the transistor 1006 is applied to an emitter follower stage comprising an NPN transistor 1007. The output from the emitter follower comprising transistor 1007 is applied to the primary winding of the transformer 1008. The secondary winding of the transformer 1008 is center tapped. One-half of the secondary winding is applied between the emitter and base of an NPN transistor 1009 through a rectifier 1010. The other half of the secondary winding of the transformer 1008 is applied between the emitter and base of an NPN transistor 1011 through a rectifier 1012. The transistors 1009 and 1011 are connected into a conventional flip-flop circuit which we shall designate as the flip-flop 1013.

When positive pulses are applied to the terminal 1001 from one of the read heads 33, caused by the read head passing from a channel in which a Zero is stored to one in which a One is stored, it will be amplified through the emitter follower stages and amplification stages comprising the transistors 1002 through 1007, and applied to the transformer 1008. This will cause a pulse to be applied between the base and emitter of the transistor 1009 making the base negative with respect to the emitter. The rectifier 1012 prevents the base of the transistor 1011 from being made positive with respect to its emitter. As a result, the flip-flop 1013 will be switched in the conventional manner to the stable state whereby the transistor 1009 is not conducting and the transistor 1011 is conducting. When a negative pulse is applied to the terminal 1001, caused by the read head passing from a channel in which a One is stored to a channel in which a Zero is stored, this negative pulse is amplified through the stages comprising the transistors 1002 and 1007 and applied to the primary winding of the transformer 1008. As a result, a negative pulse will be applied to the base of the transistor 1011 with respect to its emitter and the flip-flop 1013 will be switched to the state whereby the transistor 1009 is conducting and the transistor 1011 is not conducting. Thus, the flip-flop 1013 will be switched to a stable state whereby the transistor 1009 is not conducting whenever the read head, whose output is applied to the particular read amplifier, passes from a channel in which a Zero is stored to a channel in which a One is stored. Likewise, the flip-flop 1013 will be switched to the stable state in which the transistor 1011 is not conducting whenever the read head passes from a channel in which a One is stored to a channel in which a Zero is stored.

The stable state of the flip-flop 1013 in which the transistor 1009 is not conducting, shall be referred to as the One state and the stable state in which the transistor 1011 is not conducting shall be referred to as the Zero state. The flip-flop 1013 then will always be in its One state whenever the read head is passing over a channel in which a One is stored and the flip-flop will always be in its Zero state whenever the read head is passing over a channel in which a Zero is stored.

Power is supplied to the transistors 1002 through 1007, and 1009 and 1011 from conductors 1014 and 1015. The conductor 1015 is grounded and a positive D.C. potential is applied to conductor 1014.

When the flip-flop 1013 is in its One state it will supply a relatively high potential to the base of a transistor 1016 from the collector of the transistor 1009 through a resistor 1017. When the flip-flop 1013 is in its Zero state a relatively low potential will be applied to the base of the transistor 1016. Similarly, the potential of the collector of the transistor 1011 is applied to the base of the transistor 1018 over a resistor 1019 and the flip-flop 1013 will therefore apply a relatively high potential to the base of the transistor 1018 when it is in its Zero state and a relatively low potential when it is in its One state. Power is applied to the transistors 1016 and 1018 by a D.C. source connected between conductors 1020 and 1014 with the positive side of the D.C. source connected to conductor 1020.

It will be evident that regardless of which state the flip-flop 1013 is in, the potential applied to the bases of the transistors 1016 and 1018 from the collectors of the transistors 1009 and 1001 respectively will be below the emitter potential of these transistors and accordingly these transistors normally will not conduct. If, however, a read gate signal is applied over conductor 1021 then one of the transistors 1016 and 1018 which receives the relatively high potential from the flip-flop 1013 will conduct as a result of the combined effect. The read gate signal is the signal applied to the read amplifiers 30 from the cathode follower 44. The other one of the transistors 1016 and 1018 will not conduct because the relatively low voltage applied from the flip-flop 1013 in combination with the gating potential applied on conductor 1021 will be insufficient to cause this transistor to conduct. Thus, when the flip-flop 1013 is in its One state and an enabling gate signal is applied on conductor 1021 the transistor 1016 will conduct and the transistor 1018 will not conduct, whereas when the flip-flop 1013 is in its Zero state the transistor 1018 will conduct when a read gate signal is applied and the transistor 1016 will not conduct.

The signal developed at the collector of the transistor 1016 is applied to the base of a PNP transistor 1022 while the signal developed at the collector of the transistor 1018 is applied to the base of a PNP transistor 1023. Power is applied to the transistors 1022 and 1023 from conductors 1024 and 1015 by connecting a positive D.C. potential to the conductor 1024. When the transistor 1016 conducts as a result of the flip-flop 1013 being in its One state and a read gate signal applied on conductor 1021, the collector potential of the transistor 1016 will drop and this drop in potential when transmitted to the transistor 1022 will cause this transistor to start conducting. Similarly, when the flip-flop 1013 is in its Zero state and a read gate signal is applied on conductor 1021, the transistor 1023 will conduct. The transistors 1022 and 1023 will not conduct when the transistors 1016 and 1018 respectively do not conduct. The potential produced at the collector of each of the transistors 1022 and 1023 will be zero when such transistor is not conducting and when one of these two transistors conducts it will produce a 45 volt potential at its collector.

The potential from the collector of the transistor 1023 is applied through a resistor capacitor network comprising a capacitor 1025 and a resistor 1026 to an output conductor 1027. The potential developed at the collector of the transistor 1022 will be applied through a resistor capacitor network comprising a capacitor 1030 and a resistor 1028 to an output conductor 1029. The resistors 1026 and 1028 are connected in common to a conductor 1031 to which a potential of minus 30 volts is applied so that when the transistor 1023 does not conduct the conductor 1027 will be at minus 30 volts and when the transistor 1022 does not conduct the conductor 1029 will be at minus 30 volts. When the transistor 1022 or the transistor 1023 conducts, the respective one of the conductors 1027 or 1029 will be at plus 15 volts. Thus, each time an enabling gate signal is applied over conductor 1021 one of the conductors 1027 or 1029 will rise to plus 15 volts depending upon the state of the flip-flop 1013 which in turn depends upon whether a Zero or One is being read by the read head. If a Zero is being read, the conductor 1027 will be a plus 15 volts and the conductor 1029 will be at minus 30 volts. If a One is being read, these potentials will be reversed.

Figure 5:
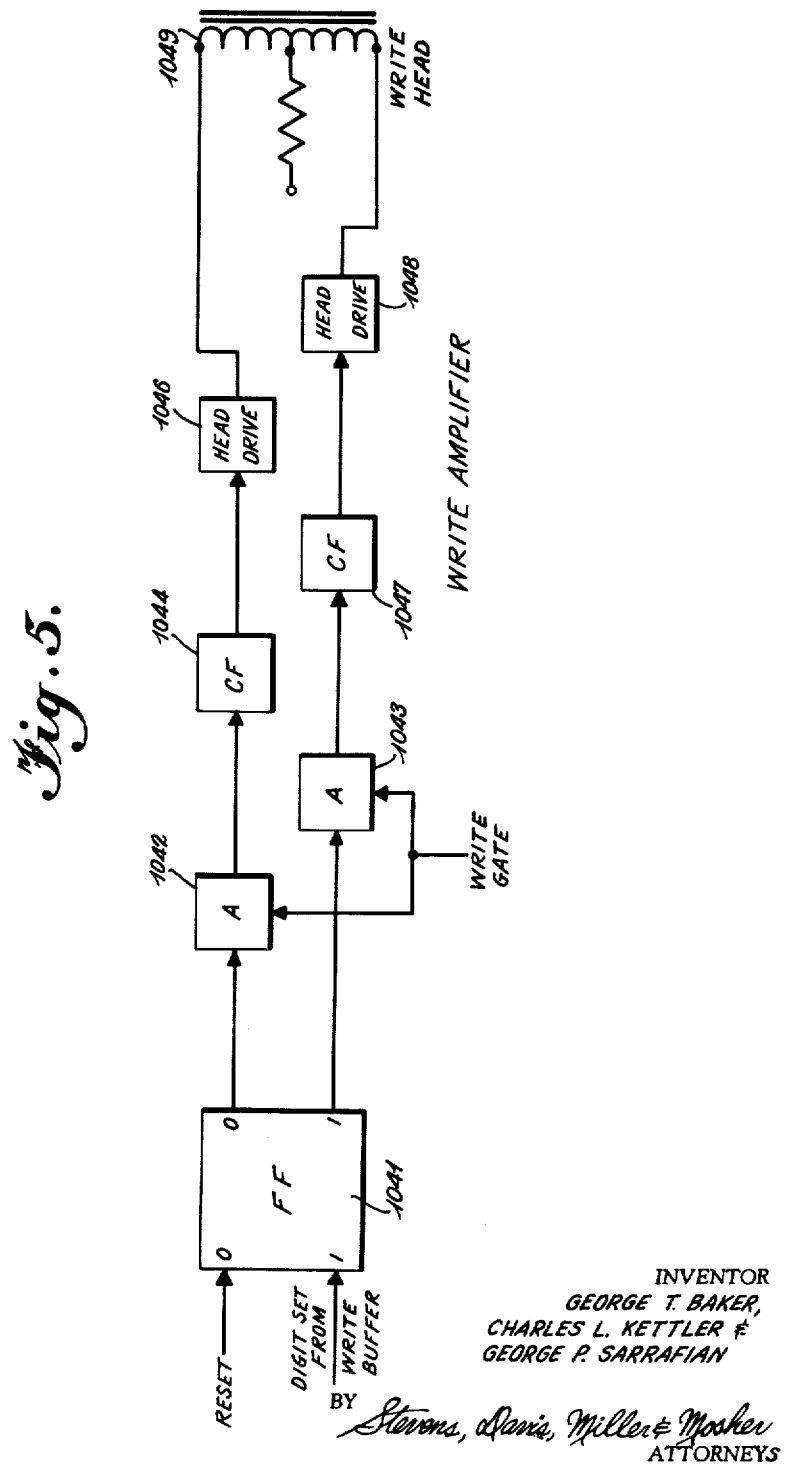
FIGURE 5 shows the details in block form of one of the write amplifiers of the computer used to record inforation on the magnetic tape loop.

Each of the write amplifiers 31 are identical to the one illustrated in FIGURE 5. As shown in FIGURE 5, the write amplifier comprises a flip-flop 1041, two AND gates 1042 and 1043, two cathode followers 1044 and 1047, and two head drive circuits 1046 and 1048. When a recording operation is to be carried out, a signal will be applied to the Zero input of the flip-flop 1041, setting it in its Zero state. This signal is the signal applied from the cathode follower 45. Then if the write amplifier is to record a One in its respective track, a signal will be applied to the One input of the flip-flop 1041, switching the flip-flop 1041 to its One state. This signal will be applied from one of the cathode followers 66. If a Zero is to be recorded, no signal will be applied and the flip-flop 1041 will remain in its Zero state.

The Zero output from the flip-flop 1041 is applied to the AND gate 1042. The One output is applied to an AND gate 1043. When the selected channel appears under the write heads an enabling signal will be applied to the AND gates 1042 and 1043. This signal is the signal applied from cathode follower 89. If the flip-flop 1041 is in its One state, when the enabling signal is applied to AND gates 1042 and 1043, a signal will be applied from the One output of the flip-flop 1041 through the AND gate 1043, through the cathode follower 1047 to the head drive circuit 1048. The head drive circuit 1048 converts the signal into a current pulse which is applied to the head winding 1049 on one of the write heads 34. The winding 1049 is center tapped and the current pulse from the head drive 1048 is applied to one-half of the center tapped winding to record a One in the selected channel of the tape loop. If the flip-flop 1041 is in its Zero state when the enabling signal is applied to AND gates 1042 and 1043, an output signal will pass from the Zero output of the flip-flop 1041 through the AND gate 1042, through the cathode follower 1044, to the head drive circuit 1046 which converts the signal to a current pulse. The current pulse from the head drive circuit 1046 is applied to the other half of the write head winding 1049 to record a Zero in the selected channel of the tape loop.

Figure 6:
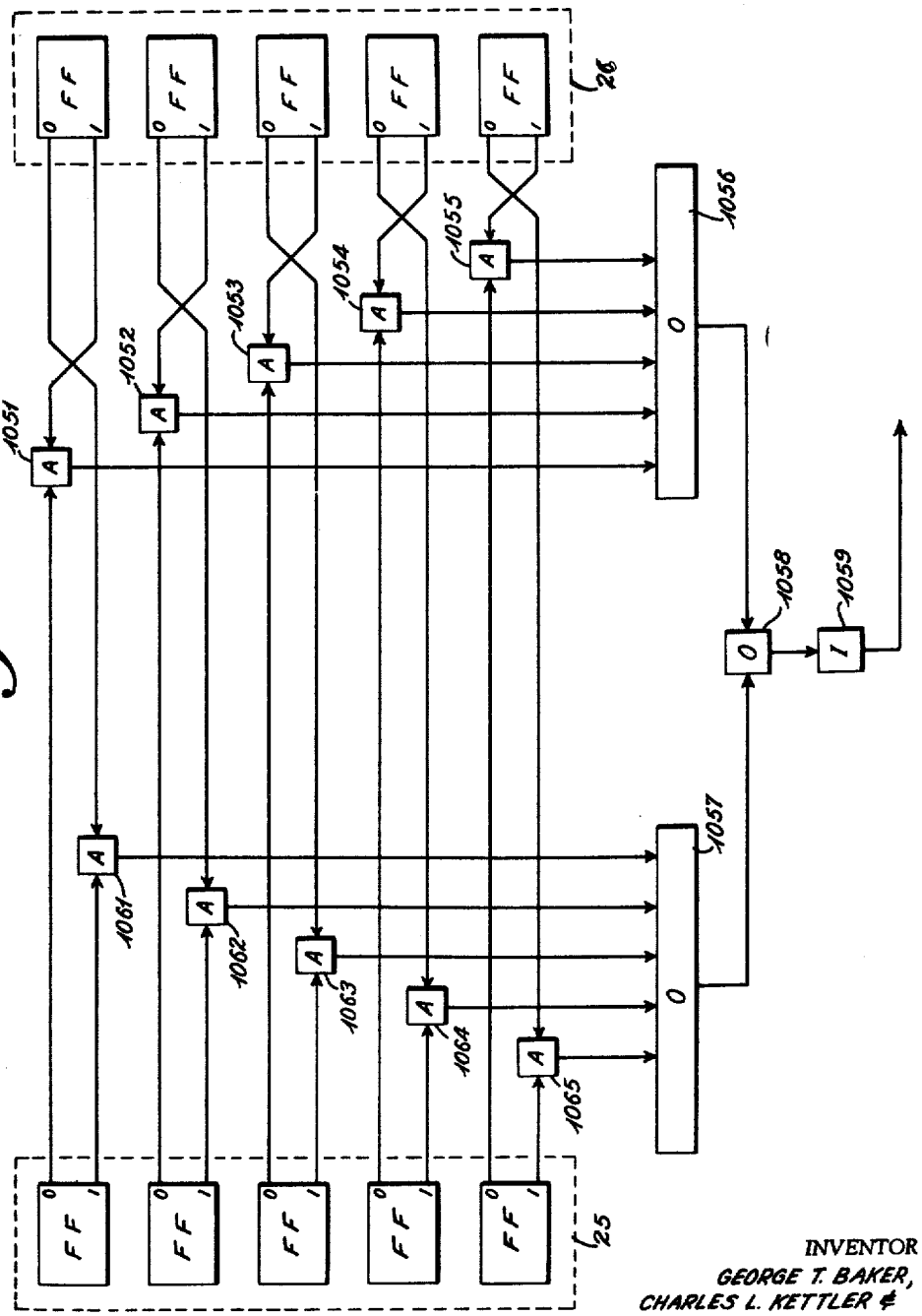
FIGURE 6 illustrates in block form the details of the coincident logic in the input output unit of the computer used to control the reading of information from and the recording of information in selected addresses of the magnetic tape loop.

FIGURE 6 illustrates the details of part of the coincidence logic 27. As is stated above, one of the functions of the coincidence logic is to generate an output signal whenever a coincidence is obtained between the count registered in the channel counter 26 and the number registered in the channel register 25. As shown in FIGURE 6, the Zero outputs of the five flip-flops of the channel register 25 are applied to five AND gates 1051 through 1055 respectively. The One outputs of the five flip-flops of the channel counter 26 are applied to the AND gates 1051 through 1055 respectively. The One outputs of each of the five flip-flops of the channel register 25 are applied to AND gates 1061 through 1065 respectively and the Zero outputs of the five flip-flops of the channel counter are applied to the AND gates 1061 through 1065 respectively. Each of the AND gates 1051 through 1055 and 1061 through 1065 will produce an output signal when it receives output signals from both the channel register 25 and the channel counter 26. The outputs from the AND gates 1051 through 1055 are applied through a five way OR gate 1056 through an OR gate 1058 to the input of an inverter 1059. The outputs from the AND gates 1061 through 1065 are applied through a five way OR gate 1057, through the OR gate 1058 to the input of the inverter 1059. The inverter 1059 will produce an output signal whenever it does not receive a signal applied to its input. The only time that no signal will be applied to the input of the inverter 1059 will be when none of the AND gates 1051 through 1055 and 1061 through 1065 will produce an output signal and this circumstance will only occur when a coincidence exists between the count registered in the five flip-flops of the channel counter and the number stored in the channel register. Thus, the inverter 1059 will produce an output signal when this coincidence occurs. The output from the inverter 1059 is the output from the coincidence logic 27 which is applied to the Zero inputs of the flip-flops 86 and 87 and to the AND gates 69 and 88. The outputs from the coincidence logic, which are produced when the channel counter contains 00000 and 11111, can be obtained applying the outputs of the channel counter to conventional logic circuitry.

The Computer-Measurements Corporation Model 400B digital printer, designated 39 in FIGURE 3a, is designed to print in the decimal system. It has 12 digit outputs. Each digit output has four binary inputs, which shall be designated the $2^0$, $2^1$, $2^2$, and $2^3$ inputs. Signals on the $2^0$, $2^1$, $2^2$, and $2^3$ inputs represent the $2^0$, $2^1$, $2^2$, and $2^3$ orders, respectively, of a binary number. Each digit output prints a number from 0 to 9 equal to the binary number represented by the signals on its input.

Figure 7:
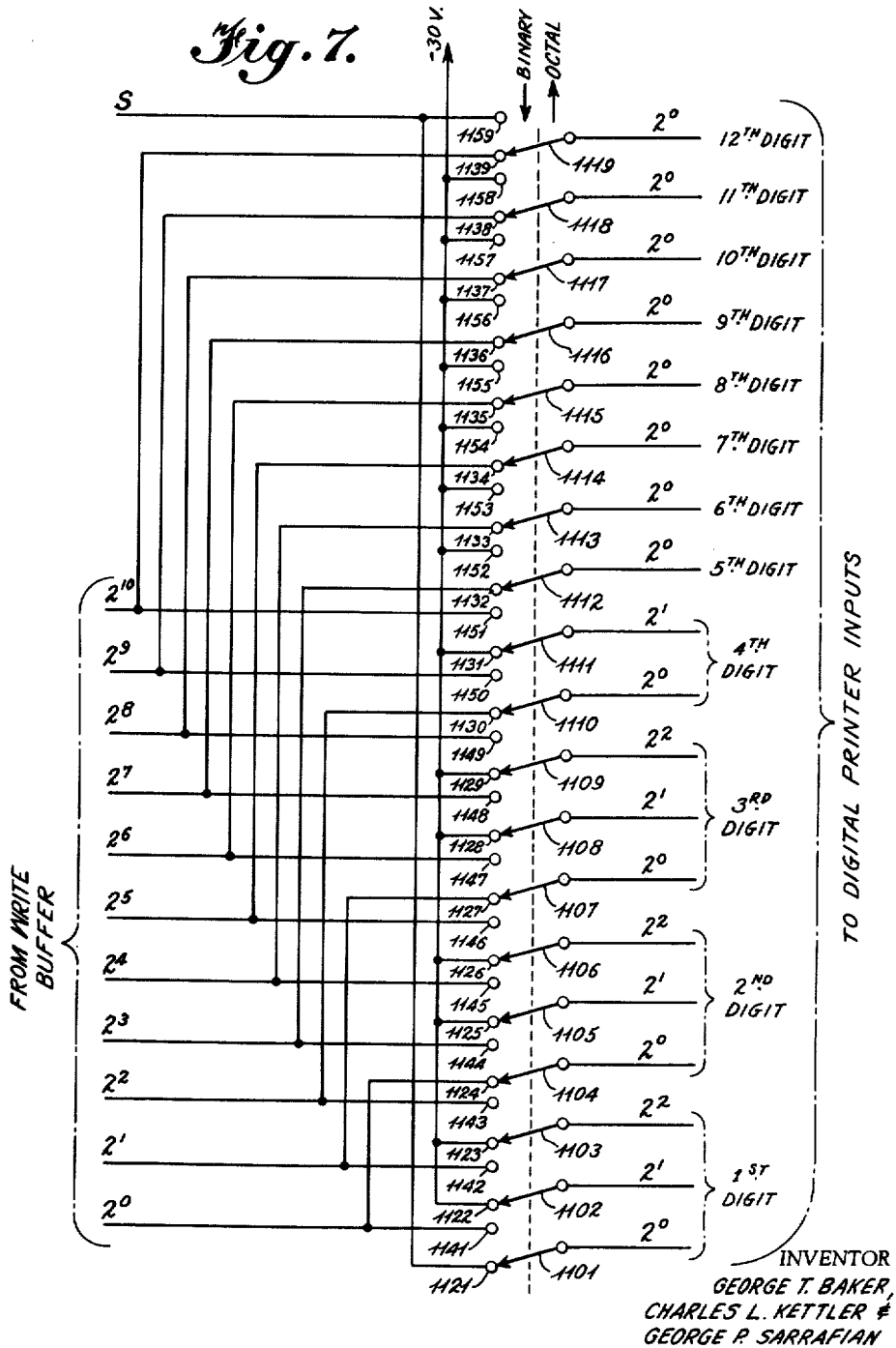
FIGURE 7 illustrates the details of the binary-octal switch which is used in conjunction with a printer in the input output unit to control the output of the printer to be either in the binary or octal system.

FIGURE 7 illustrates the details of the binary-octal switch 38 which codes the inputs to the printer 39 so that it will selectively print either in the binary or octal system instead of the decimal system. As shown in this figure, the switch is a double throw switch comprising 19 poles 1101 through 1119. When the switch is in the position shown in FIGURE 7, the poles 1101 through 1119 will engage the contacts 1121 through 1139. With the switch in this position, the printer 39 will print in the binary system. When the switch is in its other position, the poles 1101 through 1119 will engage the contacts 1141 through 1159 respectively and with the switch in this position the printer will print in the octal system. The One outputs of the flip-flops of the write buffer which normally store the orders $2^0$ through $2^{10}$ are applied through the AND gates 65 and the cathode followers 64 to the contacts 1141 through 1151 respectively. The One outputs of the flip-flops normally storing the $2^0$, $2^1$, and $2^2$ orders are also applied to the contacts 1124, 1127, and 1130 respectively. The One outputs of the flip-flops normally storing the orders $2^3$ through $2^{10}$ are also applied to the contacts 1132 through 1139 respectively. The One output of the flip-flop normally storing the sign is applied to the contacts 1159 and 1121. A potential of minus 30 volts is connected to contacts 1122, 1123, 1125, 1126, 1128, 1129, 1131 and 1152 through 1158. The poles 1101 through 1119 are connected to the inputs of the digital printer. The poles 1101, 1102, and 1103 are connected to the $2^0$, $2^1$, and $2^2$ inputs, respectively, of the first (least significant) digit output. The poles 1104, 1105, and 1106 are connected to the $2^0$, $2^1$, $2^2$ inputs, respectively, of the second digit output. The poles 1107, 1108, and 1109 are connected to the $2^0$, $2^1$, and $2^2$ inputs, respectively, of the third digit output. The poles 1110 and 1111 are connected to the $2^0$ and $2^1$ inputs, respectively, of the fourth digit output. The poles 1112 through 1119 are connected to the $2^0$ inputs of the fifth through twelfth digit outputs, respectively. Minus 30 volts is permanently connected to the $2^3$ inputs of each of the digit outputs, to the $2^2$ inputs of the fourth through twelfth digit outputs, and to the $2^1$ inputs of the fifth through twelfth digit outputs. With these connections, the digital printer will print in the binary system if the switch is in the position shown in FIGURE 7 with the sign of the printed binary numbers being represented by the number printed by the first digit output. If the switch is in its other position, the digital printer will print in the octal system with the sign of the number being represented by the number printed by the twelfth digit output.

Figure 8:
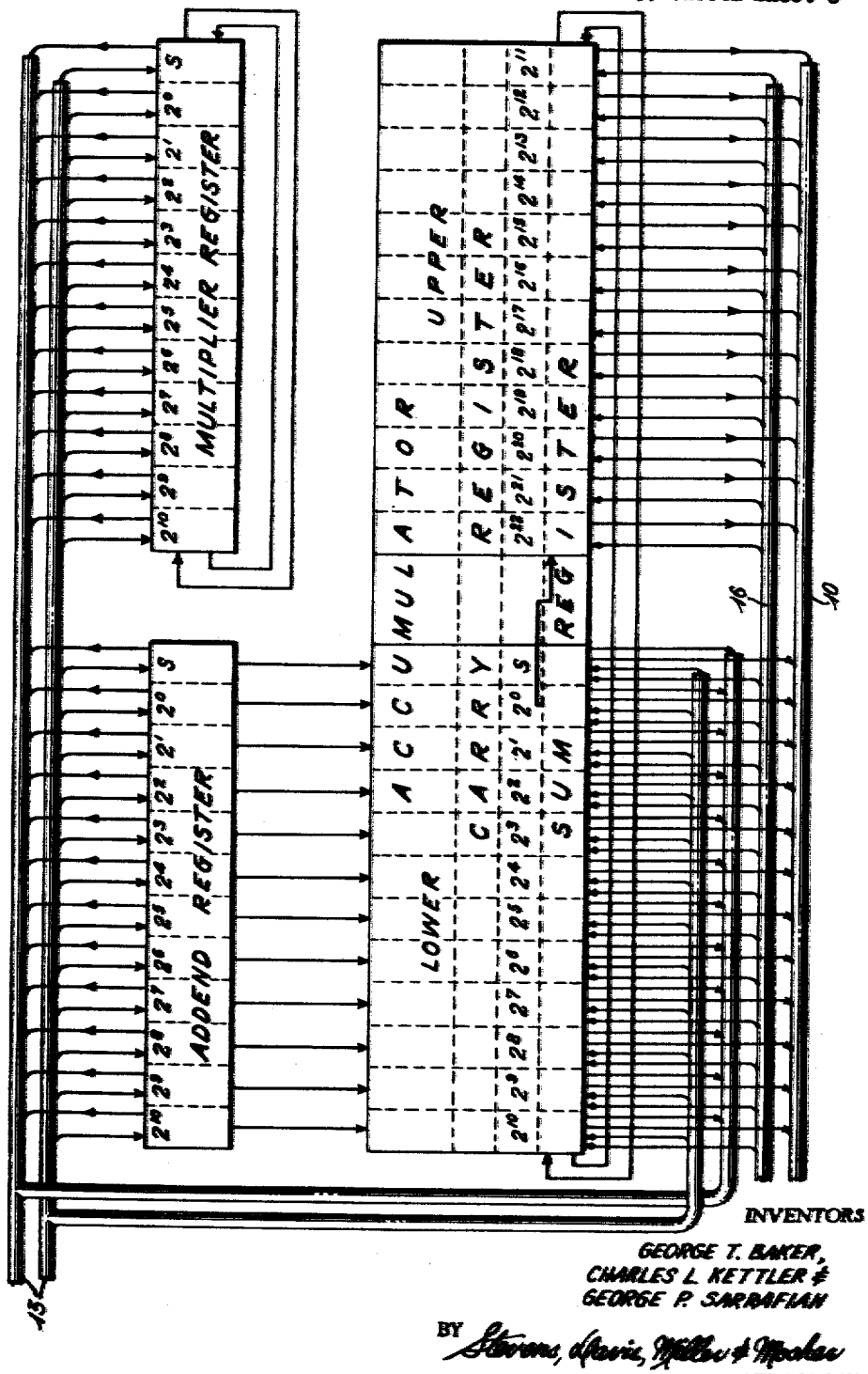
FIGURE 8 illustrates the arithmetic unit of the computer in block form.

The arithmetic unit 12 as shown in the block diagram of FIGURE 8 comprises three primary components, the addend register, the multiplier register and the accumulator. The addend and multiplier registers each comprise 12 stages, each stage comprising a flip-flop. 12 bit binary words can be stored in each register with each of the 12 flip-flops storing a different bit of the binary word. The accumulator has 24 stages and comprises two separate registers, a sum register and a carry register. Both the sum register and the carry register comprise 24 flip-flops with one flip-flop each in each stage of the accumulator. 24 bit words may be stored in the sum register with each flip-flop storing a separate bit.

The flip-flops of the sum, multiplier and addend registers are designated by the order of the binary number which they normally store. For example, the flip-flop of the addend register which normally stores the $2^0$ order of a binary number is designated the $2^0$ flip-flop. The flip-flops of the multiplier, addend, and sum registers which store the word bit indicating the sign of the binary number are designed S. Each of the flip-flops of the carry register is designated the same as the flip-flop of the sum register which is in the same stage of the accumulator. 12 bit binary words may be transferred to the addend register or the multiplier register from the information distribution unit 15. The commands for these operations are designated WAD and WMQ respectively. 12 bit binary words may be transferred to the sum register from the information distribution unit 15. The command for this operation is WAL. When such a transfer is made, each word bit will be stored in its normal position in the $2^{10}$ through $2^0$ and S flip-flops of the sum register. These flip-flops and the flip-flops of the carry register in the same stages of the accumulator shall be referred to as the lower sum register and the lower carry register respectively. The remaining halves of these registers shall be referred to as the upper sum register and the upper carry register respectively. The half of the accumulator which comprises the upper sum and carry registers shall be referred to as the upper accumulator and the half which comprises the lower sum and carry registers shall be referred to as the lower accumulator. 12 digit words can be transferred from the multiplier register, the addend register, and the lower sum register to the information distribution unit 15. These operations are carried out in response to commands designated RMQ, RAD and RAL, respectively. Words of a size, including 24 bit words, can be transferred to the sum register from the memory accumulator bus 10. The command for this operation is designated WAC. Similarly, 24 bit words can be transferred from the sum register to the accumulator memory bus 16. The command for this operation is designated RAC.

The word stored in the sum register, the multiplier register, or the addend register can be complemented. This takes place when all of the One's of a binary number are changed to Zero's and all of the Zero's are changed to One's. The commands for these operations are designated CSU, CMQ and CAD, respectively.

The binary word stored in the multiplier register may be multiplied by 2 or divided by 2. These operations are carried out by shifting the stored word so that each bit of the word moves to the flip-flop storing the next higher order or to the flip-flop storing the next lower order, respectively. Such operations shall be referred to as shifting left and shifting right, respectively. The commands for shifting the multiplier register left and right are SML and SMR, respectively. The sum register may be shifted right in response to the command SSR. The sum register may be shifted to the left in response to the command SSL. In these operations the S flip-flop is considered the lowest flip-flop storing the highest order bit and normally when a shift left occurs the bit stored in the S flip-flop is transferred to the $2^0$ flip-flop and when a shift right occurs the S bit is transferred to the $2^{10}$ flip-flop. The shift operations in the multiplier register are circular. That is, the bit stored in the end flip-flop of the register towards which the shift occurs will be transferred to the flip-flop at the opposite end of the register. For example, if the multiplier register is shifted left the bit stored in the $2^{10}$ flip-flop of the multiplier register will be transferred to the S flip-flop of the multiplier register. The operation to shift the sum register right is also circular except that the S flip-flop is skipped. Thus when the command SSR is given, the bit stored in the $2^0$ flip-flop of the sum register will be transferred to the $2^{22}$ flip-flop. The operation for shifting the sum register left is not circular. Thus the digit shifted out of the $2^{22}$ flip-flop when the command SSL is given will be lost. If the number stored in the sum register is positive, Zero's will be shifted into the $2^0$ flip-flop when the command SSL is given and One's will be shifted into the $2^0$ flip-flop if the number is negative. This operation is accomplished by merely setting the $2^0$ flip-flop in accordance with the bit stored in the S flip-flop. The flip-flop retains the same stored bit after each command SSL because no new bit is shifted into the S flip-flop.

The word stored in the addend register can be directly added to the word stored in the accumulator with the result stored in the accumulator. When the addition is carried out the carry register is used in a stored carry operation. In a stored carry operation the carries resulting from the addition are stored in a separate register instead of being immediately added to the next higher order of the register. For example, if there is a One stored in the $2^0$ flip-flop of the addend register and the $2^0$ flip-flop of the sum register and a Zero stored in the $2^0$ flip-flop of the carry register before addition, then after addition the $2^0$ flip-flop of the sum register will contain a Zero and the $2^0$ flip-flop of the carry register will contain a One. If before addition the $2^0$ flip-flop of the carry register also contains a One, then after addition the flip-flops of both the sum and carry registers will contain a One. The $2^1$ through $2^{10}$ and S flip-flops of the addend, sum and carry registers operate exactly like the $2^0$ flip-flops in carrying out the stored carry addition operation. In addition to the two described conditions preceding addition there are six other possible conditions prior to addition. Table I gives all eight of the possible conditions for flip-flops which normally store the same order before addition and the results obtained after addition in these flip-flops. The flip-flops which normally store the same order of a binary number shall be referred to as corresponding flip-flops.

Table I

| Conditions before addition in corresponding flip-flops | | | Results after addition in corresponding flip-flops | |
|---|---|---|---|---|
| Addend register | Sum register | Carry register | Sum register | Carry register |
| 0 | 0 | 0 | 0 | 0 |
| 1 | 0 | 0 | 1 | 0 |
| 0 | 1 | 0 | 1 | 0 |
| 0 | 0 | 1 | 1 | 0 |
| 1 | 1 | 0 | 0 | 1 |
| 1 | 0 | 1 | 0 | 1 |
| 0 | 1 | 1 | 0 | 1 |
| 1 | 1 | 1 | 1 | 1 |

The corresponding flip-flop in the addend register of course does not change after addition. When an addition operation is being carried out all of the flip-flops of the lower sum and carry registers are set in accordance with Table I. The sum and carry register flip-flops of the upper accumulator are set in accordance with Table I as if there were all Zero's in what would be the corresponding flip-flops of the addend register. Thus, during the operation of the computer the number stored in the accumulator may be represented by both the contents of the carry register and the sum register. The command for the addition operation is designated ADD.

Following the addition process the carry register may be emptied. That is, the contents of the carry register may be combined with the sum register so that the binary number in the accumulator is entirely represented by the contents of the sum register. The command EMC will cause the carry register to be emptied. After the carry register has been emptied it should be cleared so that all of the flip-flops of the carry register contain Zero's. The command to clear the carry register is designated CCR. After each command to add the contents of the addend register to the accumulator, the carry register should be emptied and cleared except when the addition is part of a multiplication process, which is discussed below.

To carry out the multiplication of two numbers the multiplier is stored in the multiplier register and the multiplicand is stored in the addend register. The $2^0$ flip-flop of the multiplier register is sensed. If the bit stored there is a One then the contents of the addend register are added to the accumulator in the manner described above. If the contents of the $2^0$ flip-flop of the multiplier register is Zero then the contents of the addend register are not added to the accumulator. Following the sensing and adding operation the multiplier register is shifted to the right. Also, the sum register is shifted to the right. The $2^0$ flip-flop of the multiplier register is again sensed and the process is repeated. This process is repeated eleven times until all the bits of the word stored in the multiplier register except the bit indicating the sign have been shifted into the $2^0$ flip-flop of the multiplier register. When the last bit has been shifted into the $2^0$ flip-flop of the multiplier register and the contents of the addend register either added or not added in accordance therewith, the accumulator will contain the product of the words stored in the multiplier register and the addend register.

For division the divisor is put in the multiplier register and the dividend is put in the sum register. The divisor is then shifted to the left in the multiplier register until the most significant digit (the digit the furthest to the left in the register which is not a Zero) appears in the $2^{10}$ flip-flop of the multiplier register. The contents of the multiplier register are then transferred to the addend register via the information distribution unit, the bits of the transferred word maintaining their positions so that the most significant digit of the divisor now is in the $2^{10}$ flip-flop of the addend register. Then the addend register is complemented and the contents of the addend register added to the accumulator. Next the carry register is emptied in a special manner so that the carries from the stage normally storing the $2^{10}$ order are transferred to the stage normally storring the sign instead of to the stage normally storing the $2^{11}$ order. The carry register is then cleared. If this operation does not result in the number in the sum register becoming negative, a One is put in the $2^0$ flip-flop of the multiplier register. The sum register is then shifted left in a special manner so that the bit stored in the $2^{10}$ order of the sum register is transferred to the S flip-flop of the sum register and the multiplier register is shifted left. The contents of the addend register are again added to the accumulator and the carry register is again emptied in the same special manner and cleared. If the resulting number stored in the sum register is still positive a One is again put in the $2^0$ flip-flop of the multiplier register. The sum register is again shifted left in the same special manner and the multiplier register is again shifted left. This process of adding the contents of the addend register to the accumulator, emptying and clearing the carry register, placing a One in the multiplier register, and shifting the multiplier and upper sum registers left is continued until the contents of the accumulator becomes negative. At this time a Zero is put in the $2^0$ order of the multiplier register. The sum register is then again shifted left in the same special manner and the multiplier register is again shifted left. The addend register is then complemented so that the number stored therein is positive, the contents of the addend register are added to the accumulator and the carry register is again emptied in the same special manner and cleared. If the contents of the accumulator stay negative, a Zero is again put in the $2^0$ order of the multiplier register. Then the sum register is again shifted left in the same special manner and the multiplier register is again shifted left. The contents of the addend register are again added to the accumulator, and the carry register is again emptied in the same special manner and cleared. The process of adding, placing a Zero in the multiplier register and shifting is continued until the number in the accumulator becomes positive. When the accumulator becomes positive a One is placed into the $2^0$ flip-flop of the multiplier register. Then the sum register is shifted left in the same special manner and the multiplier register is again shifted left. The addend register is then again complemented to make the number stored therein negative and the process is repeated as at the beginning of the division operation. This operation is continued until the desired number of significant digits have been obtained in the quotient. At this time the multiplier register will hold the quotient of the word originally stored in the accumulator divided by the word originally stored in the addend register. The decimal point of the quotient can be determined by the number of shifts required to line the divisor in the $2^{10}$ flip-flop of the multiplier register.

In both the multiplication and division processes the operating binary numbers must be positive. If any of the operating numbers are negative, they first must be complemented before the division or multiplication process is carried out. The signs of the operating number are stored and the sign of the result obtained from the process can be set accordingly.

Figure 9:
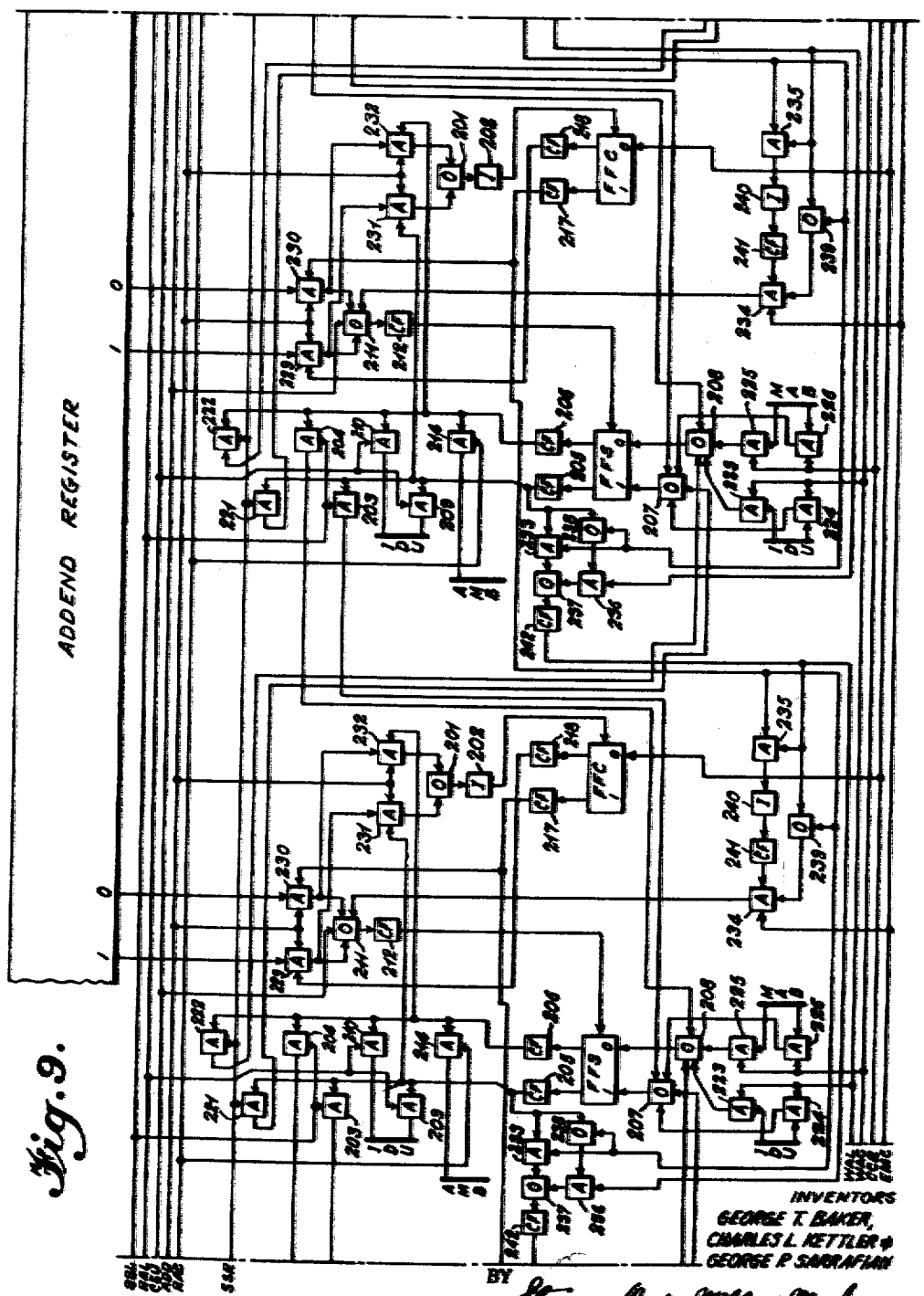
FIGURE 9 illustrates in block form two stages of the lower half of the accumulator in the arithmetic unit of the computer.

FIGURE 9, which shows a block diagram of two stages of the lower accumulator, illustrates the logic in the lower accumulator for carrying out the commands shifting the sum register to the left, SSL, reading the contents of the lower sum register into the information distribution unit, RAL, complementing the sum register, CSU, adding the contents of the addend register to the accumulator, ADD, reading the contents of the sum register out to the accumulator memory bus, RAC, shifting the sum register to the right, SSR, reading the contents of the information distribution unit into the lower sum register, WAL, reading the contents of the memory accumulator bus into the sum register, WAC, emptying the carry register, EMC, and clearing the carry register, CCR. To carry out any one of these commands a signal is applied to the input designated by the same letters which designate the command.

To shift the sum register to the left, an input signal from the SSL input is applied to the AND gates 203 and 204. As a result, the Zero and One outputs of the sum flip-flops, designated FFS, will be applied through cathode followers 205 and 206 through the enabled AND gates 203 and 204 through OR gates 207 and 208 to the Zero and One inputs respectively of the next succeeding flip-flop of the sum register on the left, thus causing the digit stored in each of the flip-flops of the sum register to be shifted one stage to the left.

When the command to read out the lower sum register to the information distribution unit is given an input signal from the RAL input will be applied to the AND gates 209 and 210, thus causing the contents of the lower sum register flip-flops to be read out through the cathode followers 205 and 206 and through the enabled AND gates 209 and 210 to the information distribution unit.

When the command to complement the sum register is given the signal from the CSU input is applied to the OR gates 211. As a result, an output signal from the OR gates 211 will pass through cathode followers 212 to the complementing input of flip-flops of the sum register to cause these flip-flops to change their states thus complementing the number stored in the sum register.

When the command to read out the number stored in the sum register to the accumulator memory bus is given, a signal will be applied from the RAC input to the AND gates 214, and signals will pass from the Zero outputs of the sum register flip-flops through the cathode followers 206 through the enabled AND gates 214 to the conductors of the accumulator memory bus.

When the command to shift the sum register to the right is given an input signal will be applied from the SSR input to AND gates 221 and 222. The bit stored in each of the sum register flip-flops will then pass through the cathode followers 205 and 206, through the AND gates 221 and 222, through the OR gates 207 and 208 in the next succeeding stage to the right to the sum register flip-flop in the next succeeding stage to the right, thus causing the number stored in the sum register to be shifted one place to the right.

When the command is given to store in the lower sum register the number which exists in the information distribution unit, a signal will be applied from the WAL input to the AND gates 223 and 224. The binary word in the information distribution unit will then pass through the AND gates 223 and 224 and through the OR gates 203 and 207 to the flip-flops of the sum register, thus storing in the lower sum register the word existing in the information distribution unit.

When the command is given to store in the sum register the number existing on the memory accumulator bus, a signal will be applied to the AND gates 225 and 226 from the WAC input. The word existing on the memory accumulator bus will then pass through the enabled AND gates 225 and 226 and through the OR gates 207 and 208 to the flip-flops of the sum register, thus storing in the sum register the digital number existing on the memory accumulator bus.

Whenever the command CCR to clear the carry register is given a signal will be applied from the CCR input to the Zero input of each of the carry register flip-flops, thus causing all of the carry register flip-flops to be set in their Zero states.

When the command to add the contents of the addend register to the accumulator is given, a signal will be applied to the ADD input of the accumulator. As is explained above, when the contents of the addend register is added to the accumulator, each of the corresponding flip-flops of the sum register and the carry register must be set in accordance with Table I. A study of Table I will indicate that each flip-flop of the lower sum register must be complemented in this operation when and only when the corresponding flip-flops of the carry register and the addend register contain opposite digits. This particular logical operation is carried out by the AND gates 229 and 230. In order for any one of the AND gates 229 to produce an output signal it must receive an input signal simultaneously from the Zero output of the carry register flip-flop, which is in the same stage of the accumulator as the AND gate 229, a signal from the One output of the corresponding flip-flop of the addend register and a signal from the ADD input. Thus, when the command to add the contents of the addend register to the accumulator is given and the corresponding flip-flops of the addend register and the carry register are respectively in their One and Zero states, the AND gate 229 of the same stage will produce an output signal which will pass through the OR gate 211 and the cathode follower 212 to cause the corresponding flip-flop of the sum register to switch to its opposite state. Similarly, the AND gate 230 will produce an output signal when it receives input signals from the One output of the carry register flip-flop in the same stage, from the Zero output of the corresponding flip-flop in the addend register and from the ADD input. The output of the AND gate 230 passes through the OR gate 211 and through the cathode follower 212 to cause the corresponding flip-flop of the sum register to switch to its opposite state. Thus, each sum register flip-flop will be switched to its opposite state when a signal is applied to the ADD input and the corresponding flip-flops of the addend and carry registers are in opposite states.

It will be seen from Table I that in an addition operation each carry register flip-flop must be switched to its opposite state when such carry register flip-flop is in the opposite state from the corresponding flip-flop of the addend register and is also in the opposite state from the corresponding sum register flip-flop. To carry out this logic a pair of AND gates 231 and 232 are used in conjunction with the AND gates 229 and 230. To produce output pulses the AND gates 231 and 232 require three simultaneous inputs. The output of the AND gate 229 is applied to one of the inputs of the AND gate 231. The One output of the sum register flip-flop of the same stage is applied to another input of the AND gate 231 through cathode follower 205. The third input of the AND gate 231 has the ADD input applied thereto. The output of the AND gate 230 is applied to one of the inputs of the AND gate 232. The Zero output of the sum register flip-flop of the same stage is applied to another input of the AND gate 232 and the third input of the AND gate 232 has the ADD input applied thereto. The outputs of the AND gates 231 and 232 are applied through the OR gate 201 to the inverter 202, the output of which will cause the corresponding carry register flip-flop to switch to the opposite state. Thus, each AND gate 231 will produce an output and cause the carry register flip-flop of the same stage to change its state whenever a signal is applied to the ADD input, the AND gate 229 of the same stage produces an output signal, and the corresponding sum register flip-flop is in its One state. Likewise, each AND gate 232 will produce an output signal causing the carry register of the same stage to change its state whenever a signal is applied to the ADD input, the AND gate 230 of the same stage produces an output signal, and the corresponding sum register flip-flop is in its Zero state. Therefore, each inverter 202 will produce an output signal to switch the carry register flip-flop of the same stage to its opposite state only if the carry register flip-flop of the same stage is in the opposite state from that of the corresponding flip-flop of the addend register and also in the opposite state from that of the corresponding sum register flip-flop. Thus, when the command to add the contents of the addend register to the accumulator is given, each sum register flip-flop will be switched to its opposite state, if the corresponding flip-flop of the addend register and the carry register are in their opposite states, and each carry register flip-flop will be switched to its opposite state if such carry register flip-flop is in the opposite state from the corresponding sum and addend register flip-flops.

When the command to empty the carry register into the sum register is given, logic must be performed to carry out the results in accordance with Table II.

*Table II*

| Inputs | | | Outputs | |
|---|---|---|---|---|
| Carry register flip-flop in J−1 stage | Carry from J−1 stage | Sum register flip-flop in J stage | Switch the sum register flip-flop of the J stage to its opposite state | Carry to J+1 stage |
| 1 | 1 | 1 | 0 | 1 |
| 1 | 1 | 0 | 0 | 1 |
| 1 | 0 | 1 | 1 | 1 |
| 1 | 0 | 0 | 1 | 0 |
| 0 | 1 | 1 | 1 | 1 |
| 0 | 1 | 0 | 1 | 0 |
| 0 | 0 | 1 | 0 | 0 |
| 0 | 0 | 0 | 0 | 0 |

In Table II and J notation is used to distinguish between preceding and succeeding stages of the accumulator. The J stage is any stage of the accumulator. The J−1 stage is the stage of the accumulator which normally stores the next lower order than that stored by the J stage and the J+1 stage is the state that normally stores the next higher order than that stored by the J stage. As is shown in Table II there are three inputs and two outputs for the logic for emptying the carry register. One of the outputs is to cause the sum register flip-flop of the stage to be switched to its opposite state and the other output is a carry passed along the J+1 stage of the accumulator. The three inputs are the state of the carry register flip-flop in the J−1 stage, the state of the sum register flip-flop in the J stage, and the carry passed from the J−1 stage. In Table II a "1" is used to designate when the sum register flip-flop is to be switched to its opposite state and an "0" when it is not. A "1" is used to designate when a carry is passed to the next stage and an "0" when no carry is passed.

The logic for carrying out the operation emptying of the carry register comprises in each stage four AND gates 233 through 236, three OR gates 237 through 239 and an inverter 240. The OR gate 237 of each state will produce an output signal whenever there is a carry to be passed to the next succeeding stage. For convenience, a stage of the accumulator which normally stores the next lower order than a particular stage shall be referred to as the preceding stage and the stage which normally stores the next higher order shall be referred to as the succeeding stage.

From Table II it will be seen that the sum register flip-flop of each stage of the accumulator must be switched to its opposite state whenever there is a carry being passed from the preceding stage or whenever the carry register flip-flop of the preceding stage contains a One, but not both of these conditions. When the carry register flip-flop of any stage contains a One, a signal will be transmitted from the One output of this carry register flip-flop through the cathode follower 217 of this stage, through OR gate 239 of the succeeding stage to one of the three inputs of the AND gate 234 in the succeeding stage. The output from the AND gate 234 in each stage is applied through the OR gate 211 through the cathode follower 212 to the complementing input of the sum register flip-flop of such stage. When the command to empty the carry register is given, a signal will be applied from the EMC input to the second input of the AND gate 234 in each stage. The third input to the AND gate 234 in each stage necessary to produce an output signal from the AND gate 234 is applied from the inverter 240 of such stage through a cathode follower 241. The inverter 240 will apply a signal to the AND gate 234 whenever the inverter 240 is not receiving a signal from the AND gate 235. The AND gate 235 will apply a signal to the inverter 240 whenever it receives a signal both from the ONE output of the carry register flip-flop of the preceding stage through the cathode follower 217 and from the OR gate 237 of the preceding stage through a cathode follower 242. Therefore, the AND gate 235 of each stage will produce an output signal whenever the carry register flip-flop of the preceding stage is in its One state and there is an output signal from the OR gate 237 of the preceding stage indicating that a carry is being passed from the preceding stage. Thus, when both of these conditions are present in the preceding stage, the inverter 240 will not apply a gating signal to the AND gate 234 and the AND gate 234 will not produce an output signal which would cause the sum register flip-flop to change its state. The output signal from the OR gate 237 also passes from the cathode follower 242 through the OR gate 239 to the first input of the AND gate 234. The result of these connections is that the AND gate 234 of each stage will produce an output signal to cause the sum flip-flop of such stage to change its state whenever the command to empty the carry register is given and there is a carry passed from the preceding stage or carry register flip-flop of the preceding stage is in its One state but not both of these conditions.

From Table II it can be seen that each stage of the accumulator must pass a carry to the succeeding stage whenever two or more out of the following three conditions occur: (1) the sum register flip-flop of the same stage is in its One state; (2) the carry register flip-flop of the preceding stage is in its One state; (3) there is a carry being passed from the preceding stage. The OR gate 237 must produce an output signal through the cathode follower 242 whenever at least two of these three conditions occur. For this purpose the outputs of the AND gates 233 and 236 are applied to the OR gate 237. One of the inputs of the AND gate 233 has the One output of the sum register flip-flop of the same stage applied thereto through the cathode follower 205 and the other input of the AND gate 233 has the One output of the carry register flip-flop of the preceding stage applied thereto through the cathode follower 217. Thus, the AND gate 233 of each stage will apply an output signal to the OR gate 237 whenever the sum register flip-flop of such stage is in its One state and the carry register flip-flop of the preceding stage is in its One state. One of the outputs of the AND gate 236 has the output of the OR gate 237 of the preceding stage applied thereto through the cathode follower 242 and the other input of the AND gate 236 has the output of the OR gate 238 applied thereto. The OR gate 238 receives one input from the One output of the sum register flip-flop of the same stage through the cathode follower 205 and the other input to the OR gate 238 has the One output of the carry register flip-flop of the preceding stage applied thereto through the cathode follower 217. Thus, the OR gate 238 of each stage will apply an output signal to the AND gate 236 of the same stage whenever the sum register flip-flop of the same stage is in the One state or carry register flip-flop of the preceding stage is in the One state. The AND gate 236 of each stage therefore will apply an output signal to the OR gate 237 of the same stage whenever there is a carry passed from the preceding stage and either the carry register of the preceding stage is in the One state or the sum register flip-flop of the same stage is in the One state. With this logic circuitry the OR gate 237 of each stage of the accumulator will produce an output signal to signal the passage of a carry to the succeeding stage whenever at least two out of the following three conditions exists: (1) the sum register flip-flop of the same stage is in its One state; (2) the carry register flip-flop of the preceding stage is in its One state; (3) there is a carry being passed from the preceding stage as indicated by the output from the OR gate 237 of the preceding stage.

Figure 10:
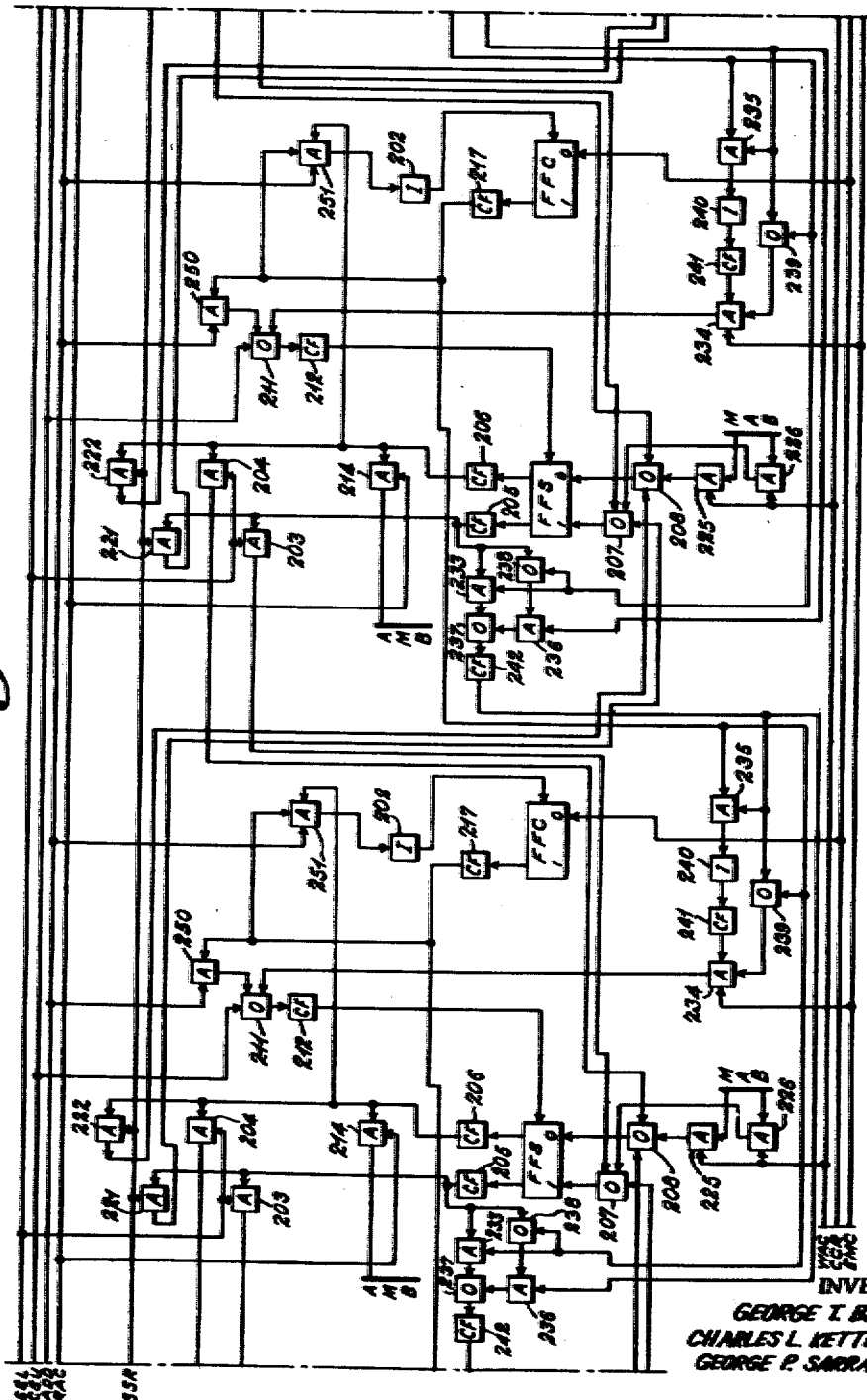
FIGURE 10 illustrates two stages of the upper half of the accumulator in block form.

FIGURE 10 illustrates the logic circuitry of the upper accumulator. The logical operations are performed by the circuitry of the upper accumulator when any one of the following commands are given: SSL, CSU, ADD, RAC, SSR, WAC, CCR and EMC. When any one of these commands is given a signal will be applied to the upper accumulator over the input designated by the same letters which designate the command.

When the command EMC is given, to empty the carry register into the sum register, a signal will be applied from the EMC input to the AND gate 234 in each stage of the upper accumulator. These AND gates 234 cooperate with the OR gates 211, 239, 237, and 238, and inverters 240, the AND gates 233, 235, and 236, the sum register flip-flops and the carry register flip-flops and the interconnecting cathode followers 205, 217, 242, and 241 in exactly the same manner as their counterparts in the lower accumulator to carry out the command EMC. Likewise the commands CCR, RAC, WAC, CSU, SSL, and SSR are carried out in the same manner in the upper accumulator as they are in the lower accumulator.

In general, the stage of the lower accumulator normally storing the $2^{10}$ order is connected to the stage of the upper accumulator normally storing the $2^{11}$ order in the exact same manner as each stage is connected to the succeeding and preceding adjacent stages as described with reference to FIGURES 9 and 10. The outputs from the AND gates 221 and 222 of the stage of the accumulator normally storing the $2^{11}$ order are applied to the sum register flip-flop in the stage of the accumulator normally storing the $2^{10}$ order respectively through the OR gates 207 and 208. Thus, when the command to shift the sum register right is given, the shift will be circular skipping the S flip-flop with the bit stored in the $2^0$ flip-flop being transferred to the $2^{22}$ flip-flop and the bit stored in the $2^{11}$ flip-flop being transferred to the $2^{10}$ flip-flop. The outputs of the AND gates 221 and 222 of the stage of the accumulator normally storing the $2^0$ order are applied to the sum register flip-flop in the stage of the accumulator normally storing the $2^{22}$ order rather than in the stage normally storing the sign. The stage of the accumulator normally storing the sign is not provided with AND gates 221 and 222. The outputs of the AND gates 203 and 204 of the stages of the accumulator normally storing the $2^{11}$ order are applied to the $2^{10}$ flip-flip of the sum register. The stage of the accumulator normally storing the $2^{22}$ order is not provided with AND gates 203 and 204. Thus, when the command SSL is given the entire sum register will be shifted left in a non-circular manner with the bit stored in the $2^{10}$ flip-flop of the sum register being transferred to the $2^{11}$ flip-flop of the sum register and the bit stored in the $2^{22}$ flip-flop of the sum register being discarded. The S flip-flop of the sum register will maintain its same state because no digit is shifted into it when the command SSL is given. The S flip-flop will cause a bit to be shifted into the $2^0$ flip-flop of the sum register each time the command SSL is given, which bit will be the same as that stored by the S flip-flop of the sum register. The output from the OR gate 237 of the stage of the accumulator normally storing the $2^{10}$ order is applied to the respective inputs of the OR gate 239, the AND gate 235 and the AND gate 236 of the stage of the accumulator normally storing the $2^{11}$ order. The output of the OR gate 237 of the stage of the accumulator normally storing the $2^{22}$ order is applied to the respective inputs of the OR gate 239, the AND gate 235 and the AND gate 236 of the stage of the accumulator normally storing the sign. The One output of the $2^{10}$ flip-flop of the carry register is applied to the respective inputs of the AND gate 235, the OR gate 239, the OR gate 238 and the AND gate 233 of the stage of the accumulator normally storing the $2^{11}$ order. The One output from the $2^{22}$ flip-flop of the carry register is applied to the respective inputs of the AND gate 235, the OR gate 239, the OR gate 238, and the AND gate 233 of the stage of the accumulator normally storing the sign. Thus, when the command to empty the carry register is given, the contents of the entire 24 stages of the carry register is emptied into the sum register.

Whenever the command to add the contents of the addend register to the accumulator is given, the flip-flops of the sum and carry registers of the upper accumulator must be set in accordance with Table III.

*Table III*

| Before addition | | After addition | |
|---|---|---|---|
| Sum register flip-flop | Carry register flip-flop | Sum register flip-flop | Carry register flip-flop |
| 1 | 1 | 0 | 1 |
| 1 | 0 | 1 | 0 |
| 0 | 1 | 1 | 0 |
| 0 | 0 | 0 | 0 |

Table III shows the states to which the sum register flip-flop and the carry register flip-flop of any one of the stages of the upper accumulator must set when the command to add the contents of the addend register to the accumulator is given depending upon what states the sum register flip-flop and the carry register flip-flops are in prior to the command.

From this table it can be seen that the carry register flip-flop must be switched, when and only when, it contains a One and the corresponding sum register flip-flop contains a Zero. As shown in FIGURE 10, when the command to add the contents of the addend register to the accumulator is given, a signal will be applied from the ADD input to AND gate 251 of each stage of the upper accumulator. Another input to the AND gate 251 is applied from the One output of the carry register flip-flop of the same stage through the cathode follower 217. A third input to the AND gate 251 is applied from the Zero output of the sum register flip-flop of the same stage through the cathode follower 206. When signals are applied to all three of these inputs of the AND gate 251 of any one of the stages of the upper accumulator it will apply an output signal to the inverter 202 which in turn will produce an output signal causing the carry register flip-flop of that stage to change its state. Thus, each carry register flip-flop of the upper accumulator will be switched to its opposite state after the command to add the contents of the addend register to the accumulator is given, when and only when a One is stored in the carry register flip-flop of such stage and a Zero is stored in the sum register flip-flop of such stage.

From Table III it will be evident that the sum register flip-flop must be switched to its opposite state when the command to add the contents of the addend register to the accumulator is given, if a One is stored in the carry register flip-flop. To accomplish this logical function, an AND gate 250 in each stage is used. Each AND gate 250 will produce an output signal when it receives an input signal from the ADD input and from the One output of the carry register flip-flop of the same stage through the cathode follower 217. The output from the AND gate 250 is applied through the OR gate 211 and the cathode follower 212 to cause the sum register flip-flop of the same stage to change its state. Thus, each flip-flop of the upper sum register will be switched to its opposite state after the command to add the contents of the addend register to the accumulator is given, if the flip-flop of the carry register of the same stage contains a One.

Figure 11:
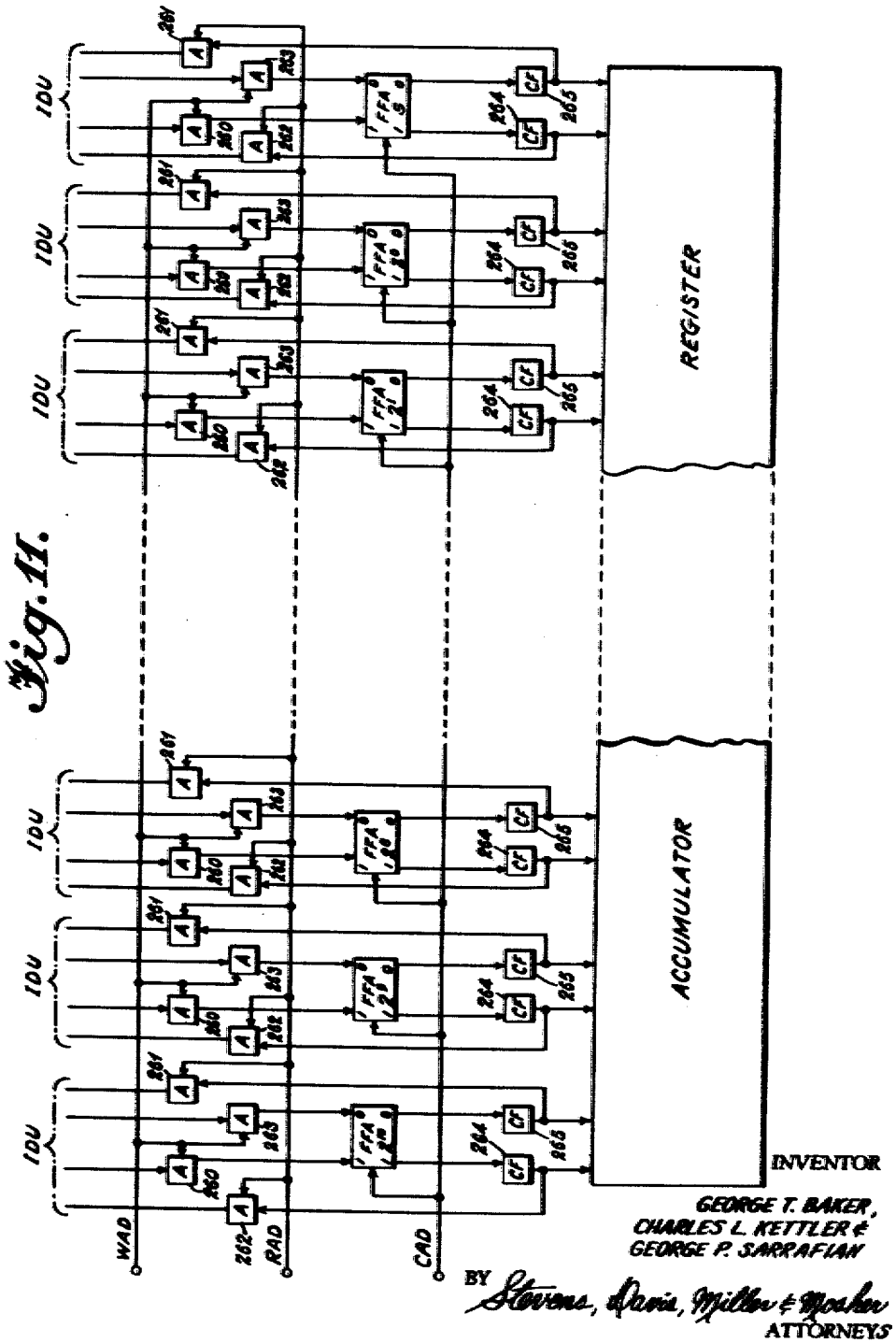
FIGURE 11 illustrates the addend register in the arithmetic unit of the computer in block form.

FIGURE 11 illustrates in block form the detailed circuitry of the addend register. The addend register comprises 12 stages but only the first three and last three have been illustrated in FIGURE 11 with the middle six stages being left out for convenience of illustration. Each stage of the addend register is exactly alike and comprises four AND gates 260 through 263, two cathode followers 264 and 265 and one flip-flop designated by the letters FFA. The One and Zero outputs of the flip-flop of each stage of the addend register are applied to the cathode followers 264 and 265 respectively. The outputs of the cathode followers 264 and 265 are applied to the stage of the accumulator comprising the corresponding flip-flops of the sum and carry registers in the manner described with reference to FIGURE 9. The outputs of the cathode followers 264 and 265 are also applied to the AND gates 262 and 261, respectively. When the command to read out the addend register to the information distribution unit is given, a signal will be applied from the RAD input to the AND gates 261 and 262 of each stage of the addend register and the bit stored in the flip-flop of each stage of the addend register will pass through the cathode followers 264 and 265 through the enabled AND gates 262 and 261 to the information distribution unit.

The information distribution unit is connected to the AND gates 260 and 263 of each stage of the addend register and the outputs of the AND gates 260 and 263 are connected to the One and Zero inputs, respectively, of the flip-flop of each stage of the addend register. When the command to read the word existing in the information distribution unit into the addend register is given, a signal will be applied from the WAD input enabling the AND gates 260 and 263 of each stage of the addend register, and thus the word existing in the information distribution unit will pass through the AND gates 260 and 263 to be registered in the flip-flops of the addend register.

When the command to complement the addend register is given, a signal will be applied from the CAD input to the complementing input of the flip-flop of each stage of the addend register and cause these flip-flops to switch to the opposite state, thus complementing the binary number stored in the addend register.

Figure 12:
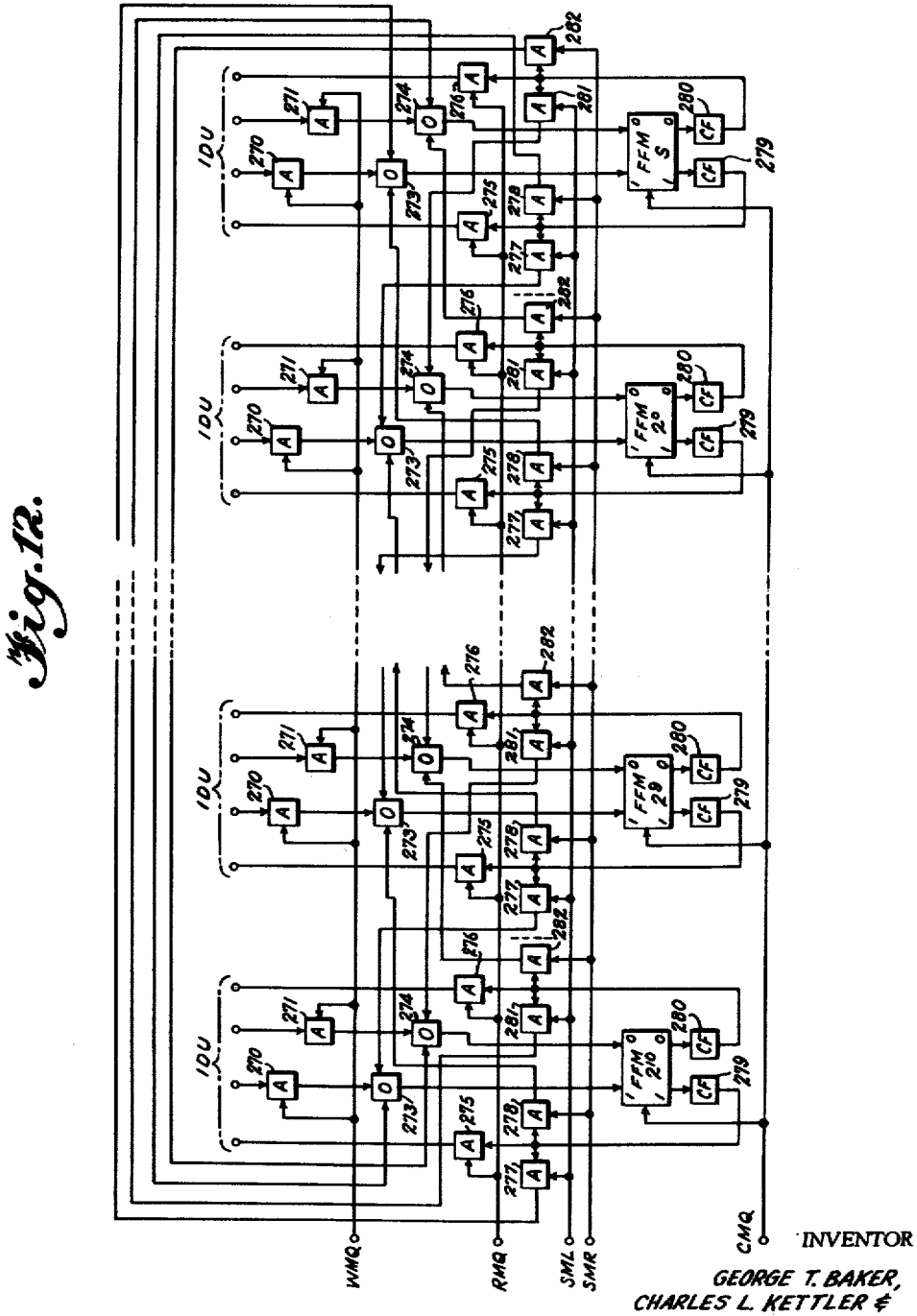
FIGURE 12 illustrates the multiplier register in the arithmetic unit in block form.

FIGURE 12 shows the detailed circuitry of the multiplier register in block form. The multiplier register comprises 12 substantially identical stages. Only the first two, the stages normally storing the sign and the $2^0$ order, and the last two, the stages normally storing the $2^9$ and $2^{10}$ orders, are shown in FIGURE 12, the middle eight stages being left out for convenience of illustration. The information distribution unit is connected to a pair of AND gates 270 and 271 in each stage. The outputs from the AND gates 270 and 271 are applied to OR gates 273 and 274, respectively, and the outputs of the OR gates 273 and 274 are applied to the One and Zero inputs of the flip-flop of each stage. When the command to read the binary word existing in the information distribution unit into the multiplier register is given, a signal will be applied from the WMQ input enabling the AND gates 270 and 271 and the word existing in the information distribution unit will pass through the AND gates 270 and 271 and the OR gates 273 and 274 to be registered in the flip-flops of the addend register.

The One and Zero outputs of the flip-flop of each stage of the addend register are applied to AND gates 275 and 276, respectively, through the cathode followers 279 and 280, respectively. The outputs from the AND gates 275 and 276 are applied to the information distribution unit. When the command to read the contents of the multiplier register into the information distribution unit is given, a signal will be applied from the RMQ input to enable the AND gates 275 and 276 and the contents stored in the flip-flops of the multiplier register will pass out through the cathode followers 279 and 280 and through the AND gates 275 and 276 to the information distribution unit.

The outputs from the cathode followers 279 and 280 of each stage of the multiplier register are also applied to the input of AND gates 277 and 281. The outputs from the AND gates 277 and 281 of each stage are applied to the OR gates 273 and 274 of the next succeeding stage. The outputs from the AND gates 277 and 281 of the stage of the multiplier register normally storing the $2^{10}$ order are applied to the OR gates 273 and 274 of the stage of the multiplier register normally storing the sign. When the command to shift the multiplier register to the left is given, a signal will be applied from the SML input enabling the AND gates 277 and 281 and the contents of each flip-flop of the multiplier register will pass through the cathode followers 279 and 280, through the AND gates 277 and 281 through the OR gates 273 and 274 of the next succeeding stage to the flip-flop of the next succeeding stage and thus the multiplier register will be shifted to the left. The bit stored in the $2^{10}$ flip-flop will pass to the S flip-flop of the multiplier register.

The outputs from the cathode followers 279 and 280 of each stage of the multiplier register are also applied to the inputs of AND gates 278 and 282, respectively. The outputs from the AND gates 278 and 282 of each stage of the multiplier register are applied to the OR gates 273 and 274 of the preceding stage. The outputs from the AND gates 278 and 282 of the stage of the multiplier register normally storing the sign are applied to the OR gates 273 and 274 of the stage of the multiplier register normally storing the $2^{10}$ order. When the command to shift the multiplier register to the right is given, a signal will be applied from the SMR input enabling the AND gates 278 and 282 of each stage in the multiplier register and the bit stored in each flip-flop of the multiplier register will pass through the cathode followers 279 and 280, through the AND gates 278 and 282 and through the OR gates 273 and 274 of the preceding stage to be stored in the flip-flop of the preceding stage. The bit stored in the S flip-flop of the multiplier register will pass to the $2^{10}$ flip-flop of the multiplier register. Thus, the multiplier register will be shifted to the right.

The signals to initiate the commands to carry out operations in the arithmetic unit are applied to the inputs of the arithmetic unit from the control unit 14. The computer is also provided with microprogramming for automatically initiating a predetermined sequence of commands when the predetermined sequence is called for by the control unit 14. One of the predetermined sequences which can be initiated by the microprogramming is the complete sequence of commands necessary to carry out the multiplication of two binary numbers, one stored in the multiplier register and the other stored in the addend register. The command to call for this sequence of commands is designated MUL. Another predetermined sequence which may be called for by the control unit is the division of the number registered in the sum register by the number registered in the multiplier register. The command to call for this latter sequence is designated DIV.

Figure 13:
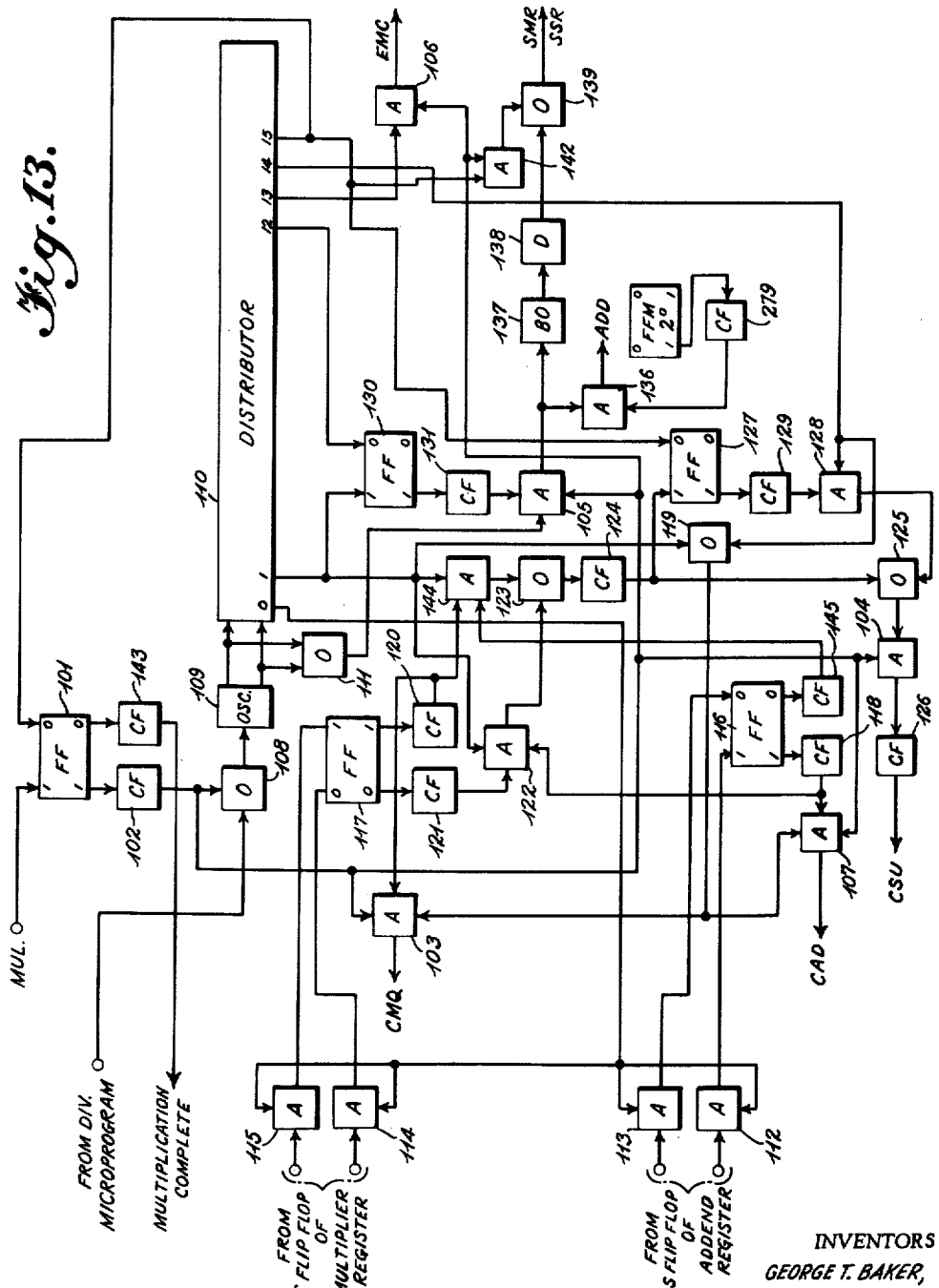
FIGURE 13 illustrates in block form the details of the microprogramming for carrying out the operation of multiplication.

The block diagram for the logic circuitry for carrying out the microprogramming of the command MUL is shown in FIGURE 13. When the command MUL is given, a signal will be applied from the control unit 14 to the One input of flip-flop 101, which is thereby placed in its One state. The resulting signal from the One output of the flip-flop 101 passes through the cathode follower 102 and is applied continuously to the AND gates 103 through 107, the AND gate 142, and to the OR gate 108. The OR gate 108 passes the signal to the gated oscillator 109 causing the oscillator 109 to start oscillating. The oscillator 109 is provided with two outputs on which it generates alternate output pulses. The outputs of the oscillator 109 are applied to distributor 110.

The distributor comprises magnetron beam switching tubes, which are disclosed in the text by Millman and Taub, entitled Pulse and Digital Circuits published by McGraw-Hill in 1956. As is disclosed in this publication the magnetron beam switching tube produces an output signal from any one of a plurality of output positions. The output signal may be stepped from position to position by alternate pulses applied to the two stepping inputs of the tube or may be brought to any position by a signal applied to an input at that position. The output signal from a magnetron beam switching tube is a negative pulse. Therefore inverters are used at each output of the beam switching tube to provide the distributor 110 with positive output pulses.

The distributor 110 has eighteen output positions which are designated position "0" through position "17" in the sequence in which the output signal of the distributor 110 steps when advanced by the pulses applied to the stepping inputs. The alternate pulses generated on the two outputs of the oscillator 109 are applied to the stepping inputs of the distributor 110. The first pulse applied from the oscillator 109, to the distributor 110 will cause an output signal to be produced from the position "0" of the distributor 110. Each succeeding pulse applied to the stepping inputs of the distributor will cause the output signal of the distributor to advance one position.

When the output signal of the distributor 110 is produced from position "0," it will be applied to the AND gates 112, 113, 114 and 115, thus enabling these AND gates. The Zero and One outputs of the S flip-flop of the addend register are applied to the AND gates 113 and 112, respectively. The outputs of the AND gates 113 and 112 are applied to the Zero and One inputs of a flip-flop 116. Thus, when the output signal of the distributor is produced from the position "0," the flip-flop 116 will assume the same state as the S flip-flop of the addend register and the sign of the binary number registered in the addend register will thereby be stored in the flip-flop 116. The Zero and One outputs from the S flip-flop of the multiplier register are applied to the AND gates 114 and 115, respectively. The outputs of the AND gates 114 and 115 are applied to the Zero and One inputs respectively of a flip-flop 117. Thus, when the output signal of the distributor is advanced to position "0," the flip-flop 117 will assume the state of the S flip-flop of the multiplier register and the sign of the number stored in the multiplier register will be stored in the flip-flop 117.

If the flip-flop 116 is set in its One state, it will apply an output signal to the AND gate 107 through a cathode follower 118. Then when the output signal of the distributor is advanced to the position "1," the output signal will pass through OR gate 119, to the AND gate 107. The AND gate 107 receiving input signals on all three inputs will apply an output signal to the CAD input of the addend register and thus cause the addend register to be complemented. Similarly, if the flip-flop 117 is set in its One state, it will apply an output signal through cathode follower 120 to the AND gate 103. The output signal from the OR gate 119 is also applied to the AND gate 103. The AND gate 103 thus receiving signals on all three inputs will apply an output signal to the CMQ input of the multiplier register and thus cause the number stored in the multiplier register to be complemented. Thus, the addend register will be complemented if it contains a negative number and the multiplier register will be complemented if it contains a negative number so that the multiplier and multiplicand are positive for the multiplicand operation.

The Zero output of the flip-flop 117 is applied through a cathode follower 121 to AND gate 122. The One output of the flip-flop 116 is applied through the cathode follower 118 to the AND gate 122. If the flip-flop 117 is set in its Zero state and the flip-flop 116 is set in its One state, then when the output signal of the distributor 110 gets to the position "1," the output signal will pass through the AND gate 122 to the OR gate 123. The resulting output signal from the OR gate 123 will pass through the cathode follower 124 through OR gate 125 to the AND gate 104. The AND gate 104 is enabled by the output signal from the One output of the flip-flop 101, so the signal from the OR gate 125 will pass through the AND gate 104 through cathode follower 126 to the CSU input of the accumulator thus causing the sum register to be complemented. The One output of the flip-flop 117 is applied through the cathode follower 120 to AND gate 144. The Zero output of the flip-flop 116 is applied through a cathode follower 145 to the AND gate 144. If the flip-flop 116 is set in its Zero state and the flip-flop 117 is set in its One state, then when the output signal of the distributor 110 gets to position "1," the output signal will pass through the AND gate 144 to the OR gate 123. The resulting output signal from the OR gate 123 will cause the sum register to be complemented in the manner described above. Thus, whenever either the multiplier in the multiplier register or the multiplicand in the addend register is negative, but not both, then the sum register will be complemented.

The output of the OR gate 123 is also applied through the cathode follower 124 to the One input of the flip-flop 127. Thus, when either the multiplier or the multiplicand is negative, but not both, the flip-flop 127 will be set to its One state. The One output of the flip-flop 127 is applied to an AND gate 128 through a cathode follower 129. During the time that the output signal of the distributor is being advanced to the position "12," the multiplication operator is completed. When the distributor gets to the position "14," it will apply an output signal to the AND gate 128. If the flip-flop 127 has been set in its One state, the AND gate 128 will then apply an output signal through the OR gate 125, the AND gate 104, and the cathode follower 126 to the CSU input of the accumulator. Thus, if an output signal from the OR gate 123 causes the sum register to be complemented when the distributor 110 gets to the position "1," then after the multiplication operation the sum and carry registers will be complemented again when the distributor gets to the position "14." In this manner the product or result obtained in the accumulator from the multiplication operation is given the proper sign in accordance with the signs of the multiplier and multiplicand.

The output signal from the position "14" of the distributor is also applied through the OR gate 119 to the AND gates 103 and 107. Thus, if the flip-flop 117 has been set in its One state, then the AND gate 103 will apply an output signal to the CMQ input of the multiplier register when the output signal of the distributor gets to position "14." Likewise, if the flip-flop 116 has been set in its One state, then when the output signal of the distributor gets to its position "14," the AND gate 107 will apply an output signal to the CAD input of the addend register. Thus, if the multiplier register is complemented by the output from the AND gate 103 when the output signal of the distributor 110 gets to the position "1," then it will be complemented again when the output signal of the distributor 110 gets to the position "14." Likewise, the addend register will be complemented when the output signal of the distributor gets to the position "14" if it was complemented by the output from the AND gate 107 when the output signal of the distributor advanced to the position "1." Thus, the proper sign is restored to the multiplier and multiplicand after the multiplication operation is carried out.

When the output signal of the distributor gets to the position "1" it also causes the flip-flop 130 to be switched to its One state. The flip-flop 130, however, has an inherent delay so that it does not switch until the complementing operations described above are carried out. When the flip-flop 130 is in its One state, it applies an output signal through cathode follower 131 to the AND gate 105. The alternating output pulses from the two outputs of the oscillator 109 are applied through an OR gate 111 to the AND gate 105. After the distributor has been advanced to the position "1" each succeeding pulse from the OR gate 111 will pass through the AND gate 105, enabled by the signals from the One outputs of the flip-flops 130 and 101.

Each pulse passing through the AND gate 105 is applied to an AND gate 136 and to a blocking oscillator 137. The One output of the 2⁰ flip-flop of the multiplier register is applied through the cathode follower 279 to the AND gate 136. The output from the AND gate 136 is applied to the ADD input of the accumulator. Thus, when the 2⁰ flip-flop of the multiplier register is in its One state and a pulse passes through the AND gate 105, this pulse will pass through the AND gate 136 to the ADD input of the accumulator and cause the contents of the addend register to be added to the accumulator. The blocking oscillator 137, in response to each applied pulse, will apply an output pulse through a delay line 138 to an OR gate 139. The output of the OR gate 139 is applied to the SMR and SSR inputs of the multiplier and sum registers, respectively. Each pulse from the blocking oscillator 137 will pass through the OR gate 139 to the SMR and SSR inputs and cause the multiplier and sum register to be shifted right. The delay line 138 effects a delay substantially less than the time interval between pulses passing through the AND gate 105 as generated by the oscillator 109. Thus, each pulse passing through the AND gate 105 will cause the number stored in the addend register to be added to the accumulator if the 2⁰ flip-flop of the multiplier register contains a One and after a short delay will also cause the multiplier register and the sum register to be shifted one place to the right.

While the pulses from the oscillator 109 are passing through the AND gate 105 they are each causing the output signal of the distributor 110 to advance one position so that when the eleventh pulse is passing through the AND gate 105 the output signal of the distributor will be advanced to the position "12." When the distributor gets to the position "12" the output signal will be applied to the Zero input of the flip-flop 130. The flip-flop 130 will then be switched to its Zero state and the AND gate 105 will no longer receive an enabling signal from the One output of the flip-flop 130. Thus, the addition and shifting operations will cease after eleven pulses.

The next pulse from the oscillator 109 will cause the output signal of the distributor 110 to step to the position "13" and the output signal will be applied through the enabled AND gate 106 to the EMC input of the accumulator. Thus the carry register will be emptied when the output signal of the distributor gets to position "13."

The next pulse from the oscillator 109 will cause the output signal of the distributor 110 to step to the position "14" and the output signal will be applied to the AND gate 128 and to the OR gate 119 to carry out the operations already described.

When the output signal of the distributor 110 steps to the position "15," the output signal will be applied to the flip-flop 127 to switch it back to its Zero state. This output signal from the position "15" will also be applied through AND gate 142 and through the OR gate 139 to the SMR and SSR inputs of the multiplier register and accumulator, respectively, thus causing the multiplier register and the sum register to be again shifted right. This last operation brings the number stored in the sum, carry and multiplier registers to their normal positions in these registers.

The output signal from the position "15" of the distributor is also applied to the Zero input of the flip-flop 101 to switch this flip-flop to its Zero state. When the flip-flop 101 is switched to its Zero state, it will apply an output pulse through cathode follower 143 back to the control unit to indicate that the multiplying operation has been completed. Also, the signal from the One output of the flip-flop 101 will no longer be produced so that AND gates 103 through 106 and 142 will no longer be enabled and the oscillator 109 will stop generating output pulses.

Figure 14:
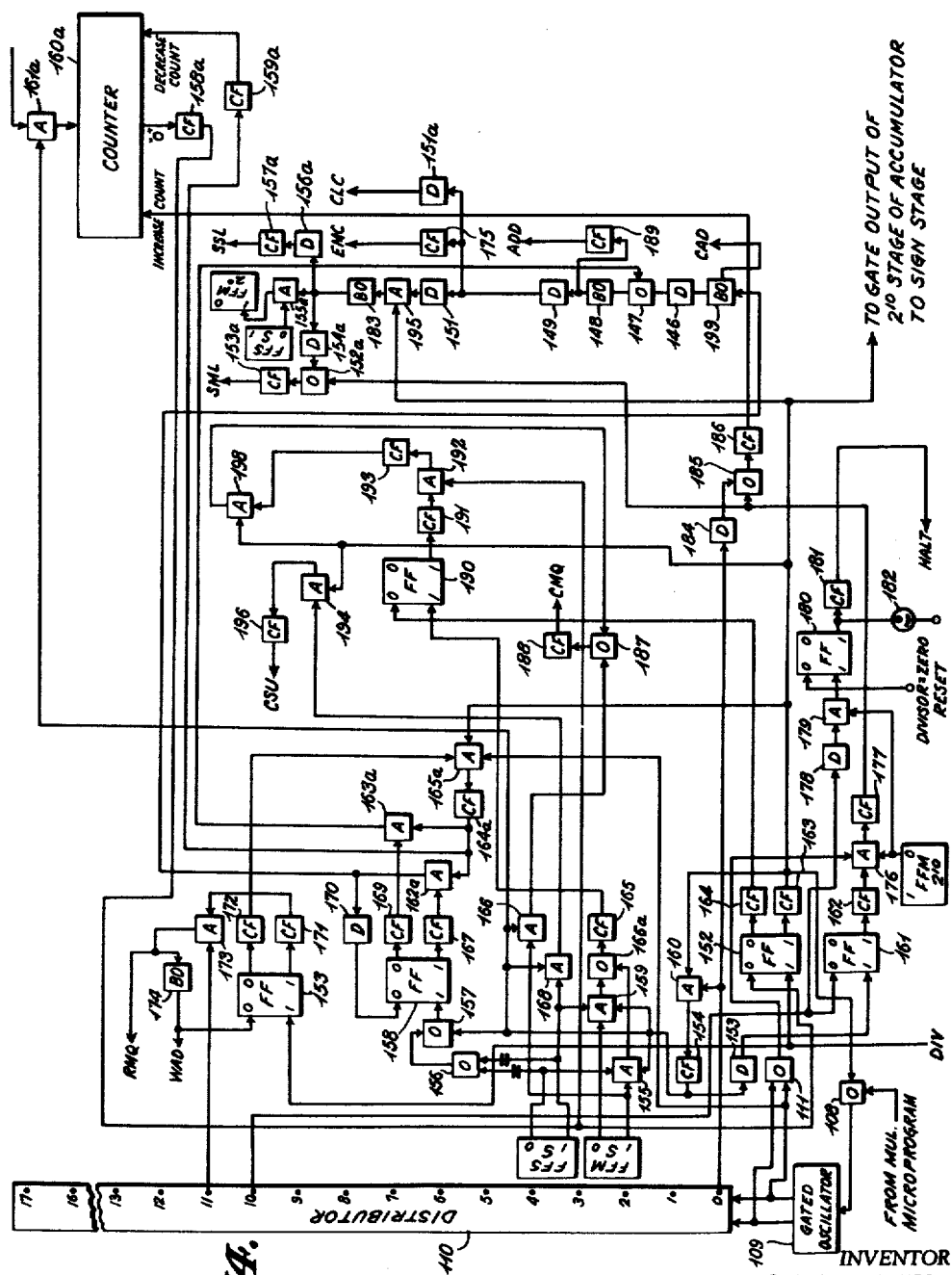
FIGURE 14 illustrates in block form the details of the microprogramming for carrying out the operation of division.

FIGURE 14 shows the logic circuitry in block form for the microprogramming of the division operation. The logic circuitry for the microprogramming of the division operation utilizes the OR gate 108, the gated oscillator 109, the distributor 110, and the OR gate 111, which are also used in the logic circuitry for the microprogramming of the multiplication operation as is described with reference to FIGURE 13.

When the command DIV is given by the control unit 14 a signal will be applied to the input designated DIV in FIGURE 14.

This signal is applied to the One inputs of the flip-flops 152 and 153 to switch these flips-flops to their One states. When the flip-flop 152 is in its One state it will apply a continuous output signal through cathode follower 163 to AND gates 160, 165a, 194, 198, and 195. This continuous output signal is also applied to the accumulator to gate the output of the stage of the accumulator normally storing the $2^{10}$ order to the stage of the accumulator normally storing the sign so that when the command EMC is given the carries will be passed along to the sign stage instead of the stage normally storing the $2^{11}$ order and so that when the command SSL is given the bit shifted out of the $2^{10}$ flip-flop of the sum register will be transferred to the S flip-flop of the sum register. The One output signal of the flip-flop 152 is also applied through the cathode follower 163 through the OR gate 108 to actuate the oscillator 109.

The oscillator 109 in response to receiving the signal from the flip-flop 152 will start applying pulses to the stepping inputs of the distributor 110. The first pluse from the gated oscillator 109 applied to the distributor 110 will cause the output signal of the distributor to be produced from position "0" of the distributor. The output signal from the the position "0" of the distributor 110 will pass through the AND gate 160 and through cathode follower 154.

This signal passing through the cathode follower 154 is applied to the AND gates 155 and 159. The One output is the S flip-flop of the multiplier register is applied to another input of the AND gate 155 and the Zero output of the S flip-flop of the sum register is applied to the third input of the AND gate 155. The Zero output of the S flip-flop of the multiplier register is applied to another input of AND gate 159 and the One output of the S flip-flop of sum register is applied to the third input of the AND gate 159. The outputs from the AND gates 155 and 159 are both applied to OR gate 166a and the output of OR gate 166a is applied through a cathode follower 165 to the One input of a flip-flop 190. Thus, if either of the AND gates 155 or 159 receive signals on all three inputs, they will produce an output signal which will be applied through the OR gate 166a through cathode follower 165 to set the flip-flop 190 in its One state. When the output signal of the distributor 110 gets to position "0," the AND gate 155 will receive signals on all three of its inputs if the S flip-flop of the multiplier register is in its One state and the S flip-flop of the sum register is in its Zero state. Likewise, the AND gate 159 will produce an output signal when the output signal of the distributor 110 gets to position "0" if the S flip-flop of the sum register is in its One state and the S flip-flop of the multiplier register is in its Zero state. Thus, if the sign of the divisor stored in the multiplier register is opposite from that of the sign of the dividend stored in the sum register, then the flip-flop 190 will be placed in its One state, thus storing the negative sign of the quotient.

The signal from position "0" of the distributor 110 passing through cathode follower 154 is also applied to AND gate 168. The One output of the S flip-flop of the sum register is applied to the other input of AND gate 168. Thus the AND gate 168 will produce an output signal when the distributor output signal gets to position "0" if the sign of the dividend is negative. This output signal will be applied through the enabled AND gate 194 through cathode follower 196 to the CSU input of the accumulator. Thus the sum register will be complemented when the output signal of the distributor 110 gets to position "0" if the sign of the dividend stored in the sum register is negative. The output signal from position "0" of distributor 110 passing through cathode follower 154 is also applied to AND gate 166. The One output of the S flip-flop of the multiplier register is applied to the other input of AND gate 166. Thus the AND gate 166 will produce an output signal when the distributor 110 gets to position "0" if the sign of the divisor stored in the multiplier register is negative. The output signal of the AND gate 166 is applied through OR gate 187 and cathode follower 188 to the CMQ input of the multiplier register. Thus the multiplier register will be complemented when the output signal of the distributor 110 gets to position "0" if the sign of the divisor stored in the multiplier register is negative. The signs of the divisor and the dividened are thus made positive before the start of the division operation.

The output signal from position "0" of distributor 110 passing through the cathode follower 154 is also applied to a series of AND gates 161a allowing a binary number to pass from the lower five stages of the information distribution unit through the AND gates 161a to be registered in the flip-flops of a five stage counter 160a. This number read into the counter 160a determines where the binary point will be in the quotient.

The output signal from position '0" of distributor 110 passing through the cathode follower 154 is also applied through OR gate 157 to the One input of flip-flop 158 setting this flip-flop in its One state. When the flip-flop 158 is in its One state it will apply a continuous signal through cathode follower 167 to AND gates 162a.

The output signal from position "0" of the distributor 110 is also applied through a delay line 184 through OR gate 185 and cathode follower 186 to the counter 160a to cause the count registered therein to increase by One. Thus after the number has been read into the counter from the information distribution unit the count registered in the counter will be increased by One.

The output signal from position "0" of the distributor 110 passing through the cathode follower 154 is also applied through a delay line 153 to the One input of flip-flop 161 to set this flip-flop in its One state. The One output of the flip-flop 161 is applied through cathode follower 162 to the AND gate 176. The Zero output of the $2^{10}$ flip-flop of the multiplier register is also applied to AND gate 176. Pulses from both sides of the gated oscillator 109 are applied through OR gate 111 to the third input of the AND gate 176. The output of the AND gate 176 is applied through cathode follower 177 through OR gate 152a and cathode follower 153a to the SML input of the multiplier register. Thus, after the output signal of the distributor 110 gets to position "0," the flip-flop 161 will be switched to its One state after a short delay. The delay will be less than the time between pulses from gated oscillator 109. Thus each succeeding output pulse from the gated oscillator 109 will pass through the OR gate 111, through the AND gate 176 and the cathode follower 177, and through the OR gate 152a and the cathode follower 153a to the SML input of the multiplier register. Each of these pulses will cause the multiplier register to be shifted left. These pulses will be continued to be applied until a One is shifted into the $2^{10}$ flip-flop of the multiplier register, at which time the AND gate 176 will not longer receive an enabling signal from the Zero output of the $2^{10}$ flip-flop of the multiplier register. Thus, the divisor in the multiplier register is shifted left until the most significant digit of the divisor is shifted into the $2^{10}$ flip-flop multiplier register.

The output pulses passing through the AND gate 176 are also applied through OR gate 185 and cathode follower 186 to the counter 160a to cause the count registered therein to increase by One with each pulse. Thus to count in the counter 160a will be increased by a number equal to the number of times the multiplier register has been shifted left.

While the multiplier register is being shifted left and the count stored in the counter 160a is being increased, the output signal of the distributor is being advanced. By the time the output signal from the distributor 110 gets to position "10," a One should be shifted into the $2^{10}$ flip-flop of the multiplier register. If a One has not been shifted into the $2^{10}$ flip-flop of the multiplier register, this means that the divisor is Zero. Provision is made to stop the computer in such a case. The Zero output of the $2^{10}$ flip-flop of the multiplier register is applied to the AND gate 179. When the output signal of the distributor 110 gets to position "10," it will pass through the delay line 178 to the AND gate 179. Thus, if a One has not yet been shifted into the $2^{10}$ flip-flop of the multiplier register, the AND gate 179 will pass the output signal from position "10" of the distributor to the One input of the flip-flop 180 switching the flip-flop 180 to its One state. The One output of the flip-flop 180 is applied to cathode follower 181 and the output signal from the cathode follower 181 stops the computer. The One output of the flip-flop 180 also energizes an indicating lamp 182 so that the operator will know why the computer has been stopped. The flip-flop 180 may be set back to its Zero state by a signal applied to the Zero input of the flip-flop 180.

The output signal from position "10" of the distributor also is applied to the Zero input of the flip-flop 161, setting the flip-flop 161 back to its Zero state. Thus, the AND gate 176 no longer receives an enabling signal from the One output of the flip-flop 161 and no further pulses from the OR gate 111 can pass through the AND gate 176.

When the output signal of the distributor 110 gets to position "11," the output signal will pass through the enabled AND gate 173 to the RMQ input of the multiplier register and to the blocking oscillator 174. Upon receiving this signal the blocking oscillator will apply a signal to the WAD input of the addend register. As a result, the divisor will be read out of the multiplier register to the information distribution unit and from the information distribution unit the divisor will be stored in the addend register. The divisor will of course retain its aligned position with the most significant digit in the $2^{10}$ flip-flop of the addend register.

The output signal of the blocking oscillator 174 is also applied to the Zero input of the flip-flop 153 setting this flip-flop to its Zero state. The Zero output of the flip-flop 153 is applied through cathode follower 172 to AND gate 165a. The pulses from one side of the gated oscillator 109 are applied to the third input of the enabled AND gate 165a. The flip-flop 165a receiving enabling signals from both the Zero output of the flip-flop 153 and the One output of the flip-flop 152 will pass the pulses from the gated oscillator 109. From the AND gate 165a, the pulses will pass through cathode follower 164a.

The first output pulse from the gated oscillator 109 passing through cathode follower 164a will pass through enabled AND gate 162a to energize the blocking oscillator 199. The output from the blocking oscillator 199 is applied to the CAD input of the addend register thus causing the addend register to be complemented. The output from the blocking oscillator 199 is also applied through a delay line 146 and through an OR gate 147 to blocking oscillator 148. The output from blocking oscillator 148 is applied through cathode follower 189 to the AND input of the accumulator. Thus after the AND input of the accumulator, the contents of addend register will be added to the accumulator. The output from the blocking oscillator 148 is also applied through delay line 149 through cathode follower 175 to the EMC input of the accumulator thus causing the carry register to be emptied into the sum register after the addition operation. The process of emptying the carry register is done in the special manner described for carrying out division because the output signals from the $2^{10}$ stage of the accumulator are applied to the sign state instead of the $2^{11}$ stage of the accumulator due to the enabling signal applied from the One output of the flip-flop 152. The output signal from the delay line 149 is also applied through a delay line 151a to the CLC input of the accumulator, thus clearing the carry register after the carry register has been emptied. The output of the delay line 149 is also applied through a delay line 151 through the enabled AND gate 195 to blocking oscillator 183. The output from the blocking oscillator 183 is applied to the AND gate 155a. The Zero output of the S flip-flop of the sum register is applied to the other input of the AND gate 155a. The output of the AND gate 155a is applied to the One input of the $2^0$ flip-flop of the multiplier register. Thus, after the carry register has been emptied, a ONE will be placed in the $2^0$ flip-flop of the multiplier register if the S flip-flop of the sum register is in its Zero state, or in other words if the number remaining in the sum register is positive. The output from the blocking oscillator 183 is also applied through delay line 156a and cathode follower 157a to the SSL input of the accumulator. Thus, the sum register will be shifted left in the special manner described with respect to the division operation whereby the bit stored in the $2^{10}$ flip-flop of the sum register is transferred to the S flip-flop of the sum register instead of the $2^{11}$ flip-flop of the sum register. The output from the blocking oscillator 183 is also applied through a delay line 154a and through OR gate 152a and cathode follower 153a to the SML input of the multiplier register. Thus, the multiplier register will be shifted left. The output pulse passing through the AND gate 162a is also applied through the delay line 170 to the Zero input of the flip-flop 158 setting the flip-flop 158 back to its Zero state. This same sequence will occur each time a pulse from the gated oscillator 109 passes through the AND gate 162a. The delays imposed by the delay lines 146, 149, 151, 151a, 154a, and 156a are such that the entire sequence is completed during the interval between pulses.

The second pulse from the gated oscillator passing through the cathode follower 164a will not pass through the AND gate 162a since it no longer will be receiving an enabling signal from the One output of the flip-flop 158. The Zero output of the flip-flop 158 is applied through cathode follower 169 to AND gate 163a. The second pulse from the gated oscillator 109 passing through the cathode follower 164a will pass through the AND gate 163a and through the OR gate 147 to energize the blocking oscillator 148. The output signal of the blocking oscillator 148 is applied through cathode follower 189 to the ADD input of the accumulator, thus causing the contents of the addend register to again be added to the accumulator. The output signal from the blocking oscillator 148 will also pass through delay line 149 and cause the carry register to be emptied, the carry register to be cleared, a One to be stored in the $2^0$ flip-flop of the multiplier register if the resulting number in the sum register is positive and cause the multiplier register to be shifted left and the sum register to be shifted left in the same manner as described above. This same sequence of operations will occur each time a pulse from the gated oscillator 109 passes through the AND gate 163a. Each succeeding pulse from the gated oscillator 109 passing through the cathode follower 164a will either pass through the AND gate 162a or the AND gate 163a.

Each time the S flip-flop of the sum register is switched to its opposite state indicating that the sign of the number resulting in the sum register has been switched, a signal will be applied through OR gate 156 and through the OR gate 157 to the One input of the flip-flop 158 to switch the flip-flop 158 to its One state. Thus each time the sequence of operations caused by a pulse passing through the AND gate 163a results in the sign of the number in the sum register being switched, the next pulse from the gated oscillator 109 passing through the cathode follower 164a will pass through the AND gate 162a and cause the sequence of operations described for the AND gate 162a. As explained above, a pulse passing through AND gate 162a will cause the flip-flop 158 to switch to its Zero state. Thus ordinarily the following pulse from the gated oscillator 109 passing through the cathode follower 164a, would pass through the AND gate 163a and cause the sequence of operations described for this AND gate. However should the operations caused by the pulse passing through the AND gate 162a result in the sign of the number in the sum register being switched, the flip-flop 158 will be switched back to its One state again after it has been switched to its Zero state by the pulse passing through delay line 170 and the following pulse from the gated oscillator 109 passing through the cathode follower 164a will again pass through the AND gate 162a. This effect is achieved by designing the delay line 170 to cause the switching of the flip-flop 158 to its Zero state before the pulse passing through the cathode follower 175 causes the carry register to be emptied. Thus each time a pulse passing through either the AND gate 162a or the AND gate 163a causes the sign of the resulting number in the sum register to be switched, the following pulse from the gated oscillator 109 passing through the cathode follower 164a will pass through the AND gate 162a and cause the sequence of operations described for this AND gate. If the sign of the number in the sum register is not switched, the following pulse will pass through the AND gate 163a and cause the sequence of operations described for this AND gate. It will be observed that both sequences of operations are identical except that the pulse passing through the AND gate 162a will first cause the addend register to be complemented.

Each pulse from the gated oscillator 109 passing through the cathode follower 164a will also pass through the cathode follower 159a to cause the count registered in the counter 160a to decrease by One. These operations will continue for each pulse passing through the cathode follower 164a until the count registered in the counter 160a decreases to Zero at which time the counter will produce an output signal, which will be applied back to the Zero input of the flip-flop 152 and cause the flip-flop 152 to be switched back to its Zero state. The resulting number in the multiplier register will be the absolute value of the quotient. If the flip-flop 190 is in its One state indicating that the sign of the quotient is to be negative, the AND gate 192 will be enabled by the signal from the One output of the flip-flop 190 through cathode follower 191. The output signal from the counter 160a would then pass through the enabled AND gate 192 and the cathode follower 193, through the enabled AND gate 198, and through the OR gate 187 and the cathode follower 188 to the CMQ input of the multiplier register thus causing the quotient to be complemented. Thus the proper sign is given to the quotient.

After the flip-flop 152 is switched back to its Zero state, the gated oscillator 109 will no longer receive enabling signals from the flip-flop 152 and will stop producing pulses and the AND gates 160, 165a, 194, 198, and 195 will also no longer receive enabling signals. Likewise, the output from the $2^{10}$ stage of the accumulator will no longer be gated to the sign stage of the accumulator but will be gated to the $2^{11}$ stage as in normal operation. When the flip-flop 152 switches back to its Zero state, it will apply a signal back to the control unit indicating that the division operation has been completed and that the program may proceed to the next step. The Zero output from the flip-flop 152 is also applied to the Zero input of the flip-flop 190, to switch this flip-flop back to its Zero state.

Figure 15:
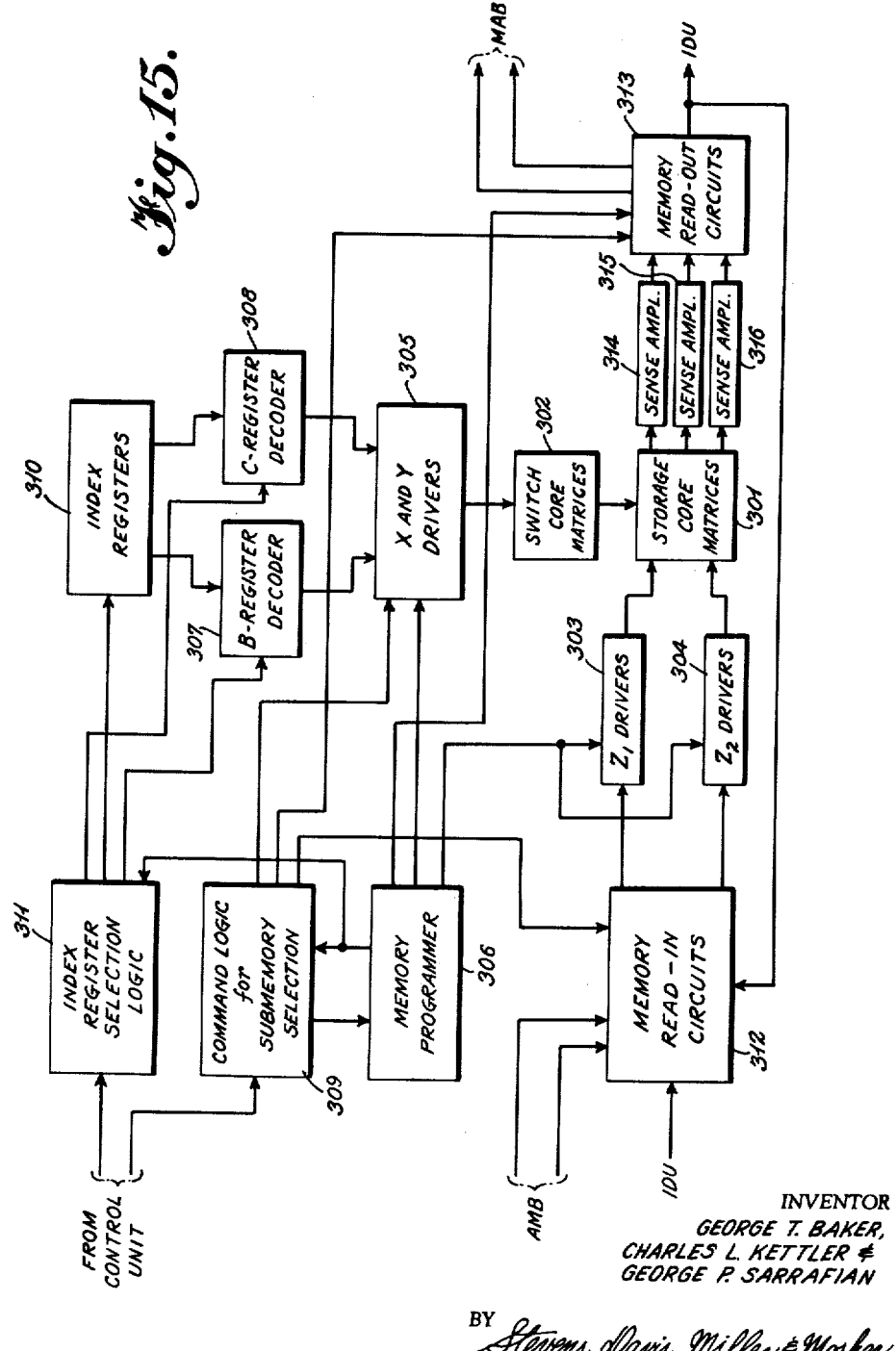
FIGURE 15 illustrates the memory unit of the computer in block form.

The memory unit can best be understood by referring to the block diagram of the entire memory unit shown in FIGURE 15 in conjunction with the FIGURES 16 through 29 illustrating details of the parts of the memory unit. The storage core matrix, designated by the reference number 301 in FIGURE 15, comprises a stack of 12 tiers of cores, each tier being just like the tier illustrated in FIGURE 16.

Assuming for purpose of description that the tiers of cores are stacked vertically, then 12 bit binary words are stored in the matrix with each bit of each word being stored in a corresponding core of a separate tier in the matrix, the corresponding cores being the cores which are vertically aligned in the matrix. The storage cores of the matrix are of the ferrite type having square hysteresis loops and thus are capable of assuming two stable states and require a pulse of predetermined size and direction to switch them from one state to the other. The state which the core assumes represents the bit store in the core.

Each tier of cores comprises at total of 256 cores and thus the matrix has a capacity of 256 12 bit words. The memory is divided vertically into two halves, storing 128 words each and designated the B section and the C section. The C section is further divided vertically into four equal parts, storing 32 words each and designated as the CA, CB, CC, and CD sections. The relative positions of these sections on each tier is shown in FIGURE 17.

Figures 16, 17:
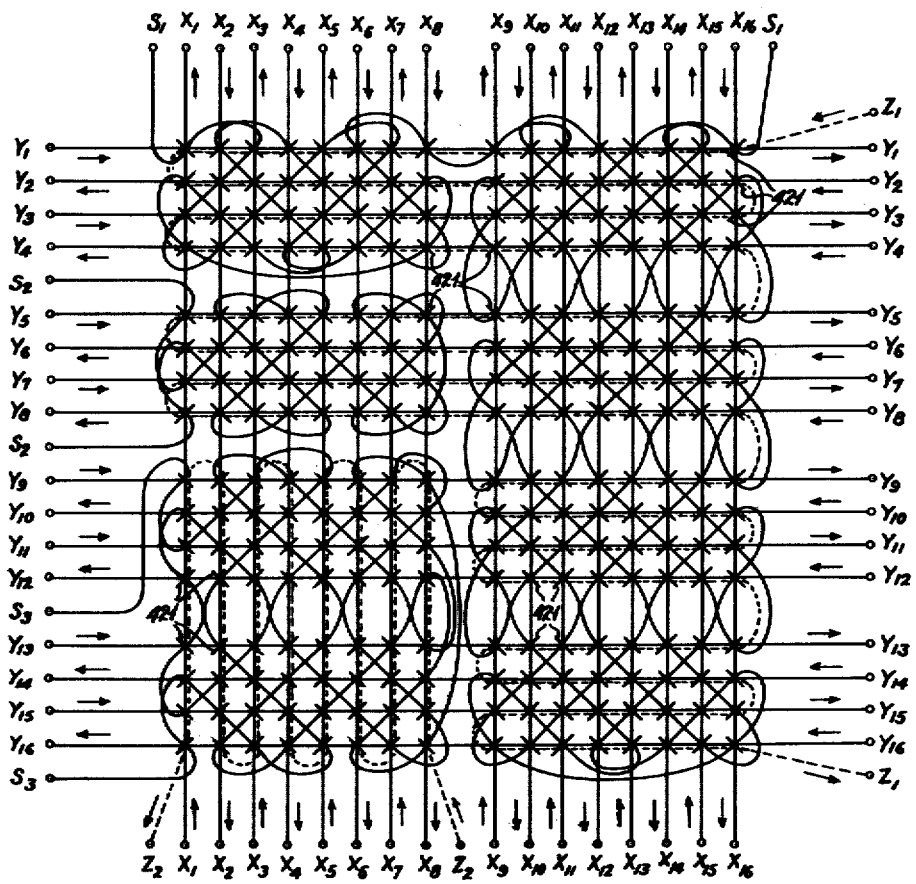
FIGURE 16 illustrates the details of the storage core matrix in the memory unit.
FIGURE 17 shows how the storage core matrix is divided into sections.

As shown in FIGURE 16 each tier of the matrix has 16 columns of cores and 16 rows of cores. The storage cores are designated generally by the reference number 421. A different one of a series of conductors designated $X_1$ through $X_{16}$ passes through each column of cores. A different one of a series of conductors $Y_1$ through $Y_{16}$ passes through each row of cores. As groups, the conductors $X_1$ through $X_{16}$ shall be referred to as the X conductors and the $Y_1$ through $Y_{16}$ conductors shall be referred to as the Y conductors.

To select one of the cores to be switched to the opposite state, current pulses are applied simultaneously to one of the series of conductors $X_1$ through $X_{16}$ and to one of the series of conductors $Y_1$ through $Y_{16}$. The current pulses are chosen to be of such size, that the core which is commonly threaded by both the X conductor and the Y conductor will receive sufficient power from the combined currents flowing in the X conductor and the Y conductor to cause the commonly threaded core to change its state, provided the current pulses have the right polarity. The current pulses are chosen to have a small enough magnitude so that the cores which are threaded by only one of the selected X or Y conductors do not receive sufficient power to cause them to change their states.

Since all of the tiers are identical, each tier will have conductors $X_1$ through $X_{16}$ and $Y_1$ through $Y_{16}$. All of the X conductors having the same designation are connected together in series and all of the Y conductors having the same designation are connected together in series. Each series connected group of conductors which have the same designation shall be referred to by that designation.

Figure 18:
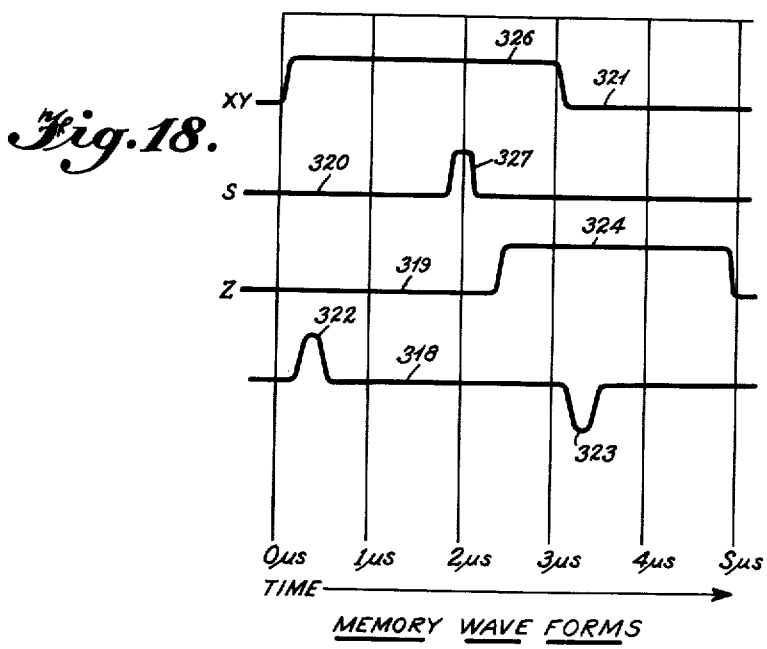
FIGURE 18 shows the current waveforms used in the memory unit to carry out the reading of information into and out of the storage core matrix.

When a word is to be read out from or stored in the storage core matrix, the switch core matrices, designated 302 in FIGURE 15, select the desired group of like designated, series connected X conductors and the desired group of like designated, series connected Y conductors and apply simultaneously to each selected series connected group a current wave form 318 shown in FIGURE 18. The wave form 318 comprises a positive pulse 322 and a negative pulse 323. When the wave form is applied to a selected series connected group of X or Y conductors it is applied with such a polarity that the current of the positive pulse flows in these conductors in the direction of the arrows in FIGURE 16. The pulses 322 and 323 are of insufficient amplitude alone to cause any change of state in the cores but the core in each tier which is commonly threaded by the selected X and Y conductor will receive enough power from the pulses 322 flowing in both the X and Y conductors to cause that core to switch to a first predetermined state. This first predetermined state is used to store the binary numeral Zero and accordingly this first predetermined state shall be referred to as the Zero state. The opposite state of each core is used to store the binary number One and hence this opposite state shall be referred to as the One state. When the pulses 322 are applied, some of the selected cores may already be in their Zero states. These cores will be unaffected by the pulses 322 and thus after the pulse 322, all of the selected cores will be in their Zero state. Following the application of the pulses 322, the pulses 323 will be applied to the selected X and Y conductors and as a result, all of the selected cores would tend to be switched to their One state so that the binary number 111111111111 would be stored in the selected address.

To store the desired binary word, the Z conductors are used. There are two Z conductors, $Z_1$ and $Z_2$, for each tier. The $Z_1$ conductor in each tier is threaded through all the cores in the tier which are in the B section and which are in the CA and CB sections. The $Z_2$ conductor in each tier is threaded through all the cores in the tier which are in the CC and CD sections of the tier. The $Z_1$ conductors of the matrix are pulsed by the $Z_1$ drivers, which are designated in FIGURE 15 by the reference number 303. The $Z_2$ conductors of the matrix are pulsed by the $Z_2$ drivers 304. If the selected word position in which the binary word to be stored is in the CA, CB, or B section, the $Z_1$ drivers will apply a current wave form 319, shown in FIGURE 18, to the $Z_1$ conductors of those tiers where a Zero is to be stored in the selected core. If the binary word is to be stored in the CC or CD section, the $Z_2$ conductors of those tiers in which the selected core is to store a Zero will receive the current wave form 319 from the $Z_2$ drivers 304. The wave 319 is applied to the selected Z conductors at the same time the wave form 319 is being applied to the selected X and Y conductors. The wave form 319 comprises an elongated positive current pulse 324 which is applied to the selected Z conductors in the direction indicated by the arrows in FIGURE 16. FIGURE 18 illustrates the time relationship between the wave forms 318 and 319. As shown in FIGURE 18, the current pulse 324 starts in the interval between the pulses 322 and 323 and lasts until after the pulse 323. After the pulses 322 have been applied, the selected core in each tier will be in its Zero state. Then when the pulses 323 are applied, the selected core in each tier, which does not have a pulse 324 applied on its Z conductor, will be switched from its Zero state to its One state. The selected cores in those tiers which do have pulses 324 applied on the appropriate Z conductors will not be switched, because the current flowing in the Z conductors will cancel out part of the current flowing in the selected X and Y conductors so that the selected core does not receive sufficient power to be switched to its One state. Thus, by pulsing or not pulsing selected ones of the $Z_1$ conductors if the word is to be stored in the B, CA, or CB section, or by pulsing or not pulsing selected ones of the $Z_2$ conductors if the word is to be stored in the CC or CD sections, any binary word can be stored in any selected address.

By using both the $Z_1$ and $Z_2$ conductors, a 24 bit word or two 12 bit words can be simultaneously stored in the core matrix. The selected address in the matrix for one of the 12 bit words will be in the CA or CB section of the matrix and the selected address for the other word will be in the CC or CD section of the matrix. The cores of both selected addresses must be threaded by the same series connected group of X conductors. To carry out the operation the switch core matrices will apply the current wave form 318 to one of the Y conductor groups $Y_1$ through $Y_8$ and one of the Y conductor groups $Y_9$ through $Y_{16}$ and one of the X conductor groups $X_1$ through $X_8$. Thus, there will be two addresses at which the selected X and Y conductors intersect and at these two intersections two 12 bit words will be stored. When a 24 bit word is stored in the matrix, the two halves of the word are stored in different positions in the manner described for two 12 bit words. In the case of a 24 bit word, the CA and CC sections should be selected because of the organization of the read out circuits.

Each tier of the matrix has three S conductors, an $S_1$, an $S_2$ and an $S_3$ conductor. The $S_1$ conductors thread the cores of the CA and B sections of the matrix. The $S_2$ conductors thread the cores of the CB section of the matrix, and the $S_3$ conductors thread the cores of the CC and CD sections of the matrix. The $S_1$, $S_2$ and $S_3$ conductors are used to read out words stored in the matrix. When the cores of the selected address receive the pulses 322, the cores which store a One will be switched to their Zero state and this switching will cause a pulse to be induced in the $S_1$, $S_2$, or $S_3$ conductors which thread the cores of the selected address. The cores which store a Zero will already be in their Zero state and therefore will not be switched and will not induce any pulses in the S conductors threading them. Twelve sense amplifiers 314 amplify the pulses induced in the twelve $S_1$ conductors, twelve sense amplifiers 315 amplify the pulses induced on the twelve $S_2$ conductors, and twelve sense amplifiers 316 amplify the pulses induced on the twelve $S_3$ conductors. The outputs of the amplifiers 314, 315, and 316 are applied to the memory read out circuits 313. When the induced pulses in the S conductors which are caused by the pulses 322, are applied to the memory read out circuits 313, they are converted to the dual conductor system and applied to the information distribution unit or the memory accumulator bus.

The fact that there are three S conductors in each tier, makes it possible to read out up to three 12 bit words simultaneously. When three 12 bit words or one 12 bit word and one 24 bit word are to be read out, one of the words will be in the CA section, one will be in the CB section and the third will be in the CC section. The switch core matrices will apply the current wave form 318 to one of the groups of conductors $X_1$ through $X_8$, one of the groups $Y_1$ through $Y_4$, one of the groups $Y_5$ through $Y_8$, and one of the groups $Y_9$ through $Y_{12}$. These will be at the same address in three different sub-memory sections specified by a single index register. Pulses will then be induced in all three S conductors of each tier, amplified by the amplifiers 314, 315 and 316 and converted to the dual conductor system by the memory read out circuits and applied to the information distribution unit, and the upper and lower halves of the memory accumulator bus.

To read out a 24 bit word or two 12 bit words to the memory accumulator bus, only two addresses are selected, one in the CA section and the other in the CC section.

The detailed circuitry of the switch core matrices 302 is illustrated in FIGURE 19. The switch core matrices comprise 32 permalloy tape-wound bobbin cores of the type having square hysteresis loops. The outputs from the switch core matrix positioned at the top of FIGURE 19 drive the series connected groups of conductors $X_1$ through $X_{16}$ of the storage matrix. This switch core matrix shall be referred to as the X switch core matrix. The outputs from the 16 cores shown at the bottom of FIGURE 19 drive the series connected groups of conductors $Y_1$ through $Y_{16}$ of the storage core matrix. This switch core matrix shall be referred to as the Y switch core matrix. The particular series connected group of conductors which each switch core drives is indicated at the output of each core. A conductor 325 is wound around each one of the 32 switch cores in series. A D.C. bias current is applied to the conductor 325 to bias the switch cores well into one of their stable states. Both the X switch core matrix and the Y switch core matrix are each arranged into columns and rows of four. In addition to the bias winding and the output winding, each switch core has two additional windings which shall be referred to as the first winding and the second winding. In the X switch core matrix, the first windings of all the cores which are in the same column are connected in series to form four conductors which are designated $X_{x1}$ through $X_{x4}$. In the X switch core matrix, the second winding of all the cores which are in the same rows are connected in series to form four conductors $X_{y1}$ through $X_{y4}$, respectively. Likewise, the first and second windings of the Y switch core matrices are series connected in columns and rows to form the conductors $Y_{x1}$ through $Y_{x4}$ and $Y_{y1}$ through $Y_{y4}$, respectively.

The X and Y switch core matrices operate in the same manner and any selected one of the X switch cores and any selected one of the Y switch cores can be operated to produce simultaneously the current wave form 318. This operation is done by driving a selected one of the conductors $X_{x1}$ through $X_{x4}$, a selected one of the conductors $X_{y1}$ through $X_{y4}$, a selected one of the conductors $Y_{x1}$ through $Y_{x4}$, and a selected one of the conductors $Y_{y1}$ through $Y_{y4}$ simultaneously with a wave form 321 shown in FIGURE 18. The wave form 321 comprises an elongated current pulse 326. This current pulse 326, when applied to the first or second windings of one of the switch cores, will have a polarity to cause a magnetization of the core in a direction opposite to that caused by the D.C. bias applied on conductor 325. One current pulse 326 alone, when applied to one of the windings of one of the switch cores, is insufficient to overcome the bias applied to the core over conductor 325 and therefore the core will remain in the stable state to which it is biased. However, when current pulse 326 is applied to both the first and second windings, the bias current will be more than cancelled out and the switch core will switch to the opposite state at the beginning of the application of pulse 326 and thus the pulse 322 will be induced in the output winding of the switch core. When the pulse 326 ends, the bias current will switch the switch core back to its original state, and the pulse 323 will then be induced in the output winding of the switch core. Thus, by the selection of the proper one of the conductors $X_{x1}$ through $X_{x4}$ and $X_{y1}$ through $X_{y4}$ any one of the cores of the X switch core matrix can be selected, and operated to produce the output pulses 322 and 323. Similarly, one of the cores of the Y switch core matrix can be selected and operated simultaneously with the X cores to produce the pulses 322 and 323.

Thus, to operate the switch core matrices, the wave form 321 must be applied simultaneously to one of the input conductors $Y_{x1}$ through $Y_{x4}$, one of the input conductors $X_{y1}$ through $X_{y4}$, one of the input conductors $Y_{x1}$ through $Y_{x4}$, and one of the input conductors $Y_{y1}$ through $Y_{y4}$. The wave form 321 is generated by the memory programmer, designated 306 in FIGURE 15 and applied to the selected input conductors of the switch core matrices through the X and Y drivers 305.

When two 12 bit words are to be entered in the storage core matrix simultaneously, the current wave form 321 will be applied to one of the input conductors $X_{x1}$ through $X_{x4}$, to one of the input conductors $X_{y1}$ and $X_{y2}$, one of the input conductors $Y_{x1}$ through $Y_{x4}$, one of the input conductors $Y_{y1}$ and $Y_{y2}$ and one of the input conductors $Y_{y3}$ and $Y_{y4}$. When a 24 bit word is to be stored, the input conductors $Y_{y1}$ and $Y_{y3}$ should be selected. When three 12 bit words are to be read out of the storage core matrix, or one 12 bit word and one 24 bit word, the current wave form 321 will be applied to the conductor $Y_{y1}$, to the conductor $Y_{y2}$, and to the conductor $Y_{y3}$ as well as one of the conductors $Y_{x1}$ through $Y_{x4}$, one of the conductors $X_{y1}$ and $X_{y2}$, and one of the conductors $X_{x1}$ through $X_{x4}$. When two 12 bit words or a 24 bit word are to be read out or stored, the conductor $Y_{y1}$ and the conductor $Y_{y3}$ will receive the current wave form 321. Of course, one of the conductors $Y_{x1}$ through $Y_{x4}$, one of the conductors $X_{x1}$ through $X_{x4}$ and one of the conductors $X_{y1}$ or $X_{y2}$ must also receive the current wave form 321 when two 12 bit words are to be read out.

When a binary word is to be stored in or read out of the storage core matrix, the control unit will give a command initiating the storing or read out operation and selecting the section of the memory into or out of which the word is to be read. The command WBM will cause the word existing in the information distribution unit to be entered into the B section of the storage core matrix. The command WCA will cause the word existing in the information distribution unit to be entered into the CA section of the storage core matrix. The command WCB will cause the word existing in the information distribution unit to be entered into the CB section of the storage core matrix. The command WCC will cause the word existing in information distribution unit to be entered into the CC section of the storage core matrix. The command WCD will cause the word existing in the information distribution unit to be entered into the CD section of the storage core matrix. The command RBM will cause a word to be read out of the B section of storage core matrix to the information distribution unit. The command RCA will cause a word to be read out of the CA section of the storage core matrix to the information distribution unit. The command RCB will cause a word stored in the CB section of the storage core matrix to be read out to the information distribution unit. The command RCC will cause a word stored in the CC section of the storage core matrix to be read out to the information distribution unit. The command RCD will cause a word stored in the CD section of the storage core matrix to be read out to the information distribution unit.

The particular word position or address in the section of the memory selected is determined by the binary number stored in one of five index registers which are designated generally in FIGURE 15 by the reference number 310. The control unit 14 will give a command to select a particular one of the index registers and the binary number stored in the selected index register will select an address in the selected section of the storage core matrix. Two of the five index registers are used exclusively to select addresses in the B section of the storage core matrix. These two index registers shall be referred to as the B1 and B2 index registers. The remaining three index registers are used exclusively to select addresses in the CA, CB, CC and CD sections of the storage core matrix. These index registers shall be referred to as the C1, C2 and C3 index registers. The commands SB1 and SB2 cause the B1 and B2 registers, respectively, to be selected and the commands SC1, SC2 and SC3 cause the C1, C2 and C3 registers, respectively, to be selected. To carry out the process of selecting a desired address in the selected section of the storage core matrix, the correct input conductors of the switch core matrices must be selected in response to the binary number stored in the selected index register. This selection of input conductors is carried out by the B reigster decoder 307 and the C register decoder 308.

The details of the B register decoder are illustrated in FIGURE 20. As shown in this figure, the B1 register comprises seven flip-flops 451 through 457 to store a seven digit binary number. The One outputs from the flip-flops 451 through 457 are applied to inputs of AND gates 401 through 407, respectively. The AND gates 401 through 407 each have two inputs. When the command SB1 is given, the index register selection logic 311 (FIGURE 15) will apply a signal to the other input of each of the AND gates 401 through 407. The outputs from the AND gates 401 through 407 are applied to a series of seven OR gates 411 through 417 respectively. The B2 register comprises seven flip-flops 461 through 467. The One outputs of the flip-flops 461 through 467 are applied to inputs of the AND gates 391 through 397, respectively. The AND gates 391 through 397 each have two inputs. When the command SB2 is given, the index register selection logic 311 will apply a signal to the other input of each of the AND gates 391 through 397. The outputs from the AND gates 391 through 397 are applied to the OR gates 411 through 417, respectively. When the command SB1 is given, signals will pass from the One outputs of those of the flip-flops 451 through 457 which contain One's through the enabled AND gates 401 through 407, respectively and through OR gates 411 through 417, respectively. When the command SB2 is given, signals will pass from the One outputs of those of the flip-flops 461 through 467 which contain One's through the AND gates 391 through 397, respectively, through the OR gates 411 through 417, respectively. Thus, the OR gates 411 through 417 will produce output signals in accordance with the ONE's stored in the flip-flops 451 through 457, respectively, whenever the command SB1 is given, and in accordance with the One's stored in the flip-flops 461 through 467 whenever the command SB2 is given. The outputs from the OR gates 411 through 417 are applied to the inputs of inverters 421 through 427, respectively. Each of the inverters 421 through 427 will produce a signal at its output whenever it does not receive a signal at its input. Thus, the inverters 421 through 427 will produce output signals in accordance with the Zero's stored in the flip-flops 451 through 457 whenever the command SB1 is given and in accordance with the Zero's stored in the flip-flops 461 through 467 whenever the command SB2 is given.

The outputs from the OR gates 411 through 417 and the outputs from the inverters 421 through 427 are applied in different combinations to a series of 14 AND gates 431 through 444. The AND gates 431 through 434 and 437 through 444 each have three inputs and the AND gates 435 and 436 each have two inputs. Whenever either the command SB1 or SB2 is given, the index register selection logic 311 will apply a signal to one of the inputs of each of the AND gates 431 through 444. The input to the B register decoder over which this signal is applied is designated by the logical symbolism $SB1+SB2$. The output from the inverter 421 is applied to inputs of the AND gates 437 and 439. The output from the inverter 422 is applied to inputs of the AND gates 437 and 438. The output from the inverter 423 is applied to inputs of the AND gates 441 and 443. The output from the inverter 424 is applied to inputs of the AND gates 441 and 442. The output from the inverter 425 is applied to inputs of the AND gates 431 and 433. Th output from the inverter 426 is applied to inputs of the AND gates 431 and 432. The output from the inverter 427 is applied to an input of the AND gate 435. The output from the OR gate 411 is applied to inputs of the AND gates 438 and 440 and the output from the OR gate 412 is applied to inputs of the AND gates 439 and 440. The output from the OR gate 413 is applied to inputs of the AND gates 442 and 444 and the output of the OR gate 414 is applied to inputs of the AND gates 443 and 444. The output from the OR gate 415 is applied to inputs of the AND gates 432 and 434 and the output from the OR gate 416 is applied to inputs of the AND gates 433 and 434. The output from the OR gate 417 is applied to an input of the AND gate 436. Each of the AND gates 431 through 434 and 437 through 444 will produce an output signal whenever signals are applied to all three of its inputs and each of the AND gates 435 and 436 will produce an output signal whenever signals are applied to both its inputs. Thus, the AND gates 431 through 444 will produce output signals in combinations responsive to the binary number stored in the B1 register whenever the command SB1 is given and responsive to the binary number stored in the B2 register whenever the command SB2 is given. For example, if the selected register contains the binary number 1010101, the AND gates 432, 436, 438 and 442 will produce output signals.

The output signals produced by the AND gates 431 through 444 will cause the X and Y drivers 305 to apply the current wave form 321 to selected ones of the input conductors $X_{x1}$ through $X_{x4}$, $X_{y3}$, $X_{y4}$, $Y_{x1}$ through $Y_{x4}$, and $Y_{y1}$ through $Y_{y4}$, respectively, of the switch core matrices 302.

FIGURE 21 illustrates the details of the C register decoder. The C1 register comprises five flip-flops 471 through 475 to store five digit binary numbers. The One outputs of the flip-flops 471 through 475 are applied to inputs of the AND gates 501 through 505, respectively. The outputs of the AND gates 501 through 505 are applied to OR gates 531 through 535, respectively. The C2 register comprises five flip-flops 481 through 485. The One outputs of the flip-flops 481 through 485 of the C2 register are applied to inputs of AND gates 511 through 515, respectively. The outputs of the AND gates 511 through 515 are applied to the OR gates 531 through 535, respectively. The C3 register comprises five flip-flops 491 through 495, respectively. The One outputs of the flip-flops 491 through 495 are applied to inputs of AND gates 521 through 525, respectively. The outputs of the AND gates 521 through 525 are applied to the OR gates 531 through 535, respectively. The AND gates 501 through 505, 511 through 515, 521 through 525 each have two inputs. The other inputs of the AND gates 501 through 505 will have a signal applied thereto by the index register selection logic 311 whenever the command SC1 is given. The other inputs of the AND gates 511 through 515 will have a signal applied thereto by the index register selection logic 311 whenever the command SC2 is given and the AND gates 521 through 525 will have a signal applied thereto by the index register selection logic 311 whenever the command SC3 is given. When the command SC1 is given, signals will pass from the One outputs of those of the flip-flops 471 through 475 which contain One's through the AND gates 501 through 505, respectively, and through the OR gates 531 through 535, respectively. When the command SC2 is given, signals will pass from the One outputs of those of the flip-flops 481 through 485 which contain One's through the AND gates 511 through 515, respectively, and through the OR gates 531 through 535, respectively. When the command SC3 is given, signals will pass from the One outputs of those of the flip-flops 491 through 495 which contain One's through the AND gates 521 through 525, respectively, and through the OR gates 531 through 535, respectively. Thus, the OR gates 531 through 535 will produce output signals in accordance with One's stored in the flip-flops 471 through 475 respectively, whenever the command SC1 is given, in accordance with the One's stored in the flip-flops 481 through 485, respectively, whenever the command SC2 is given, and in accordance with the One's stored in the flip-flops 491 through 495, respectively, whenever the command SC3 is given.

The output signals from the OR gates 531 through 535 are applied to the inputs of inverters 541 through 545. Each of the inverters 541 through 545 will produce an output signal whenever it does not receive a signal applied to its input. Thus, the inverters 541 through 545 will produce output signals in accordance with the Zero's stored in the flip-flops 471 through 475, respectively, whenever the command SC1 is given, in accordance with the Zero's stored in the flip-flops 481 through 485, respectively, whenever the command SC2 is given, and in accordance with the Zero's stored in the flip-flops 491 through 495, respectively, whenever the command SC3 is given.

The outputs from the inverters 541 through 545 and the OR gates 531 through 535 are applied in different combinations to the AND gates 551 through 560. The AND gates 551 through 554 and 557 through 560 each have three inputs and the AND gates 555 and 556 have two inputs. Whenever any one of the commands SC1, SC2, or SC3 is given, the index register selection logic 311 will apply a signal to one of the inputs of each of the AND gates 551 through 560. This signal will be applied on the input in FIGURE 21 designated by the logical symbolism $SC1+SC2+SC3$. The output from the OR gate 531 is applied to inputs of the AND gates 552 and 554. The output from the OR gate 532 is applied to inputs of the AND gates 553 and 554. The output from the OR gate 533 is applied to inputs of the AND gates 558 and 560. The output from the OR gate 534 is applied to inputs of the AND gates 559 and 560 and the output from the OR gate 535 is applied to an input of the AND gate 556. The output from the inverter 541 is applied to inputs of the AND gates 551 and 553. The output from the inverter 542 is applied to inputs of the AND gates 551 and 552. The output from the inverter 543 is applied to inputs of the AND gates 557 and 559. The output from the inverter 544 is applied to inputs of the AND gates 557 and 558 and the output from the inverter 545 is applied to an input of the AND gate 555. Each of the AND gates 551 through 554 and 557 through 560 will produce an output signal whenever signals are applied to all three of its inputs and each of the AND gates 555 and 556 will produce an output signal whenever signals are applied to both of its inputs. The AND gates 551 through 560 will therefore produce output signals in combinations responsive to the binary number stored in the C1 register whenever the command SC1 is given, responsive to the binary number stored in the C2 register whenever the command SC2 is given, and responsive to the binary number stored in the C3 register whenever the command SC3 is given. For example, if the selected one of the C1, C2, or C3 registers contains the binary number 10101, the AND gates 552, 556 and 558 will produce output signals.

The signals produced by the AND gates 551 through 560 will cause the X and Y drivers 305 to apply the current wave form 321 to the input conductors $X_{x1}$ through $X_{x4}$, $X_{y1}$, $X_{y2}$, and $Y_{x1}$ through $Y_{x4}$, respectively, of the switch core matrices 302. In this manner, the binary number stored in the selected index register controls the selection of the address in the selected section of the storage core matrix.

FIGURE 22 illustrates the details of the X and Y drivers 305. As shown in this figure, the X and Y drivers comprise 16 AND gates 351 through 366, the outputs of which are applied through amplifiers 331 through 346, respectively, to the input conductors $X_{x1}$ through $X_{x4}$, $X_{y1}$ through $X_{y4}$, $Y_{x1}$ through $Y_{x4}$, and $Y_{y1}$ through $Y_{y4}$, respectively, of the switch core matrices 302. The AND gates 351 through 366 each have two inputs. To one of the inputs of each of these AND gates the current wave form 321 is applied from the memory programmer 306. The outputs from OR gates 371 through 382 are applied to the other inputs of the AND gates 351 through 354 and 359 through 366, respectively. The outputs from the AND gates 431 through 434 and 437 through 444 of the B register decoder 307 are applied to the OR gates 371 through 382, respectively. The outputs from the AND gates 435 and 436 are applied to the other inputs of the AND gates 357 and 358, respectively. The outputs from the AND gates 551 through 554 and 557 through 560 of the C register decoder 308 are applied to the OR gates 371 through 378, respectively. The outputs of the AND gates 555 and 556 are applied to the other inputs of the AND gates 355 and 356, respectively. The command logic for the submemory selection designated 309 in FIGURE 15 will apply a signal to the OR gate 379 whenever either of the commands WCA or RCA is given. The command logic for the submemory selection 309 will apply a signal to the OR gate 380 whenever either the command WCB or the command RCB is given. The command logic for the submemory selection 309 will apply a signal to the OR gate 381 when either command WCC or the command RCC is given and will apply a signal to the OR gate 382 when either the command WCD or the command RCD is given. The current wave form 321 will pass through those of the AND gates 351 through 366 which have signals applied to their other inputs, through the amplifiers 331 through 346, respectively, to the selected input conductors of the switch core matrices. Whenever a word is entered into or read out of the storage core matrix, one of the AND gates 351 through 354 will receive a signal on its other input, one of the AND gates 355 through 358 will receive a signal on its other input, one of the AND gates 359 through 362 will receive a signal on its other input and one of the AND gates 363 through 366 will receive a signal on its other input. Thus, one of the input conductors $X_{x1}$ through $X_{x4}$, one of the input conductors $X_{y1}$ through $X_{y4}$, one of the input conductors $Y_{x1}$ through $Y_{x4}$, and one of the input conductors $Y_{y1}$ through $Y_{y4}$ will receive the current wave form 321.

Whenever two 12 bit words are to be entered into the storage core matrix simultaneously, both one of the commands WCA and WCB and one of the commands WCC and WCD must be given. In response to these commands, the command logic for submemory selection will apply a signal both to one of the AND gates 363 and 364 and to one of the AND gates 365 and 366. As a result, the current wave form 321 will be applied to one of the input conductors $Y_{y1}$ and $Y_{y2}$ and one of the input conductors $Y_{y3}$ and $Y_{y4}$. Whenever a 24 bit word is to be entered into the storage core matrix, the commands WCA and WCC will be given.

Whenever one 12 bit word and one 24 bit word or three 12 bit words are to be simultaneously read out of the storage core matrix the commands RCA, RCB, and RCC must be given. The command logic for submemory selection will then apply a signal to the AND gates 363, 364 and 365 through OR gates 379, 380 and 381, respectively. As a result, the current wave form 321 will be applied to the input conductors $Y_{y1}$, $Y_{y2}$ and $Y_{y3}$. When two 12 bit words or one 24 bit word is to be read out from the storage core matrix, the commands RCA and RCC must be given. The current wave form 321 will then be applied to the input conductors $Y_{y1}$ and $Y_{y3}$.

It will be observed that in all of these simultaneous read in and read out operations the selected addresses always will occupy the same relative position in the selected sections of the storage core matrix and a single binary number in the selected index register controls the addresses within the selected sections of all the words simultaneously entered in or read out.

Figure 23:
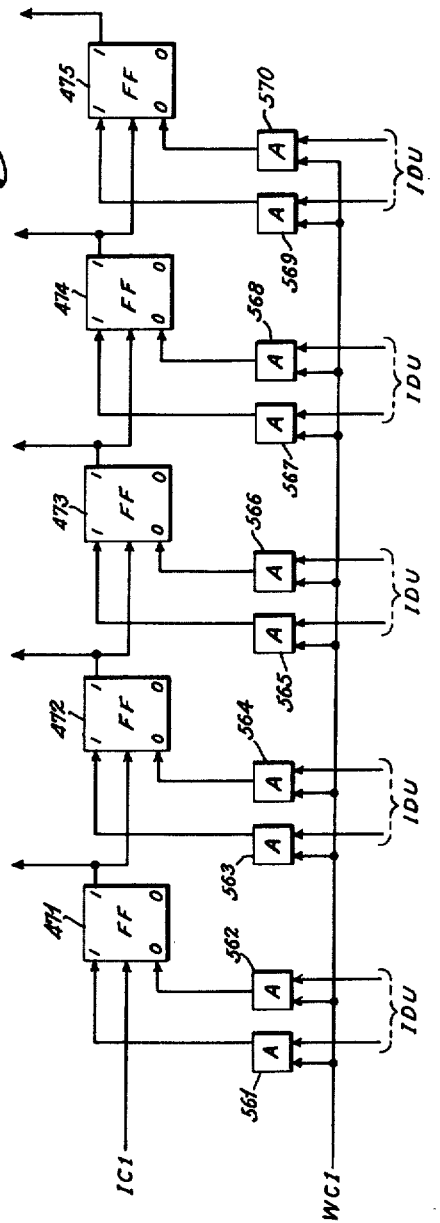
FIGURE 23 illustrates one of the index registers in block form.

FIGURE 23 illustrates the details of the C1 register, which, as stated above with reference to FIGURE 21, comprises five flip-flops 471 through 475. The command designated WC1 is the signal to cause the five bit binary number existing in the lower five stages of the information distribution unit to be stored in the C1 register. When the command signal WC1 is given the control unit will apply a signal to enable AND gates 561 through 570. The binary number existing in the lower five stages of the information distribution unit will then pass through the AND gates 561 through 570 to be registered in the flip-flops 471 through 475.

The command signal designated IC1 will cause the binary number stored in the C1 register to increase by one. When the command IC1 is given, the control unit will apply a signal to the flip-flop 471 causing it to switch to its opposite state. If the flip-flop 471 is switched from its One state to its Zero state, it will apply a signal to flip-flop 472 which will cause the flip-flop 472 to switch to its opposite state. If the flip-flop 472 is switched from its One state to its Zero state it will apply a signal to the flip-flop 473 and cause the flip-flop 473 to switch to its opposite state. The flip-flop 473 and the flip-flop 474 likewise cause the flip-flops 474 and 475, respectively, to switch to their opposite states if the flip-flops 473 and 474, respectively, are switched to their Zero states. Thus, the flip-flops 471 through 475 are connected as a binary counter and whenever the command IC1 is given the binary number stored in the C1 register will be increased by one.

The C2 register is exactly the same as a C1 register. The command to cause the five bit binary number existing in the lower five stages of the information distribution unit to be registered in the C2 register is designated WC2 and the command to cause the binary number registered in the C2 register to be increased by one is designated IC2.

The B1 and B2 registers are also similar to the C1 register except that they comprise seven flip-flops instead of five. The commands WB1 and WB2 will cause the seven bit binary number existing in the lower seven stages of the information distribution unit to be registered in the B1 and B2 registers, respectively. The commands IB1 and IB2 will cause the contents of the B1 and B2 registers, respectively, to be increased by one.

The details of the C3 register are shown in FIGURE 24. As stated above with reference to FIGURE 21, the C3 register comprises five flip-flops 491 through 495. When the command WC3, to store the binary number existing in the lower five stages of the information distribution unit in the C3 register, is given, the control unit will apply a signal to the AND gates 571 through 580. The binary number existing in the lower 5 stages of the information distribution unit will then pass through the AND gates 571 through 580 to be registered in the flip-flops 491 through 495. Whenever the command RC3, to read the contents of the C3 register out to the lower five stages of the information distribution unit, is given, the control unit will apply a signal to AND gates 581 through 590. The contents of the flip-flops 491 through 495 will then pass through the enabled AND gates 581 through 590 to the lower five stages of the information distribution unit.

Whenever the command IC3, to increase the binary number stored in the C3 register by one, is given, the control unit will apply a signal to AND gates 591 through 594. This signal from the control unit will also pass through OR gate 595 to cause the flip-flop 491 to switch to its opposite state. If, when this command is given, the flip-flop 491 switches from its One state to its Zero state, the flip-flop 491 will apply a signal through the enabled AND gate 591 through OR gate 596 to cause the flip-flop 492 to switch to its opposite state. In like manner each of the preceding flip-flops 492 through 494 will apply a signal through the enabled AND gates 592 through 594, respectively, through OR gates 597 through 599, respectively, to cause the succeeding flip-flops 493 through 495, respectively, to switch to their opposite states if the preceding flip-flop switches from its One state to its Zero state when the command IC3 is given. In this manner, the number stored in the C3 register will be increased by one each time the command IC3 is given.

When the command DC3, to decrease the binary number stored in the C3 register by one, is given, the control unit will apply a signal through the OR gate 595 to cause the flip-flop 491 to switch to its opposite state. This signal is also applied to the AND gates 600 to 603. If the flip-flop 491 is switched from its Zero to its One state, it will apply a signal through the enabled AND gate 600 through the OR gate 596 to cause the flip-flop 492 to switch to its opposite state. Likewise, each of the preceding flip-flops 492 through 495 will apply a signal through the enabled AND gates 601 through 603, respectively, through the OR gates 597 through 599, respectively, to cause the succeeding flip-flops 493 through 495, respectively, to switch to its opposite states, if the preceding flip-flop is switched from its Zero to its One state when the command DC3 is given. Thus, in this manner the binary number stored in the C3 register will be decreased by one whenever the command DC3 is given.

In summary, the number stored in the C3 register can be entered from the lower five stages of the information distribution unit, it can be read out from the C3 register into the lower five stages of the information distribution unit, it can be increased by one, or it can be decreased by one.

The memory read in circuits designated 312 in the FIGURE 15 controls which of the Z1 drivers and which of the Z2 drivers receive the current wave form 319 and thus determine in which tiers of the storage core matrix a Zero will be stored in the selected address or addresses. The details of the memory read in circuits are illustrated in FIGURE 26. There are twelve memory read in circuits, one for each digit of a 12 bit binary number. Each memory read in circuit controls the storing of One's and Zero's in the core or cores of the selected address or addresses in a different tier of the storage core matrix. For convenience, only three of the memory read in circuits have been shown as each read in circuit is identical.

The commands to enter the word existing in the information distribution unit into the storage core matrix, are WBM, WCA, WCB, WCC, and WCD. When any of these commands are given the command logic for submemory selection 309 will apply a signal to AND gates 611 and 612 of each read in circuit. In each read in circuit the outputs from the AND gates 611 and 612 are applied through OR gates 613 and 614, respectively, through cathode followers 615 and 616, respectively, to the One and Zero inputs of a flip-flop 617. When the enabling signal is applied from the command logic for the submemory selection 309 to the AND gates 611 and 612, the 12 bit binary word existing in the information distribution unit will pass through the AND gates 611 and 612, through the OR gates 613 and 614, and through the cathode followers 615 and 616 to be registered in the 12 flip-flops 617.

In each read in circuit the Zero output from the flip-flop 617 is applied through a cathode follower 618 to the inputs of a pair of AND gates 619 and 620. The AND gates 619 and 620 have three inputs and require an input signal applied to all three inputs to produce an output signal. A signal will be applied to the second input of each of the AND gates 619 and 620 whenever neither the command WAC nor the command RAC is given. The logic for producing this input to the AND gates 619 and 620 may be similar to that used in the command logic for submemory selection 309 or the index register selection logic 311, which are described in detail below. The command logic for submemory selection 309 will apply an enabling signal to the third input of the AND gates 619 whenever any of the commands WBM, RBM, WCA, RCA, WCB, or RCB is given. The command logic for submemory selection 309 will apply enabling signals to the third inputs of the AND gates 620 whenever any of the commands WCC, RCC, WCD, or RCD is given. The output from the AND gate 619 in each read in circuit is applied through an OR gate 621 through a cathode follower 622 to a different one of twelve Z1 drivers, which are designated in FIGURE 15 by the reference number 303. The output from the AND gate 620 in each read in circuit is applied through an OR gate 623 and through the cathode follower 624 to a different one of twelve Z2 drivers, which are designated 304 in FIGURE 15.

The memory programmer 306 applies the current wave form 319 to each of the Z1 and Z2 drivers. Each of the Z1 drivers, in response to receiving a signal from the respective read in circuit, will apply the current wave form 319 to one of the Z1 conductors. Likewise, each of the Z2 drivers in response to a signal from the respective read in circuit, will apply the current wave form to one of the Z2 conductors. The Z1 and Z2 drivers 303 and 304 are not shown in detail but could comprise an AND gate and amplifier combination similar to that of the X and Y drivers 305.

When one of the commands WBM, WCA, or WCB is given, the binary word existing on the information distribution unit will be registered in the twelve flip-flops 617. Those flip-flops 617, which then contain a Zero, will apply an output signal through the respective cathode followers 618 to the respective AND gates 619. The AND gates 619 will be enabled and thus an output signal will be produced from those AND gates 619 which receive signals from the flip-flop 617. The output signals from the AND gates 619 will be applied through the respective OR gates 621 and the respective cathode followers 622 to the respective Z1 drivers. The Z1 drivers 303 which receive signals from the respective AND gates 620 will then apply the current wave form 319 to the respective Z1 conductors. Thus, the Z1 conductors in those tiers of the storage core matrix in which a Zero is to be stored at the selected address will receive the current wave form 319, if the selected address is in the section threaded by the Z1 conductors, and thus Zero's will be stored in the cores of these tiers at the selected address.

When the command to store the binary word on the information distribution unit in the CC section or the CD section of the storage core matrix is given, the command logic for the submemory selection 309 will apply an enabling signal to the AND gates 611 and 612 and the binary word existing on the information distribution unit will be registered in the flip-flops 617. Those flip-flops 617, which then register a Zero, will apply an output signal to the respective AND gates 620. The AND gates 620 will be enabled and therefore will apply an output signal to the respective Z2 drivers through the respective OR gates 623 and cathode followers 624. The Z2 drivers receiving these output signals from the memory read in circuits will then apply the current wave form 319 to the respective Z2 conductors. Thus, the Z2 conductors in those tiers of the storage core matrix in which a Zero is to be stored at the selected address will receive the current wave form 319, if the selected address is in a section threaded by the Z2 conductors and thus Zero's will be stored in the cores in these tiers at the selected address.

The conductor of each stage of the lower half of the accumulator memory bus is applied to the OR gate 623 in a different read in circuit. The conductor of each stage of the upper half of the accumulator memory bus is applied to the OR gate 621 in a different one of the read in circuits. When it is desired to transfer a 24 bit word from the accumulator to the storage core matrix, the command RAC will be given. This command will cause the 24 bit word registered in the sum register to be put on the accumulator memory bus. This command will also prevent a signal from being applied to the second inputs of the AND gates 619 and 620. At the same time the command RAC is given, the commands WCA and WCC will be given. Also, one of the commands SC1, SC2, or SC3 will be given. Signals will be applied from the conductors of those stages of the lower half of the accumulator memory bus on which there are Zero's through the respective OR gates 623 through the respective cathode followers 624 to the respective Z2 drivers. These respective Z2 drivers will then apply the current wave form 619 to the respective Z2 conductors and the lower half of the 24 bit word will be stored in the CC section of the storage core matrix at the address selected by the binary number stored in the selected index register. Signals will also be applied from the conductors of those stages of the upper half of the accumulator memory bus on which there are Zero's through the respective OR gates 621 through the respective cathode followers 622 to the respective Z1 drivers. These respective Z1 drivers will then apply the current wave form 619 to the respective Z1 conductors and the upper half of the 24 bit word will be stored in the CA section of the memory at the address selected by the binary number in the selected index register. Two twelve bit words can be stored in the storage core matrix in the same manner. For two separate twelve bit words, it is not necessary that the CA and CC sections of the storage core matrix be selected to store the twelve bit words. The CB section of the storage core matrix may be selected instead of the CA section and the CD section may be selected instead of the CC section.

When a command to read information out from the storage core matrix to the information distribution unit is given, provision is made to restore the word read out in the position in the storage core matrix from which the word is read. Signals will be applied from the read out circuits for each tier of the storage core matrix through the OR gates 613 and 614 of each read in circuit through the cathode followers 615 and 616 to the flip-flops 617. The flip-flops 617 then will register the word read out from the selected address in the storage core matrix. The command logic for submemory selection 309 will apply an enabling signal to the AND gates 619 if the selected address is in the B section or the CA or CB section of the storage core matrix and thus signals will be applied to the Z1 drivers for those tiers from which a Zero is read out. The current wave form 319 will then be applied to the Z1 conductors of the tiers from which a Zero is read out. If the selected address from which the read out takes place is in the CC section or in the CD section, the command logic for submemory selection 309 will apply an enabling signal to the AND gates 620 and the read in circuits will then apply signals to the Z2 drivers for those tiers of the storage core matrix from which a Zero was read out. In response thereto the Z2 drivers will apply the current wave form 319 to the Z2 conductors of these tiers of the storage core matrix. The read out operation takes place after the pulse 322 of the current wave form 318 but before the pulse 324 is applied to the Z conductors of those tiers of the storage matrix from which a Zero is read during the same cycle that the binary word is read out from the storage core matrix. Thus, the read out and restoring all takes place during one read out cycle.

There are twelve read out circuits, one for each tier of the storage core matrix. Each read out circuit is identical so only one read out circuit has been shown in FIGURE 2. The output from each of the twelve amplifiers 314, which amplify the signals induced in the S1 conductors, is applied to a different one of the read out circuits. The output from each of the twelve amplifiers 315, which amplify the signals induced in the S2 conductors, is applied to a different one of the read out circuits. The output from each of the twelve amplifiers 316, which amplify the signals induced in the S3 conductors, is applied to a different one of the read out circuits. The output from each of the amplifiers 314, will be applied to an inverter 632 and an amplifier 631 in one of the read out circuits. The output from each of the amplifiers 315 is applied to an amplifier 633 and an inverter 634 in one of the read out circuits. The output from each of the amplifiers 316 is applied to an amplifier 635 and an inverter 636 in one of the read out circuits.

Each of the inverters 632, 634, and 636 in each read out circuit will produce a signal at its output whenever it does not receive a signal at its input. The outputs from inverters 632, 634, and 636 are applied to AND gates 637 through 639 respectively. The memory programmer 306 applies a wave form, designated 320 in FIGURE 18, to each memory read out circuit 313 whenever a command to read out from the storage core matrix is given. This wave form contains a pulse 327 which has the time relationship shown in FIGURE 18. The wave form 320 will be applied to the AND gates 631, 633, 635 and 637 through 639 in each of the read out circuits. The outputs from the AND gates 631 and 637 are applied to AND gates 643 and 640 respectively. The outputs from the AND gates 635 and 639 are applied to AND gates 644 and 641 respectively. The outputs from the AND gates 633 and 638 are applied to OR gates 642 and 645 respectively. The command logic for the submemory selection 309 will apply an enabling signal to the AND gates 640 and 643 whenever either the command RBM or RCA is given while at the same time either the command RCA or the command RCC is not given. The outputs from the AND gates 643 and 640 are applied to the OR gates 642 and 645, respectively. The command logic for the submemory selection 309 will apply an enabling signal to the AND gates 644 and 641 whenever the command RCC or the command RCD is given and either the command RCA or the command RCC is not given. The outputs from the AND gates 644 and 641 are applied to OR gates 642 and 645 respectively. In order for the AND gates 633 and 638 to produce an output signal they must receive an enabling signal from the command logic for submemory selection and this signal will be applied whenever the command RCB is given. The outputs from the AND gates 633 and 638 are applied to the OR gates 642 and 645, respectively. The outputs from the OR gates 642 and 645 in each read out circuit are applied to a different stage of the information distribution unit and the outputs are also applied to the OR gates 613 and 614, respectively, in the memory read in circuit for the same tier of the storage core matrix. The outputs from AND gates 631 and 637 in the read out circuit for each tier of the storage core matrix are applied to a different stage of the upper half of the memory accumulator bus. The output from the AND gates 635 and 639 in the read out circuit for each tier of the storage core matrix is applied to a different stage of the lower half of the memory accumulator bus.

Whenever either the command RCA or RBM is given, positive going pulses will be induced in those S1 conductors which are in tiers which contain One's at the selected address. These pulses will be caused by the pulse 322 of the wave form 318. Those S1 conductors which are in tiers which contain Zero's at the selected address will have no pulses induced in them at this time. The induced pulses after being amplified by the respective amplifiers 314 are applied to the AND gates 631 and inverters 632 in the respective read out circuits. The inverters in these respective read out circuits upon receiving the induced pulses will stop applying a signal to the AND gates 637. The inherent delay in the read out system will cause the induced pulses to arrive at the AND gates 631 and inverters 632 at the time of the pulse 327 of the wave form 320. The AND gates 631 which receive pulses will therefore produce output signals at this time. The inverters 632, which are in read out circuits for tiers in which Zero's are stored at the selected address, will not receive pulses at the time the pulse 327 is applied to the AND gate 637 and therefore the inverters 632 in these respective read out circuits will be applying signals to the AND gates 637 at this time. The AND gates 637 in those read out circuits for tiers which contain Zero's at the selected address will therefore produce output signals at this time. Thus, the AND gates 631 and 637 in each read out circuit will produce output signals in accordance with the digit stored at the selected address in the respective tier whenever the commands RCA or RBM are given.

In the same manner the AND gates 633 and 638 will produce output signals in accordance with the digit stored at the selected address in the respective tier whenever the command RCB is given. Likewise, the AND gates 635 and 639 in each read out circuit will produce output signals in accordance with the digit stored at the selected address in the respective tier whenever the command RCC or RCD is given.

The output signals produced by the AND gates 631 and 637 will pass through the AND gates 643 and 640 if they are enabled through the OR gates 642 and 645 to the information distribution unit. The output signals produced by the AND gates 633 and 639 will pass through the AND gates 644 and 641, if enabled, through the OR gates 642 and 645 to the information distribution unit. Of course, the computer will be programmed so that only one word at a time will ever be read out to the information distribution unit. The output signals produced at the outputs of the AND gates 631 and 637 are also applied to the upper half of the memory accumulator bus and the signals produced at the outputs of the AND gates 635 and 639 are applied to the lower memory accumulator bus for reading out 24 bit words or for simultaneous multiple read out.

When it is desired to read out three 12 bit words or one 12 bit word, and one 24 bit word, the commands RCA, RCB, and RCC will be given. Signals will be produced at the outputs of the AND gates 631 and 637, 633 and 638, and 635 and 639 in accordance with the information stored at the three selected locations. The outputs from the AND gates 631 and 637 will be applied to the upper half of the memory accumulator bus, the outputs from the AND gates 635 and 639 will be applied to the lower half of the memory accumulator bus, and the outputs of the AND gates 633 and 638 will be applied to the information distribution unit. Thus, the two 12 bit words stored in the CA and CC sections will be read out to the upper and lower halves of the memory accumulator bus and the 12 bit word stored in the CB section will be read out to the information distribtuion unit. The signals from the AND gates 631 and 637 and the AND gates 635 and 639 will not pass to the information distribution unit because the AND gates 643 and 640 and the AND gates 644 and 641 will not receive enabling signals from the command logic for submemory selection due to the fact that both the commands RCA and RCC are given.

When a 24 bit word or two 12 bit words are to be read out, the commands RCA and RCC will be given and signals will be produced at the outputs of the AND gates 631 and 637 and the AND gates 635 and 639 in accordance with the 24 bit word stored at the two selected addresses. These signals will be passed to the lower and upper halves of the memory accumulator bus. The AND gates 643 and 640, 644 and 641 will not be enabled by a signal from the command logic for submemory selection because both the commands RCA and RCC will be given and therefore no signals will pass to the information distribution unit.

The described connections between the information distribution unit 15 and the memory read in circuits 312, between the accumulator memory bus 16 and the memory read in circuits 312 between the memory read in circuits 312 and the Z1 and Z2 drivers 303 and 304, between the memory read out circuits 313 and the memory read in circuits 312, between the Z1 drivers 303 and the Z1 conductors, between the Z2 drivers 304 and the Z2 conductors, between the S1 conductors and the sense amplifiers 314, between the S2 conductors and the sense amplifiers 315, between the S3 conductors and the sense amplifiers 316, between the sense amplifiers 314, 315, and 316 and the memory read out circuits 313, between the memory read out circuits 313 and the information distribution unit 15, and between the memory read out circuits 313 and the memory accumulator bus 10 are all such that each digit of the binary number operated upon always is placed in the correct tier of the storage core matrix and on the correct stages of the information distribution unit, the accumulator memory bus, and the memory accumulator bus according to the order of the digit.

Figure 28:
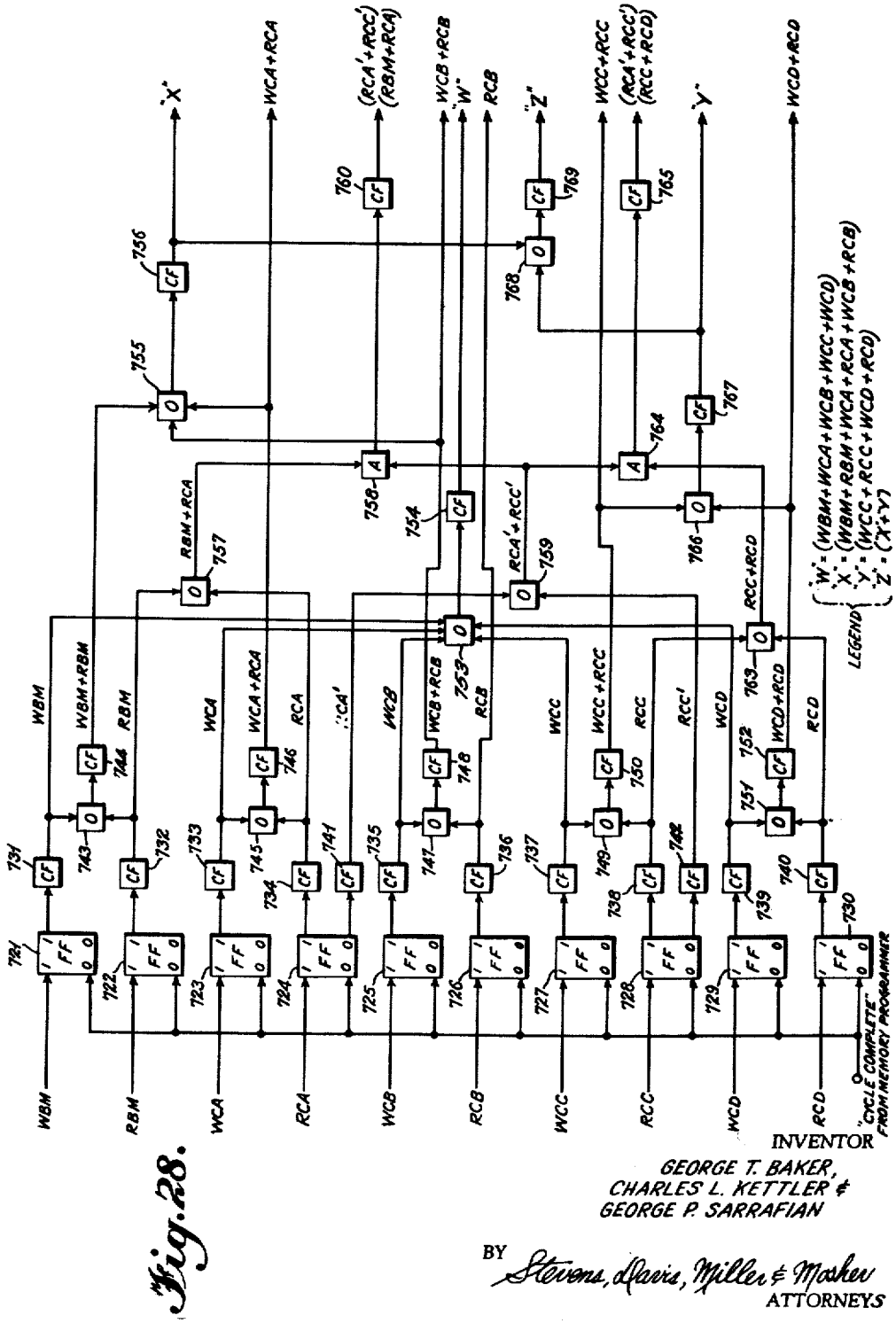
FIGURE 28 illustrates in block form the command logic for submemory selection which stores the commands to read information out of or into selected sections of the storage core matrix and applies to various parts of the memory unit the signals required to carry out these commands.

FIGURE 28 illustrates the details of the command logic for the submemory selection 309. The function of this circuitry is to store the signals from the control unit for the commands WBM, RBM, WCA, RCA, WCB, RCB, WCC, RCC, WCD, and RCD and to apply signals in response thereto to the X and Y drivers 305, to the memory read out circuits 313, to the memory read in circuits 312 and to the memory programmer.

When the command WBM is given a signal will be applied to the One input of flip-flop 721 to set this flip-flop in its One state. In the same manner flip-flops 722 through 730 are set into their One states whenever the commands RBM, WCA, RCA, WCB, RCB, WCC, RCC, WCD, and RCD, respectively, are given. Thus these commands are stored by the flip-flops 721 through 730. The One outputs of the flip-flops 721 through 730 are applied to cathode followers 731 to 740, respectively. Thus, the cathode followers 731 through 740 will produce output signals in accordance with the commands given. The Zero output of the flip-flop 724 is applied to a cathode follower 741 and the cathode follower 741 therefore will produce an output signal whenever the command RCA is not given. The Zero output of the flip-flop 728 is applied to the cathode follower 742 and hence the cathode follower 742 will produce an output signal whenever the command RCC is not given.

The outputs from the cathode followers 731 and 732 are applied to an OR gate 743. The output from the OR gate 743 is applied to a cathode follower 744. The cathode follower 744, as a result, will produce an output signal when either the command RBM or the command WBM is given. The outputs from the cathode followers 733 and 734 are applied to an OR gate 745 and the output from the OR gate 745 is applied to a cathode follower 746. Accordingly, the cathode follower 746 will produce an output signal whenever the command WCA or the command RCA is given. The outputs from the cathode followers 735 and 736 are both applied to an OR gate 747 and the output from the OR gate 747 is applied to a cathode follower 748 which then will produce an output signal when either the command WCB or the command RCB is given. The outputs from the cathode followers 737 and 738 are both applied to an OR gate 749 and the output from the OR gate 749 is applied to a cathode follower 750. The cathode follower 750, therefore, will produce an output signal when either the command WCC or the command RCC is given. The outputs from the cathode followers 739 and 740 are applied to an OR gate 751 and the output from the OR gate 751 is applied to a cathode follower 752. An output signal from the cathode follower 752 will then be produced whenever the command WCD or the command RCD is given.

The outputs from the cathode followers 746, 748, 750 and 752 are applied to the OR gates 379 through 382, respectively, of the X and Y drivers 305 as has been described with reference to FIGURE 22.

The outputs from the cathode followers 731, 733, 735, 737, and 739 are all applied to an OR gate 753 and the output from the OR gate 753 is applied to a cathode follower 754. The cathode follower 754 will then produce an output signal whenever any of the commands WBM, WCA, WCB, WCC, or WCD is given. This output signal is applied to the AND gates 611 and 612 of the memory read in circuits 312 as described with reference to FIGURE 26.

The outputs from the cathode followers 744, 746 and 748 are all applied to an OR gate 755 and the output from the OR gate 755 is applied to the cathode follower 756. Accordingly, the cathode follower 756 will produce an output signal whenever any of the commands WBM, RBM, WCA, RCA, WCB, or RCB is given. This output signal is applied to the AND gates 619 of the memory read in circuits as described with reference to FIGURE 26.

The output from the cathode followers 732 and 734 are applied to an OR gate 757. The output from the OR gate 757 is applied to one of the two inputs of an AND gate 758. The outputs from the cathode followers 741 and 742 are both applied to an OR gate 759 and the output from the OR gate 759 is applied to the other input of the AND gate 758. The output from the AND gate 758 is applied to a cathode follower 760. In accordance with this circuitry the cathode follower 760 will produce an output signal when both either the command RBM or the command RCA is given and at the same time either the command RCA or the command RCC is not given. This output signal is applied to the AND gates 643 and 640 in the memory read out circuits 313 as has been described with reference to FIGURE 27.

The output from the cathode follower 736 is applied to the AND gates 633 and 638 of the read out circuits as has been described with reference to FIGURE 27.

The outputs from the cathode followers 738 and 740 are applied to an OR gate 763 and the output from the OR gate 763 is applied to an AND gate 764. The output from the OR gate 759 is applied to the other input of the AND gate 764. The output from the AND gate 764 is applied to a cathode follower 765. The cathode follower 765 will thus produce an output signal when both either the command RCC or the command RCD is given and either the command RCA or RCC is not given. This output signal is applied to the AND gates 641 and 644 of the memory read out circuits 313 as has been described with reference to FIGURE 27.

The outputs from the cathode follower 750 and the OR gate 763 are applied to an OR gate 766 and the output from the OR gate 766 is applied to a cathode follower 767. The cathode follower 767 will therefore produce an output signal when either the command WCC, RCC, WCD, or RCD is given. This output signal is applied to the AND gates 620 of the memory read in circuits 312 in the manner which has been described with reference to FIGURE 26.

The outputs of the cathode followers 756 and 767 are both applied to an OR gate 768 and the output from the OR gate 768 is applied to a cathode follower 769. The cathode follower 769 will produce an output signal when any of the commands WBM, RBM, WCA, RCA, WCB, RCB, WCC, RCC, WCD, or RCD is given. This output signal is applied to the memory programmer 306 to initiate its operation to produce the wave forms 321, 320 and 319.

The various outputs of the command logic for sub-memory selections have been indicated in logical symbolism. The logical symbolism for the outputs "W," "X," "Y," and "Z" are indicated in the legend at the bottom of FIGURE 28.

4.8 microseconds after the commands are given to set one or more of the flip-flops 721 through 730 to their One states, the memory programmer 706 will apply a signal to the Zero inputs of the flip-flops 721 through 730 to switch these flip-flops to their Zero states. This signal from the memory programmer is referred to as the cycle complete signal.

Figure 25:
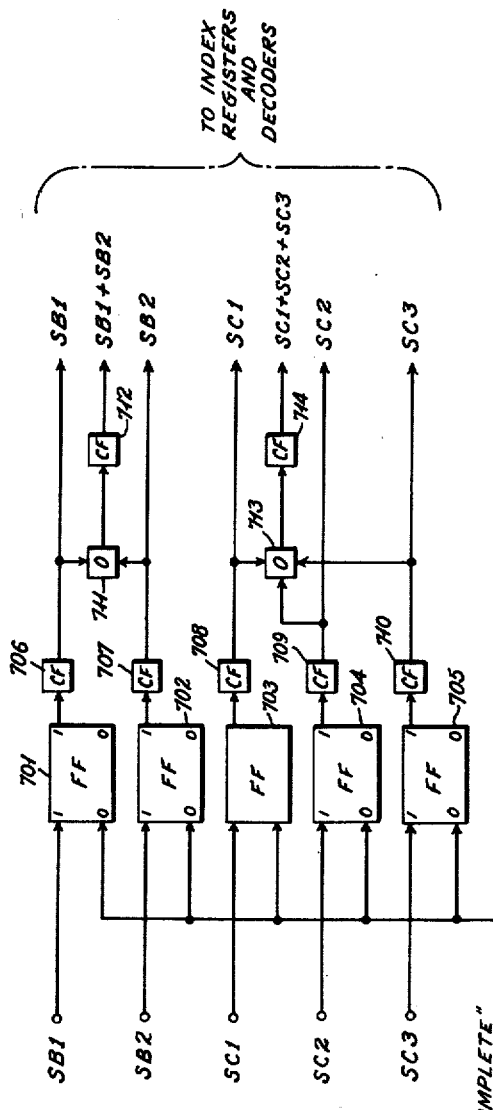
FIGURE 25 illustrates in block form the index register selection logic which stores the commands from the control unit selecting one of the index registers and applies the required signals to the index registers and to the B and C register decoders to carry out these commands.

FIGURE 25 illustrates the details of the index register selection logic 311. The function of the index register selection logic is to store the commands SB1, SB2, SC1, SC2 and SC3 and, in response to these commands, to apply signals to the index register 310 and to the B and C register decoders 307 and 308. Whenever the command SB1 is given the control unit will apply a signal to the One input of flip-flop 701 causing this flip-flop to be set in its One state. Similarly, whenever the commands SB2, SC1, SC2, or SC3 are given the control unit will apply a signal to set the flip-flops 702 through 705, respectively, to their One states. The One outputs of the flip-flops 701 through 705 are applied to the cathode followers 706 through 710, respectively. Thus, the cathode followers 706 through 710 will produce output signals whenever the commands SB1, SB2, SC1, SC2, and SC3, respectively, are given.

The output of the cathode follower 706 is applied to the AND gates 401 through 407 of the B1 register as described with reference to FIGURE 20. The output of the cathode follower 707 is applied to the AND gates 391 through 397 of the B2 register as described with reference to FIGURE 20. The output of the cathode follower 708 is applied to the AND gates 501 through 505 of the C1 register as described with reference to FIGURE 21. The output of the cathode follower 709 is applied to AND gates 511 through 515 of the C2 register as described with reference to FIGURE 21. The output of the cathode follower 710 is applied to AND gates 521 through 525 of the C3 register as described with reference to FIGURE 21.

The outputs from the cathode followers 706 and 707 are applied also to an OR gate 711 and the output from the OR gate 711 is applied to the cathode follower 712. The cathode follower 712 will therefore produce an output signal either when the command SB1 or the command SB2 is given. This output signal will be applied to the AND gates 431 through 444 of the B register decoder 307 as described with reference to FIGURE 20. The outputs from the cathode followers 708, 709, and 710 are all applied to an OR gate 713 and the output from the OR gate 713 is applied to a cathode follower 714. The cathode follower 714 will therefore produce an output signal whenever either of the commands SC1, SC2, or SC3 is given and this output signal will be applied to the AND gates 551 through 560 of the C register decoder 308 as described with reference to FIGURE 21.

4.8 microseconds after the command is given to set one of the flip-flops 701 through 705 in its One state, the cycle complete signal will be applied from the memory programmer 306 to the Zero inputs of the flip-flops 701 through 705 to switch the flip-flop which is in its One state back to its Zero state.

Figure 29:
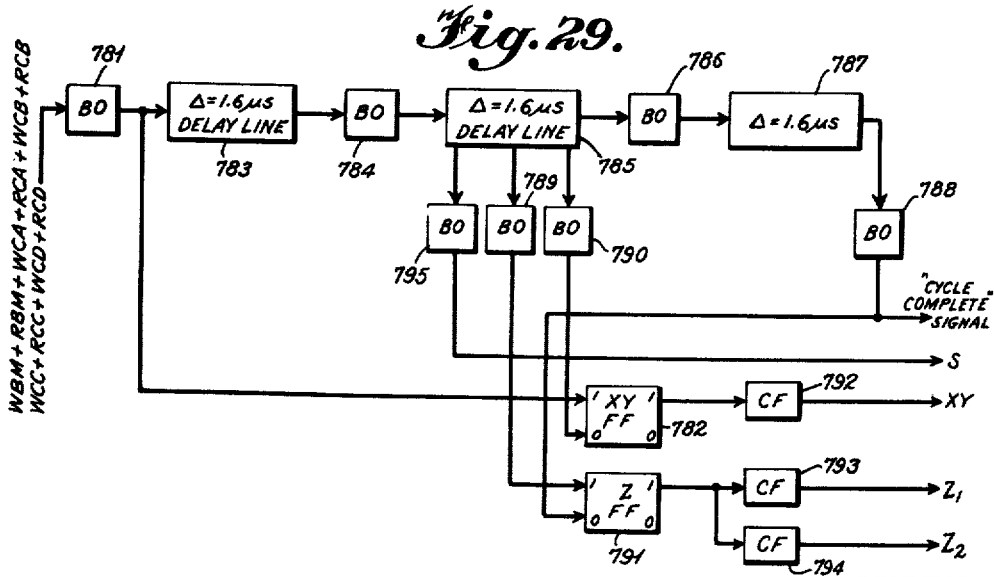
FIGURE 29 shows in block form the memory programmer which generates the waveforms necessary to carry out the reading information out of and into the storage core matrix.

FIGURE 29 illustrates the details of the memory programmer 306. Whenever any of the commands WBM, RBM, WCA, RCA, WCB, RCB, WCC, RCC, WCD, or RCD is given, the command logic for submemory selection will apply a signal to blocking oscillator 781. This signal is produced by the cathode follower 769 of the command logic for submemory selection as described with reference to FIGURE 28. In response to this signal, the blocking oscillator 781 will produce an output signal, which will be applied to a 1.6 microsecond delay line 783. The output from the delay line 783 is applied to a blocking oscillator 784. When the blocking oscillator 784 receives a signal from the delay line 783 it will apply an output signal to a 1.6 microsecond delay line 785. The delay line 785 has three tapped outputs along its length. The first output is applied to a blocking oscillator 795 and a signal will be produced from this output 0.4 microsecond after a signal is applied to the input of the delay line 785 or 2.0 microseconds after a signal is applied to the blocking oscillator 781. The second tap from the delay line 785 is applied to a blocking oscillator 789 and a signal will be produced from this output 0.6 microsecond after a signal is applied to the input of the delay line 785 or 2.2 microseconds after a signal is applied to the blocking oscillator 781. The third tap from the delay line 785 is applied to a blocking oscillator 790 and a signal at this tap will be produced 1.4 microseconds after a signal is applied to the input of the delay line 785 or 3.0 microseconds after a signal is applied to the blocking oscillator 781. The output from the end of the delay line 785 will be produced 1.6 microseconds after a signal is applied to the input of the delay line 785 or 3.2 microseconds after a signal is applied to the blocking oscillator 781. The output from the end of the delay line is applied to a blocking oscillator 786. In response to receiving a signal from the delay line 785, the blocking oscillator 786 will apply a signal to a 1.6 microsecond delay line 787. As a result, a signal will be produced from the delay line 787 4.8 microseconds after a signal is applied to the blocking oscillator 781. This signal from the delay line 787 will be applied to a blocking oscillator 788.

In response to a signal from the delay line 787, the blocking oscillator 788 will produce the cycle complete signal, which is applied to the Zero inputs of the flip-flops 721 through 730 of the command logic for submemory selection 309 as described with reference to FIGURE 28 and to the Zero inputs of the flip-flops 701 through 705 of the index register selection logic 311 as described with reference to FIGURE 25. The cycle complete signal will be produced 4.8 microseconds after a signal is applied to the blocking oscillator 781.

The output signal from the blocking oscillator 781 is also applied to a flip-flop 782 to cause this flip-flop to be set in its One state. When the output from the blocking oscillator 790 is produced after a time interval of 3.0 microseconds it will set the flip-flop 782 back to its Zero state. As a result, the flip-flop 782 will be in its One state for a total time period of three microseconds. As a result, there will be produced from the One output of the flip-flop 782 a pulse 3.0 microseconds long starting at the time a signal is applied to the blocking oscillator 781. The One output from the flip-flop 782 is applied to a cathode follower 792. The output produced by the cathode follower 792 will be the current wave form 321 which is applied to the AND gates 351 through 366 of the X and Y drivers 305 as described with reference to FIGURE 22.

The output from the blocking oscillator 789 is applied to the One input of the flip-flop 791 to cause this flip-flop to be set to its One state at a time 2.2 microseconds after a signal is applied to the blocking oscillator 781. The output signal from the blocking oscillator 788 causes the flip-flop 791 to switch back to its Zero state 4.8 microseconds after a signal is applied to the blocking oscillator 781. The One output of the flip-flop 791 is applied to the cathode followers 793 and 794. As a result, the cathode followers 793 and 794 will produce a pulse 2.6 microseconds long starting at a time 2.2 microseconds after a signal is applied to the blocking oscillator 781 and ending at a time 4.8 microseconds after a signal is applied to the blocking oscillator 781. This output wave form from the cathode followers 793 and 794 is the current wave form 319 which is applied to the selected Z1 and Z2 conductors of the storage core matrix through the Z1 and Z2 drivers 303 and 304 in accordance with the binary word to be stored in the storage core matrix.

The blocking oscillator 795 will generate an output pulse 2.0 microseconds after a signal is applied to the blocking oscillator 781. The output wave form from the blocking oscillator 795 is the wave form 320 which is applied to the AND gates 631, 633, 635, 637, 638, and 639 of each read out circuit as described with reference to FIGURE 27.

The control unit comprises a series of magnetron beam switching tubes connected as a distributor, the outputs from which are applied to a plugboard. Each output of the distributor is applied to four different program output hubs on the plugboard. As the distributor is advanced, the output signal from the distributor will step from one group of four output hubs to the next. Additional hubs on the plugboard are the input hubs for commands. If one of the program output hubs is connected to one of the input hubs of a command, then that command will be given when the output signal of the distributor is brought to that output hub. By connecting the output hub of the distributor to the selected input hubs of commands, the commands can be initiated in any desired sequence for carrying out the analysis and reduction of data. Because four output hubs are used for each output of the distributor, more than one command may be initiated on one step of the distributor by connecting the different output hubs of one group of four to the input hubs of different commands. Each command has several input hubs so that each command may be given more than once in a program.

FIGURE 30 illustrates details of the circuitry used in the control unit 14. The distributor is designated by the reference number 801. Because the distributor comprises magnetron beam switching tubes, the output signal from the distributor comprises a negative pulse. The signal from each output of the distributor 801 is applied through a cathode follower 802 to a group of four output hubs 804. The connection to each program output hub is made through a rectifier 803, each rectifier 803 connected in the direction to have its anode connected to the output of one of the cathode followers 802. As is stated above, the program output hubs may be connected to the input hubs of any selected commands. The input hubs of commands are designated by the reference number 805 in FIGURE 30. The input hubs of each command are connected to the input of an inverter 806 through a rectifier 807 and a capacitor 815. Each rectifier 807 is connected in the direction to have its cathode connected to the command input hubs 805. The cathode of each rectifier 807 is connected to a terminal 808 by a resistor 809. The anode of each rectifier 807 is connected to ground over a resistor 811. Each terminal 808 is biased positively so that current will normally flow through each rectifier 807.

The wave forms produced at each input hub 805 for the program connections of FIGURE 30 are illustrated along side the input hubs 805 in FIGURE 30. The negative output pulse at each succeeding output of the distributor starts before the pulse on the preceding output terminates. Sometimes it is desirable to repeat a command on succeeding steps of the program, in which case the wave form produced on the input hub of such command will be continuous for both program steps. To distinguish the fact that the same command is called for twice on two successive program steps, a conductor 812 is connected to the anodes of rectifiers 807 over rectifiers 813, the rectifiers 813 being connected in the direction to have their anodes connected to the anodes of the rectifiers 807. The conductor 812 is positively biased so that current will normally flow through the rectifiers 813 and the resistors 811 to ground. A negative strobe pulse is applied to the conductor 812 immediately after each stepping of the distributor 801. A negative pulse will be applied to the input of one or more of the inverters 806 only at the times that the rectifier 807 connected thereto is cut off by a signal from the input hub 805 and a rectifier 813 is cut off by the strobe pulse. At such times such inverters 806 will produce positive output pulses which are applied to blocking oscillators 814. The resulting output pulses from blocking oscillators 814 are the signals which are applied to the input output unit 11, the arithmetic unit 12, and the memory unit 13, which inputs are designated by the same letters as the commands.

The output signal from the distributor 801 is advanced from one output to the next by signals applied to the stepping input of the distributor 801. As described above, after many of the commands have been carried out a signal is generated and applied back to the control unit. This signal is applied to the stepping input of the distributor 801 to cause the output signal of the distributor 801 to advance one step. For some of the commands no signal is generated after they have been carried out. These commands always take the same length of time and circuitry is provided in the control unit to apply a signal to the stepping input of distributor 801 after a predetermined delay whenever one of these commands is given to cause output signals of the distributor 801 to advance one step. When more than one command is given on any particular program step, the output signal is not applied to the stepping input of the distributor 801 until all of the commands are carried out. Circuitry is provided to apply a negative strobe pulse to the conductor 812 a short time after a signal is applied to the stepping input of the distributor 801.

Figure 31:
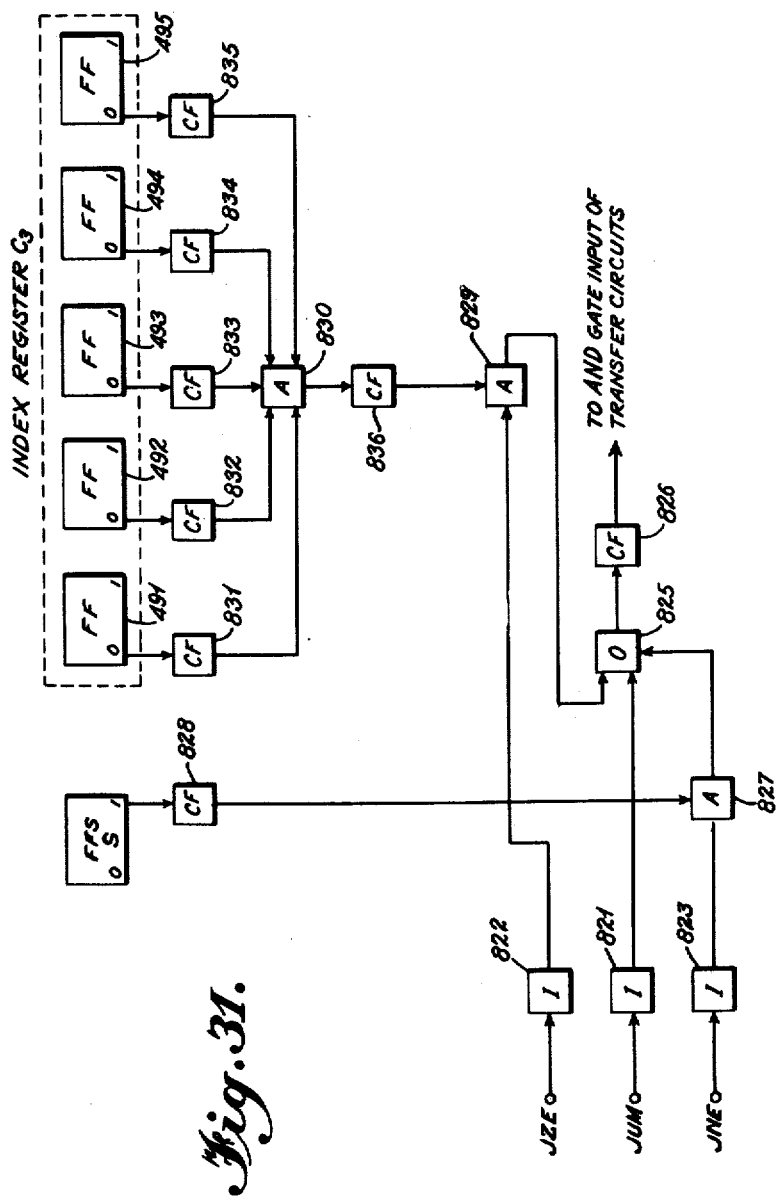

Additional commands of the computer heretofore not discussed are designated JNE, JZE, and JUM. The first two of these commands are conditional jump commands and will cause a program jump to another selected step of the program upon the occurrence of a certain condition. When a program jump occurs, the output signal of the distributor is switched from one output of the distributor to another selected output. The command JUM is an unconditional jump command and under any conditions will cause a program jump to a selected program step. FIGURE 31 illustrates the details of the logic for the commands JNE, JZE, and JUM. The command JNE is a command for a program jump if the word in the sum register of the arithmetic unit is negative. The input hubs for the command JNE are connected to the input of the inverter 823. Therefore, when the command JNE is given, a negative pulse will be applied to the input of the inverter 823. In response thereto, the inverter 823 will apply a positive pulse to an AND gate 827. If the S flip-flop of the sum register is in its One state, a signal will be applied from the One output of this flip-flop through cathode follower 828 to enable the AND gate 827. If the AND gate 827 is enabled, the pulse from the inverter 823 will pass through the AND gate 827, through an OR gate 825 to a cathode follower 826. Thus, when the command JNE is given, the cathode follower 826 will produce an output signal if the number in the sum register is negative.

The command JZE is for a program jump if the number registered in the C3 index register is 00000. The input hubs of the command JZE are connected to the input of inverter 822. Therefore, when the command JZE is given, a negative pulse will be applied to the inverter 822, which will apply a positive pulse to AND gate 829. If all the flip-flops of the C3 index register are in their Zero states, they will each apply an output signal through cathode followers 831 through 835 to different inputs of AND gate 830. If the AND gate 830 receives input signals from the Zero outputs of all five of the flip-flops of the C3 register, it will apply an enabling signal to the AND gate 829 through cathode follower 836. When the AND gate 829 is enabled it will pass the pulse from the inverter 822. The pulse will then pass through the OR gate 825 to the cathode follower 826. Thus, when the command JZE is given, the cathode follower 826 will produce an output signal if the C3 index register contains 00000.

The input hubs of the command JUM are connected to the inverter 821. Therefore, when the command JUM is given, a negative pulse will be applied to the inverter 822, which will apply a positive pulse through the OR gate 825 to the cathode follower 826, and thus the cathode follower 826 will produce an output signal whenever the command JUM is given.

The purpose of the command JZE is to facilitate the performance of a repeated series of operations on different sets of data. By means of this command a series of commands can be performed repeatedly with each series of commands performed on a different set of data and the series of commands need only be programmed once. To carry out this operation the different sets of data are stored at sequential addresses in the C section of the storage core matrix. The last set of data to be operated on is stored at the addresses in the storage core matrix selected by the number 00000 in one of the C registers. The C3 register is used to select the addresses. The sequence of commands of the series to be performed for each set of data will include the command IC3 or DC3 to cause the contents of the C3 register to increase or decrease by one so that the series of operations are performed on each set of data in order. The last command of the series will be to cause a program jump back to the beginning of the series of commands. One of the commands of the series will be JZE. Nothing will happen when the command JZE is given until the C3 register contains 00000. When the operations have been performed on the last set of data, the C3 register will contain 00000 and the program will be jumped to whatever program step is selected by the operator and thus the repeated series of commands will cease.

The output signal from the cathode follower 826 is applied to the AND gate input of each of a series of transfer circuits, the outputs of which are used to carry out the program jump operations. FIGURE 32 illustrates the details of this circuitry. Only the logic for the command JNE and only one of the transfer circuits is shown for illustrative purposes. The circuit for each transfer circuit is the same. The output from the cathode follower 826 is applied to the AND gates 841 in each transfer circuit. In each transfer circuit the output from the AND gate 841 is applied through a cathode follower 842 to a blocking oscillator 843. As is explained above, to give a program jump command on a particular program step, one of the output hubs of the particular program step must be connected to one of the input hubs of the selected one of the commands JZE, JUM, or JNE. Also, one of the transfer circuits must be selected and another output hub of the particular program step must be connected to the input of inverter 845 of the selected transfer circuit. The output of the inverter 845 is applied to the AND gate 841. At each output of the distributor 801 there is a switching input. When a signal is applied to one of these switching inputs, the output signal of the distributor will be switched to the output at that switching input. Whenever a program jump command is called for, the output of the distributor to which the output signal is to be switched must be chosen. The output of the blocking oscillator 843 of the selected transfer circuit must be connected to the switching input of the distributor at the chosen output. Thus, when the cathode follower 826 produces an output signal in response to a program jump command, this output signal will be applied to the AND gates 841 of all the transfer circuits. The inverter 845 of the selected transfer circuit will also receive a signal and apply an output signal to the AND gate 841 of the selected transfer circuit. The output signal from the cathode follower 826 will pass through the enabled AND gate 841 of the selected transfer circuit through the cathode follower 842 to energize the blocking oscillator 843 of the selected transfer circuit. The resulting output signal from the blocking oscillator 843 will be applied to the switching input at the chosen output of the distributor and thus cause the program jump to take place.

The above description comprises a preferred embodiment of the present invention and numerous modifications could be made thereto without departing from the spirit and scope of the invention which is limited only as defined in the appended claims.

What is claimed is:

1. A digital computer comprising an arithmetic unit which includes a first register to store a digital word, a second register to store a digital word, a third register to store a digital word, means to multiply the contents of said third register with the contents of said first register and to store the result in said second register, said second register having a greater word length capacity than said first register, a memory unit to store a plurality of digital words, transfer means interconnecting said memory unit and said first, second and third registers to transfer digital words from said memory unit to one of said registers and from one of said registers to said memory unit and means to cause digital words to be transferred simultaneously from said memory to said arithmetic unit and from said arithmetic unit to said memory unit.

2. A digital computer comprising an arithmetic unit including a first register to store a digital word, a second register to store a digital word and a third register to store a digital word, means to multiply the contents of said third register by the contents of said first register and store the result in said second register, a memory unit to store a plurality of digital words, first transfer means interconnecting said memory unit and said first, second and third registers to transfer digital words from said memory unit to said registers, second transfer means independent of said first transfer means interconnecting said second register and said memory unit to transfer digital words from said second register to said memory unit and means to cause said first and second transfer means to be operated simultaneously.

3. A digital computer comprising an arithmetic unit including a first register to store a digital word, a second register to store a digital word and means to add the contents of said first register to said second register with the result stored in said second register, a memory unit to store a plurality of digital words, means to transfer the digital words from said first and second registers to said memory unit, means to transfer digital words from said memory unit to said first and second registers and means to cause both of said means to transfer to operate simultaneously.

4. A digital computer comprising an arithmetic unit to perform arithmetic operations on digital data, a memory unit to store additional data, first transfer means to transfer digital data between said arithmetical means and said storage means, second transfer means to transfer digital data between said storage means and said arithmetical means and means to cause both of said transfer means to operate simultaneously.

References Cited in the file of this patent

UNITED STATES PATENTS

| 2,686,632 | Wilkinson | Aug. 17, 1954 |
| 2,855,146 | Henning et al. | Oct. 7, 1958 |
| 2,910,238 | Miles et al. | Oct. 27, 1959 |

FOREIGN PATENTS

| 749,836 | Great Britain | June 6, 1956 |